US012601992B2

(12) United States Patent
Ishikawa et al.

(10) Patent No.: US 12,601,992 B2
(45) Date of Patent: Apr. 14, 2026

(54) DEVELOPING ROLLER, PROCESS CARTRIDGE, ELECTROPHOTOGRAPHIC IMAGE FORMING APPARATUS, AND ELECTROPHOTOGRAPHIC IMAGE FORMING SYSTEM

(71) Applicant: Konica Minolta, Inc., Tokyo (JP)

(72) Inventors: Michiaki Ishikawa, Sagamihara (JP); Akihiko Itami, Hino (JP); Aya Shirai, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/625,919

(22) Filed: Apr. 3, 2024

(65) Prior Publication Data

US 2024/0353777 A1 Oct. 24, 2024

(30) Foreign Application Priority Data

Apr. 14, 2023 (JP) ................................ 2023-066096

(51) Int. Cl.

*G03G 15/08* (2006.01)
*G03G 15/09* (2006.01)
*G03G 21/18* (2006.01)

(52) U.S. Cl.

CPC ..... *G03G 15/0928* (2013.01); *G03G 15/0808* (2013.01); *G03G 15/0818* (2013.01); *G03G 21/1814* (2013.01); *G03G 2215/0604* (2013.01)

(58) Field of Classification Search

CPC ........... G03G 15/0808; G03G 15/0818; G03G 15/0928; G03G 21/1814; G03G 2215/0604

See application file for complete search history.

(56) References Cited

U.S. PATENT DOCUMENTS 6,078,768 A * 6/2000 Suzuki .................. G03G 15/09 399/257
2008/0069601 A1* 3/2008 Oshiba .............. G03G 15/0818 399/286

FOREIGN PATENT DOCUMENTS

JP 2017-156544 A 9/2017

* cited by examiner

*Primary Examiner* — Hoang X Ngo
(74) *Attorney, Agent, or Firm* — LUCAS & MERCANTI, LLP

(57) ABSTRACT

A developing roller for an electrophotographic image forming apparatus, which conveys a developer, wherein the developing roller includes a developing sleeve and a member that generates a magnetic flux inside the developing sleeve, and the developing sleeve contains an aluminum alloy containing more than 0.6% by mass of silicon.

7 Claims, 4 Drawing Sheets

DEVELOPING ROLLER, PROCESS CARTRIDGE, ELECTROPHOTOGRAPHIC IMAGE FORMING APPARATUS, AND ELECTROPHOTOGRAPHIC IMAGE FORMING SYSTEM

CROSS REFERENCE TO RELATED APPLICATIONS

The entire disclosure of Japanese Patent Application No. 2023-066096, filed on Apr. 14, 2023, including description, claims, drawings and abstract is incorporated herein by reference in its entirety.

BACKGROUND OF THE INVENTION

Technical Field

The present invention relates to a developing roller, a process cartridge, an electrophotographic image forming apparatus, and an electrophotographic image forming system.

Description of Related Art

In recent years, a technique for reducing thermal energy at the time of fixing a toner image has been demanded for the purpose of increasing a printing speed, expanding the kinds of paper, reducing an environmental load, and the like.

In order to reduce thermal energy during fixing of a toner image, it is necessary to improve the low-temperature fixability of the toner.

For example, JP 2017-156544A discloses a technique aiming at low-temperature fixability.

One means for improving the low-temperature fixability of a toner is to start the molecular motion of a resin from a lower temperature, and a resin having a low glass transition temperature is used to achieve this means.

It has been found that when a resin having a low glass transition temperature is used, a problem arises in that image failure occurs in which the developer or the toner aggregates on the sleeve and white streaks due to clogging at a doctor blade portion at the time of forming a thin layer occur or the toner which has become coarse particles is transferred as black spots.

In particular, it has been found that the image failure becomes remarkable in recent increase in printing speed and downsizing of machines.

SUMMARY OF THE INVENTION

The present invention has been made in consideration of the above-described problem or situation, and an object of the present invention is to provide a developing roller, a process cartridge, an electrophotographic image forming apparatus, and an electrophotographic image forming system that can suppress image failure such as white streaks and black spots and enables low-temperature fixing of a high-quality image over a long period of time.

In order to solve the above-described problem, the present inventors have conducted studies on the causes of the above-described problems and the like, and as a result, have found that the above-described problem can be solved by providing a developing roller including a developing sleeve that contains an aluminum alloy containing more than 0.6% by mass of silicon, and have completed the present invention.

That is, the abovementioned object according to the present invention is achieved by the following configurations.

To achieve at least one of the abovementioned objects, according to an aspect of the present invention, a developing roller reflecting one aspect of the present invention is provided: a developing roller for an electrophotographic image forming apparatus, which conveys a developer, wherein the developing roller includes a developing sleeve and a member that generates a magnetic flux inside the developing sleeve, and the developing sleeve contains an aluminum alloy containing more than 0.6% by mass of silicon.

To achieve at least one of the abovementioned objects, according to an aspect of the present invention, a process cartridge reflecting one aspect of the present invention is provided: a process cartridge including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

To achieve at least one of the abovementioned objects, according to an aspect of the present invention, an electrophotographic image forming apparatus reflecting one aspect of the present invention is provided: an electrophotographic image forming apparatus including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

To achieve at least one of the abovementioned objects, according to an aspect of the present invention, an electrophotographic image forming system reflecting one aspect of the present invention is provided: an electrophotographic image forming system including: an apparatus including a developing roller that conveys a developer; and a toner for developing an electrostatic latent image, wherein the developing roller includes a developing sleeve and a member that generates a magnetic flux inside the developing sleeve, the developing sleeve contains an aluminum alloy containing more than 0.6% by mass of silicon, and a glass transition temperature of the toner for developing an electrostatic latent image is in a range of 0 to 40° C.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
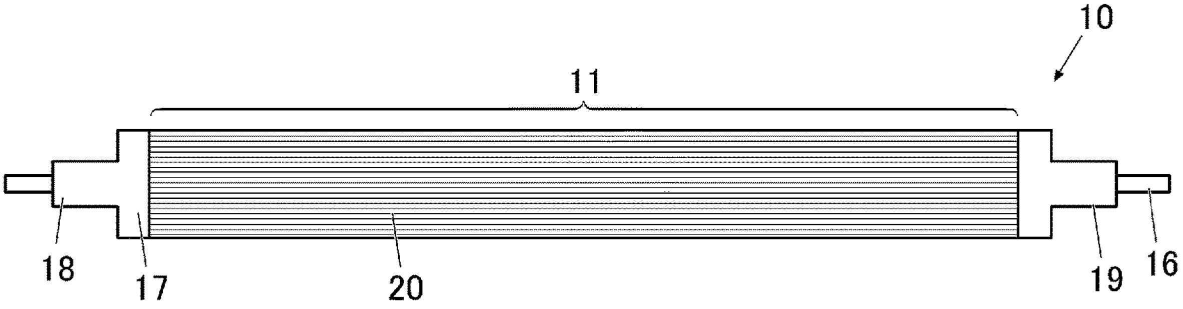
FIG. 1 is an external view of a developing roller including a developing sleeve.

Hereinafter, one or more embodiments of the present invention will be described with reference to the drawings. However, the scope of the invention is not limited to the disclosed embodiments.

The developing roller of the present invention is a developing roller for an electrophotographic image forming apparatus, which conveys a developer, wherein the developing roller includes a developing sleeve and a member that generates a magnetic flux inside the developing sleeve, and the developing sleeve contains an aluminum alloy containing more than 0.6% by mass of silicon. This feature is a technical feature common to or corresponding to the following embodiments (aspects).

In an embodiment of the present invention, the aluminum alloy preferably has a silicon content of more than 0.8% by mass from the viewpoint that the effect of suppressing heat generation is enhanced by increasing the resistance value of the surface of the developing sleeve and suppressing the generation of an eddy current.

The content of lithium in the aluminum alloy is preferably less than 1% by mass from the viewpoint of suppressing the heat generation effect of the developing sleeve while reducing the influence of the positive chargeability of lithium.

The process cartridge of the present invention is a process cartridge including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

The electrophotographic image forming apparatus of the present invention is an electrophotographic image forming apparatus including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

The electrophotographic image forming system of the present invention is an electrophotographic image forming system including: an apparatus including a developing roller that conveys a developer; and a toner for developing an electrostatic latent image, wherein the developing roller includes a developing sleeve and a member that generates a magnetic flux inside the developing sleeve, the developing sleeve contains an aluminum alloy containing more than 0.6% by mass of silicon, and a glass transition temperature of the toner for developing an electrostatic latent image is in a range of 0 to 40° C.

In the electrophotographic image forming system of the present invention, it is preferable that the binder resin contained in the toner particles included in the toner for developing an electrostatic latent image contains polyester in a range of 50 to 95% by mass from the viewpoints of low-temperature fixability, negative chargeability, and moderate hydrophilicity of the toner.

Hereinafter, the present invention, constituent elements thereof, and forms or aspects for carrying out the present invention will be described in detail. In the present description, when two figures are used to indicate a range of value before and after "to", these figures are included in the range as a lower limit value and an upper limit value. Note that the advantages and features provided by one or more embodiments of the present invention will be more fully understood from the following detailed description and the accompanying drawings which are given by way of illustration only. Accordingly, it is not intended to define the limits of the present invention.

1. Developing Roller

The developing roller of the present invention is a developing roller for an electrophotographic image forming apparatus, which conveys a developer, wherein the developing roller includes a developing sleeve and a member that generates a magnetic flux inside the developing sleeve, and the developing sleeve contains an aluminum alloy containing more than 0.6% by mass of silicon.

(1.1) Configuration

The developing roller of the present invention includes a developing sleeve. The "developing sleeve" is a means having a function of bearing member an appropriately charged developer and supplying the developer to a photoreceptor on which an electrostatic latent image is formed. The developing sleeve is also a part of a developing roller, for example, of a developing apparatus included in an electrophotographic image forming apparatus, where the developing roller is composed of a developing sleeve, a flange, a shaft, and a member that generates a magnetic flux.

Note that the above-described "member generates a magnetic flux" is generally used as a magnet roller, and thus, in the following description, the "member that generates a magnetic flux" is simply referred to as the "magnet roller".

Figure 2:
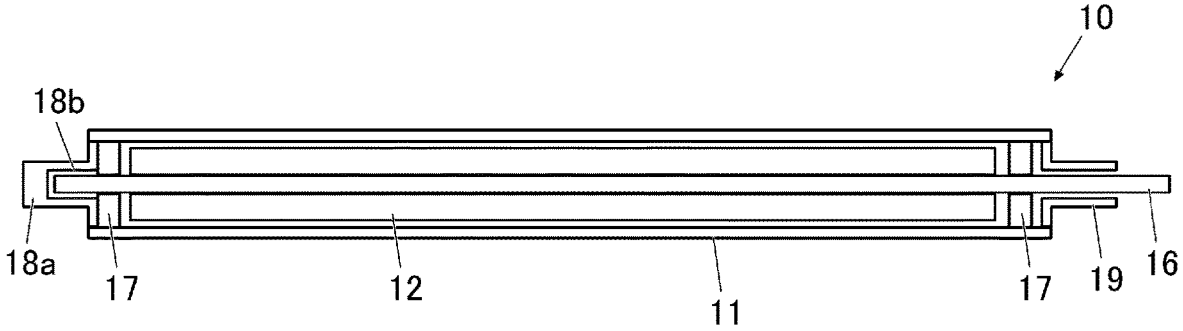
FIG. 2 is a cross-sectional view of the developing sleeve of FIG. 1 when viewed from a direction perpendicular to the axial direction.
Figure 3:
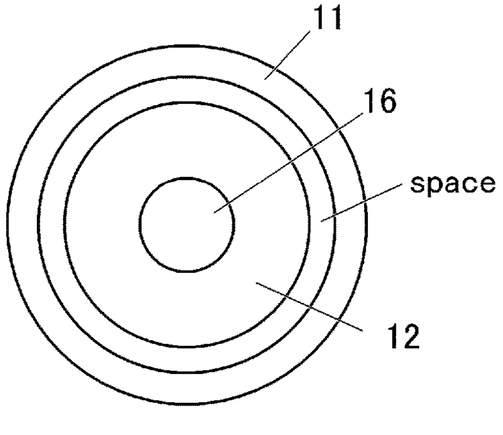
FIG. 3 is a cross-sectional view of the developing sleeve of FIG. 1 when viewed from the axial direction.

FIG. 1 is an external view of a developing roller including a developing sleeve. FIG. 2 is a cross-sectional view of the developing sleeve of FIG. 1 when viewed from a direction perpendicular to an axial direction, and FIG. 3 is a cross-sectional view of the developing sleeve of FIG. 1 when viewed from the axial direction.

The above-described developing sleeve is rotatable and cylindrical, and plays a role of bearing member and conveying the developer on the surface thereof.

As shown in FIG. 1, a substantially cylindrical developing sleeve 11 is provided, and a first flange 18 and a second flange 19 are fixedly attached to both end portions of the developing sleeve 11.

The first flange 18 is formed with a shaft portion **18*a* projecting leftward, and a recessed portion 18*b* is formed at a substantially central portion of a right portion of the first flange 18. A through hole is formed at a substantially central portion of the second flange 19, and a shaft 16 is provided coaxially with the developing sleeve 11 at a central portion of the developing sleeve 11**.

A left end portion of the shaft 16 is rotatably supported by the first flange 18 via bearings 17 mounted on the recessed portion **18*b*. A right end portion of the shaft 16 is rotatably supported by the second flange 19 via a bearing 17** mounted in the through hole, and extends rightward through the through hole.

In the developing sleeve 11, a substantially cylindrical magnet roller 12 is externally fitted and fixed to the shaft 16 in a non-contact state with an inner circumferential surface of the developing sleeve 11 (see FIG. 3). The magnet roller

12 fixed to the shaft 16 is relatively rotatably supported by the developing sleeve 11 through a first flange 18 and a second flange 19.

The magnet roller 12 has a general configuration made of a resin magnet or a sintered magnet in which a plurality of magnetic poles are formed in a circumferential direction of an outer peripheral part. For example, a magnet roller having a configuration in which S poles and N poles of magnets are alternately arranged in a circumferential direction of an outer peripheral portion, or a magnet roller having a configuration in which S poles and N poles of magnets are arranged so as to form a predetermined magnetic pattern is adopted.

(1.2) Eddy Current

The aluminum alloy is a conductive material having a relatively low electrical resistance. When the developing sleeve is rotated with respect to the magnet roller, the developing sleeve crosses magnetic lines of force generated from the magnet roller. Thus, an electromagnetic induction action occurs, and an eddy current is generated around the surface of the developing sleeve described above.

Figure 4:
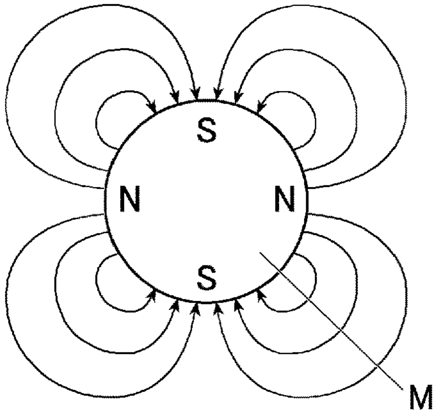
FIG. 4 is an explanatory diagram illustrating a magnetic pattern of a magnet roller.
Figure 5:
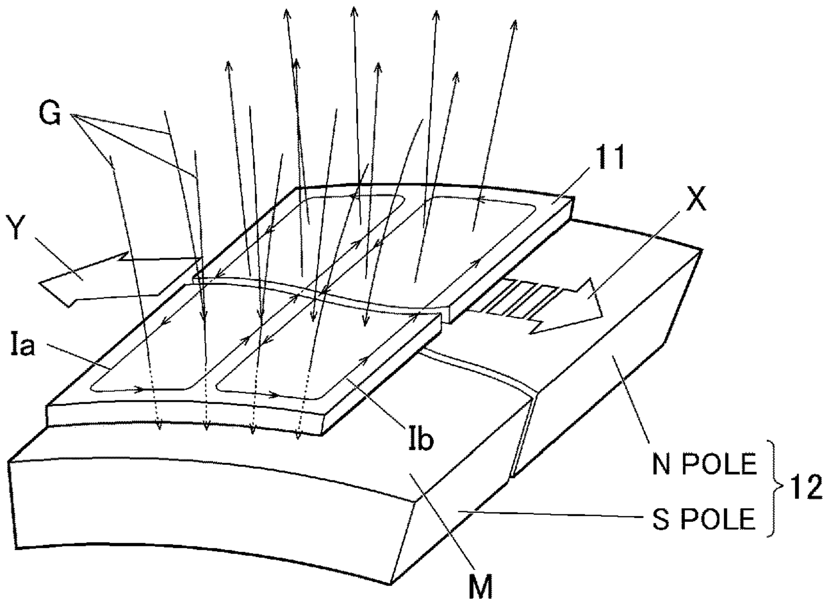
FIG. 5 is a perspective view of a main part of the developing roller for explaining a principle of generation of an eddy current.

FIG. 4 is an explanatory diagram illustrating a magnetic pattern of a magnet roller, and FIG. 5 is a perspective view of a main part of the developing roller for explaining a principle of generation of an eddy current.

For example, as shown in FIGS. 4 and 5, S poles and N poles of the magnet are alternately formed in the circumferential direction in the magnet roller 12. Then, magnetic force lines G from the adjacent N pole reach an arbitrary S pole of the magnet roller 12 through the developing sleeve 11 made of an aluminum alloy.

When the developing sleeve 11 made of an aluminum alloy rotates in the direction of the arrow Y in a state where the magnetic force lines G penetrate through the developing sleeve 11, an eddy current indicated as Ia is generated in the front part in the rotation direction in an attempt to compensate for a decrease in the magnetic force lines G. At this time, conversely to the above, an eddy current indicated as Ib is generated in the rear part in the rotation direction in an attempt to compensate for an increase in the magnetic force lines G. Then, a force acting in a direction of an arrow X in FIG. 5, which is a direction opposite to the rotation direction of the developing sleeve 11, is generated by the eddy current. Note that in a case where the current density of the eddy current is high, a problem of image failure due to increase in heat generation occurs.

(1.3) Aluminum Alloy

The developing sleeve included in the developing roller of the present invention contains an aluminum alloy. The developing sleeve preferably contains an aluminum alloy as a main component, and the content of the aluminum alloy is preferably 80% by mass or more. The more preferable content of the aluminum alloy is 100% by mass.

(Silicon Content)

The aluminum alloy contained in the developing sleeve included in the developing roller of the present invention contains more than 0.6% by mass of silicon relative to 100% by mass of the total amount of the aluminum alloy.

When the silicon content in the aluminum alloy is small, the resistance value of the surface of the developing sleeve becomes low and the eddy current increases, so that the amount of heat generated by the developing sleeve increases. In particular, when the silicon content is 0.6% by mass or less, the resistance value of the surface of the developing sleeve is too low and the amount of heat generated by the developing sleeve is too large.

When the silicon content in the aluminum alloy is large, the resistance value of the surface of the developing sleeve becomes high, and the generation of an eddy current can be suppressed, so that the amount of heat generated on the surface of the developing sleeve becomes small. Thus, the higher the resistance value of the surface of the developing sleeve, the more the heat generated by the developing sleeve can be suppressed.

The silicon content of the aluminum alloy is preferably more than 0.8% by mass from the viewpoint that the effect of suppressing heat generation is enhanced by increasing the resistance value of the surface of the developing sleeve and suppressing the generation of an eddy current. However, when the silicon content is too large, although the eddy current can be suppressed, heat generation starts to occur due to a voltage during toner image formation. From the viewpoint of suppressing heat generation amounts, the silicon content is preferably less than 30.0% by mass.

(Lithium Content)

As the content of lithium in the aluminum alloy increases, an effect of suppressing heat generation on the surface of the developing sleeve appears. On the other hand, unlike silicon, lithium has strong positive chargeability with respect to aluminum. Thus, when lithium is excessively contained with respect to the aluminum alloy, the lithium affects the chargeability of the toner, and the charge spectra of the toner tends to be spread. The content of lithium in the aluminum alloy is thus preferably less than 1% by mass from the viewpoint of suppressing the heat generation effect of the developing sleeve while suppressing the influence of the chargeability of lithium.

(Method for Measuring Element Content in Aluminum Alloy)

The types and contents of elements contained in the aluminum alloy can be measured by high-frequency inductively coupled plasma emission spectrometry (Inductively Coupled Plasma). The "high-frequency inductively coupled plasma emission spectrometry" is a method in which a solution sample obtained by dissolving a metal in an acid, an alkali, or the like is sprayed into Ar plasma, excited and emitted light is separated into each wavelength, and the type and content of elements are quantified from the light intensity. In the high-frequency inductively coupled plasma emission spectrometry, the light intensity and the content of an element are in a linear relationship from a low concentration range to a high concentration range, and thus it is possible to analyze different elements at the same time.

As a measurement apparatus for the high-frequency inductively coupled plasma emission spectrometry, "ULTIMA2000 (manufactured by Horiba, Ltd.)" can be used.

The values of the contents of silicon and lithium of the developing sleeve according to the present invention are values measured after the aluminum alloy in the developing sleeve is cut into chips, and the chips are dissolved in acid.

(1.4) Surface

Figure 6:
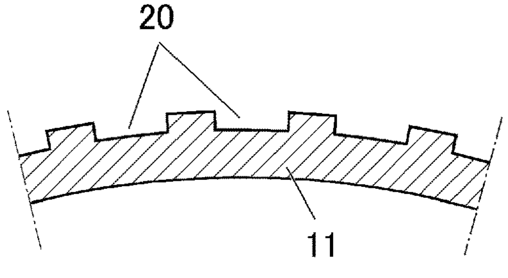
FIG. 6 is a longitudinal sectional view of the developing sleeve in a case where grooves are formed.

FIG. 6 is a longitudinal sectional view of the developing sleeve in a case where grooves are formed. As described above, the grooves 20 are provided on the outer circumferential surface of the developing sleeve included in the developing roller of the present invention in order to improve the developer conveying ability. As illustrated in FIG. 3, cutting is performed on the outer circumferential surface of the developing sleeve 11 to form a plurality of grooves 20 at predetermined circumferential intervals over substantially the entire length of the developing sleeve 11 in the length direction. Then, the developer may be borne on the developing sleeve in such a manner that the developer is scooped up by the plurality of grooves 20. Note that the depth of the grooves 20 is preferably 0.5 mm or less in consideration of the wall thickness of the developing sleeve 11 and the conveyability of the developer.

(Sandblasting Treatment)

The outer circumferential surface of the developing sleeve 11 may be subjected to sandblasting treatment to form a plurality of recesses and projections on the outer circumferential surface of the developing sleeve 11, and the developer may be borne in the recessed portions of the plurality of recesses and projections. The roughness of the outer circumferential surface is appropriately maintained by subjecting the outer circumferential surface of the developing sleeve 11 to sandblasting processing to form recesses and projections on the surface of the developing sleeve 11, and thus the conveyability of the developer is improved.

As a means that provides roughness to the surface of the developing sleeve, it is more preferable to provide surface roughness by sandblasting processing which has been conventionally used. When silicon is contained in the aluminum alloy in the developing sleeve, a silicon-containing portion and a silicon-free portion on the surface of the developing sleeve are scraped in different manners when the developing sleeve is subjected to sandblasting treatment. By making the way of scraping on the surface of the developing sleeve different in this way, an appropriate surface roughness can be given to the developing sleeve.

The sandblasting processing is a processing in which a blast material is projected onto the surface of the developing sleeve, and the surface is dented in a recessed shape by the blast material to form recesses and projections. Examples of the sandblasting processing include air blasting processing, wet sandblasting processing, and shot blasting processing.

The material applicable to the sandblasting processing is not particularly limited, and a known material can be appropriately used. Specific examples of the material include glass beads, alumina particles, silica particles, titania particles, and zirconia particles. As the material, organic fine particles can also be used for sandblasting processing. Examples of the organic fine particles include melamine resin particles, benzoguanamine resin particles, and cross-linked acrylic resin particles. From the viewpoint of imparting such an impact force as to recess the elastic layer but not tear the surface of the surface layer, spherical glass beads or alumina beads are particularly preferable as the above-described material. These materials applicable to the sandblasting processing may be used alone or in combination of two or more.

An appropriate volume average particle size of the above-described material varies depending on the size of recesses and projections on the surface of the developing sleeve. A suitable volume average particle size of the above-described material is preferably in a range of 3 to 200 μm, more preferably in a range of 10 to 100 μm, and still more preferably in a range of 20 to 80 μm.

2. Electrophotographic Image Forming Apparatus

The electrophotographic image forming apparatus of the present invention is an electrophotographic image forming apparatus including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

The image forming apparatus includes, for example, a charging means (first charging means), an exposure means, a developing means, a transfer means, and a cleaning means. The image forming apparatus may also include a second charging means between the transfer means and the cleaning means.

Figure 7:
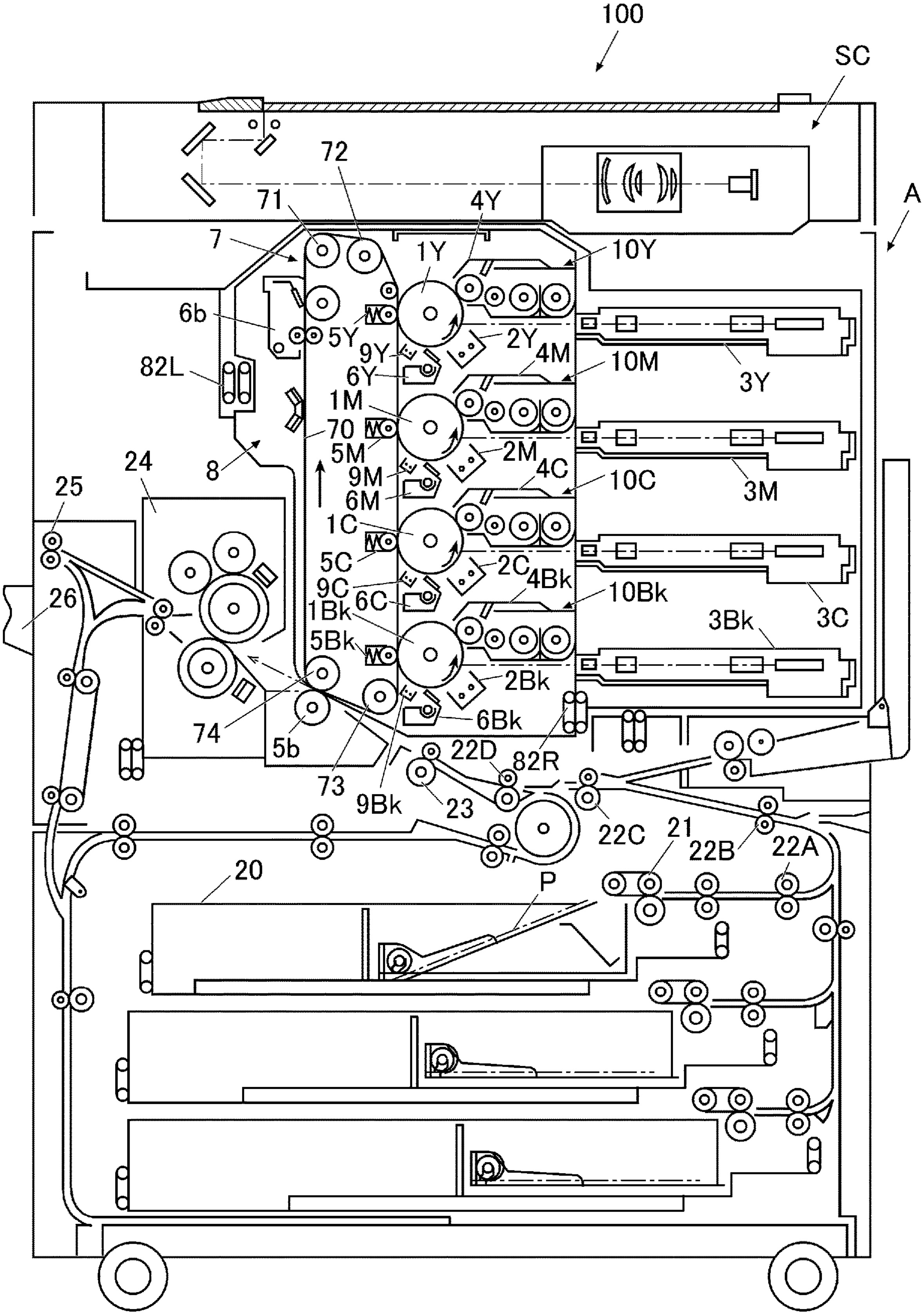
FIG. 7 is a schematic configurational view illustrating an example of the image forming apparatus of the present invention.

FIG. 7 is a schematic configurational view illustrating an example of the image forming apparatus of the present invention.

The image forming apparatus 100 is called a tandem-type color image forming apparatus, and includes four sets of process cartridges 10Y, 10M, 10C, and 10Bk, an intermediate transfer member unit 7, a sheet feeder 21, a fixing means 24, and the like. At an upper part of a main body A of the image forming apparatus, a document image reading device SC is arranged.

(2.1) Process Cartridge

The process cartridge according to the present invention is a process cartridge including a developing roller that conveys a developer, wherein the developing roller includes a developing sleeve and a member that generates a magnetic flux inside the developing sleeve, and the developing sleeve contains an aluminum alloy containing more than 0.6% by mass of silicon.

The process cartridge 10Y that forms a yellow image includes, around a drum-shaped photoreceptor 1Y, a first charging means 2Y, an exposure means 3Y, a developing means 4Y, a primary transfer roller 5Y, a second charging means 9Y, and a cleaning means 6Y, which are sequentially arranged along a rotation direction of the photoreceptor 1Y.

The process cartridge 10M for forming a magenta image includes, around a drum-shaped photoreceptor 1M, a first charging means 2M, an exposure means 3M, a developing means 4M, a primary transfer roller 5M, a second charging means 9M, and a cleaning means 6M, which are sequentially arranged along a rotation direction of the photoreceptor 1M.

The process cartridge 10C for forming a cyan image includes, around a drum-shaped photoreceptor 1C, a first charging means 2C, an exposure means 3C, a developing means 4C, a primary transfer roller 5C, a second charging means 9C, and a cleaning means 6C, which are sequentially arranged along a rotation direction of the photoreceptor 1C.

The process cartridge 10Bk that forms a black image includes, around a drum-shaped photoreceptor 1Bk, a first charging means 2Bk, an exposure means 3Bk, a developing means 4Bk, a primary transfer roller 5Bk, a second charging means 9Bk, and a cleaning means 6Bk, which are sequentially arranged along a rotation direction of the photoreceptor 1Bk.

The process cartridges 10Y, 10M, 10C, and 10Bk are configured in the same manner except that the colors of the toner images formed on the photoreceptors 1Y, 1M, 1C, and 1Bk are different. Thus, the process cartridge 10Y will be described in detail as an example, and the description of the process cartridges 10M, 10C and 10Bk will be omitted.

The process cartridge 10Y includes, around a photoreceptor 10Y serving as an image forming member, a first charging means 2Y, an exposure means 3Y, a developing means 4Y, a primary transfer roller 5Y, a second charging means 9Y, and a cleaning means 6Y. The process cartridge 10Y forms a yellow (Y) toner image on the photoreceptor 10Y. The process cartridge 10Y may be detachable from the image forming apparatus 100.

In the present embodiment, of the process cartridges 10Y, at least the photoreceptor 1Y, the first charging means 2Y, the developing means 4Y, the second charging means 9Y, and the cleaning means 6Y are provided integrally.

(First Charging Means)

The first charging means 2Y is a means that provides a uniform potential to the photoreceptor 1Y, and for example, a corona discharge-type charging device is used.

(Exposure Means)

The exposure means 3Y is a means that performs exposure, based on the image signal (yellow), on the photoreceptor 1Y to which the uniform potential has been applied by the first charging means 2Y, to form an electrostatic latent image corresponding to a yellow image. As the exposure means 3Y, for example, exposure means including LEDs in which light emitting elements are arranged in an array in the axial direction of the photoreceptor 1Y and image forming elements, or exposure means of a laser optical system is used.

(Developing Means)

The developing means 4Y includes, for example, a developing sleeve which has a built-in magnet and rotates while holding a developer, a photoreceptor 1Y, and a voltage applying device. The voltage applying device is a device that applies a direct current bias voltage and/or an alternating current bias voltage between the voltage applying device and the developing sleeve.

(Primary Transfer Roller)

The primary transfer roller 5Y is a means that transfers the toner image formed on the photoreceptor 1Y to an intermediate transfer member 70 in the form of an endless belt. The primary transfer roller 5Y is disposed in contact with the intermediate transfer member 70.

(Second Charging Means)

The second charging means 9Y is a discharging means that charges (discharges) the surfaces of the photoreceptor 1Y after the toner images are transferred to the intermediate transfer member 70, and is provided as a pre-cleaning member. As the second charging means 9Y, for example, a corona discharge-type charging device is used.

(Cleaning Means)

The cleaning means 6Y includes a cleaning blade and a brush roller. The brush roller is disposed at the more upstream side than the cleaning blade.

(2.2) Intermediate Transfer Member Unit

The intermediate transfer member unit 7 is wound around by a plurality of rollers 71, 72, 73, and 74. The intermediate transfer member unit 7 includes an intermediate transfer member 70, and the intermediate transfer member 70 is a second image bearing member in the form of a semiconductive endless belt that is rotatably supported.

In the intermediate transfer member unit 7, a cleaning means 6*b* that removes the toner is provided on the intermediate transfer member 70. The housing 8 is constituted by the process cartridges 10Y, 10M, 10C and 10Bk and the intermediate transfer member unit 7. The housing 8 is configured to be drawable from a main body A of the image forming apparatus via the support rails 82L and 82R.

The image forming apparatus 100 includes a secondary transfer roller 5*b* that transfers a color image formed on the intermediate transfer member 70 to the transfer material P.

(2.3) Sheet Feeder

The sheet feeder 21 is a means that supplies the transfer material P to the secondary transfer roller 5*b*. The sheet feeder 21 includes a sheet feed cassette 20, a plurality of intermediate rollers 22A, 22B, 22C, 22D, and a registration roller 23. The sheet feed cassette 20 accommodates the transfer material P. The intermediate rollers 22A, 22B, 22C, and 22D convey the transfer material P to the secondary transfer roller 5*b*.

(2.4) Fixing Means

The fixing means 24 is a means that fixes the color image transferred to the transfer material P to the transfer material P. Examples of the fixing means 24 include those of a heat roller fixing type. Examples of the heat roller fixing type-fixing means include those composed of a heating roller including a heat source therein and a pressure roller provided in a state of being pressed against the heating roller so as to form a fixing nip part.

The image forming apparatus 100 has a sheet ejection tray 26 for taking out the transfer material P on which the image has been formed. On the downstream of the fixing means 24, sheet ejection rollers 25 that convey the fixed transfer material P to a sheet ejection tray 26 are provided. Note that although the image forming apparatus 100 is a color laser printer in the embodiment described above, it may be a monochrome laser printer, a copier, a multifunction apparatus, or the like.

3. Electrophotographic Image Forming System

The electrophotographic image forming system of the present invention is an electrophotographic image forming system including: an apparatus including a developing roller that conveys a developer; and a toner for developing an electrostatic latent image, wherein the developing roller includes a developing sleeve and a member that generates a magnetic flux inside the developing sleeve, the developing sleeve contains an aluminum alloy containing more than 0.6% by mass of silicon, and a glass transition temperature of the toner for developing an electrostatic latent image is in a range of 0 to 40° C.

The "electrophotographic image forming system" of the present invention refers to an assembly which is constituted by devices or apparatuses having predetermined functions as means and elements necessary for each step of image formation, a toner for developing an electrostatic latent image, and the like, and which performs at least the function of image formation as a whole. It is to be noted that the respective means and elements may be individually disposed at different places apart from each other, or may be collectively disposed in a certain space as one device to be integrally formed as a system device.

That is, the apparatus used in the present invention is not particularly limited as long as it is an apparatus satisfying the above-described conditions, and it is not always necessary to use an electrophotographic image forming apparatus dedicated to the toner for developing an electrostatic latent image satisfying the specific conditions according to the present invention. Further, the image forming system of the present invention is also preferably provided with a means that records and stores recording and copying information as electronic data and a means that wirelessly communicates the electronic data.

For example, a wireless interface for transmitting and receiving data to and from the information processing device by wireless communication such as Bluetooth® or Wi-Fi® is preferably provided. Note that the same developing sleeve as described above can be used in the electrophotographic image forming system of the present invention, and can be used in combination with a toner for developing an electrostatic latent image having a glass transition temperature in a range of 0 to 40° C.

(3.1) Toner for Developing Electrostatic Latent Image (3.1.1) Toner Base Particles The toner base particles constituting the toner for developing an electrostatic latent image according to the present invention contain, for example, a binder resin, and if necessary, a colorant, a release agent, and other additives.

In the present invention, the term "toner particles" refers to toner base particles to which an external additive is added, and an aggregate of toner particles is referred to as a "toner". In general, the toner base particles can be used as toner particles as they are, but in the present invention, toner particles obtained by adding an external additive to the toner base particles are used as toner particles. In the following description, the toner base particles and the toner particles are also simply referred to as "toner particles" when it is not particularly necessary to distinguish therebetween.

Hereinafter, the glass transition temperature is described, and then details of the constituent materials of the toner base particles according to the present invention are described.

(3.1.2) Glass Transition Temperature of Toner for Developing Electrostatic Latent Image The "glass transition temperature" is defined as a temperature at which a free volume of molecules increases and micro Brownian motion starts as the temperature of a resin component or the like forming the toner changes from a low temperature to a high temperature.

In order to enhance the low-temperature fixability of the toner, a design for lowering the glass transition temperature with which molecular motion is allowed to proceed from a lower temperature is required. It is further preferable to adopt a contrivance for the heat-resistant storage property and the suppression of toner-particle fusion.

As the contrivance, it is also preferable to adopt, for example, a core-shell type toner configuration in which the configurations are different between the surface and the inside of the toner, and a resin having a low glass transition temperature is used for the core and a resin having a high glass transition temperature is used for the shell. Furthermore, it is also preferable to harden only the surface by using a means that fixes inorganic fine particles as an external additive to the portion corresponding to the shell, thereby ensuring heat-resistant storage property and fusion aggregation resistance.

The glass transition temperature of the toner for developing an electrostatic latent image according to the present invention is in a range of 0 to 40° C. When the glass transition temperature is lower than 0° C., the toner is too soft, resulting in image failure, and when the glass transition temperature is higher than 40° C., the low-temperature fixability of the toner deteriorates. Note that the resin of the core constituting the toner according to the present invention needs to be designed to have a lower glass transition temperature, and the resin of the shell needs to be designed to have a higher glass transition temperature.

(Control Method)

The glass transition temperature of the resin is controlled by changing the composition and molecular weight of molecules constituting the resin, the component ratio of different resins, and the like.

(Measurement Method)

The glass transition temperature is determined from a DSC curve obtained by differential scanning calorimetry (DSC). To be more specific, it is determined by the "extrapolated glass-transition starting temperature" described in the method for determining a glass transition temperature in the JIS K-7121-1987 "Testing Methods for Transition Temperatures of Plastics".

(3.1.3) Binder Resin

The toner particles included in the toner for developing an electrostatic latent image preferably contain polyester as a binder resin. Polyester is a dehydration condensation reaction system, has particularly good compatibility with paper, and has high internal cohesive force. Thus, in particular, since the folding fixability after the completion of fixing is high, further low-temperature fixing can be achieved.

Note that the term "folding fixability" refers to, for example, a property that indicates the ease with which a toner layer is peeled off at a fold line portion when a toner image is formed in the shape of a black belt with toner using paper as a recording medium, the toner image is fixed, and then the paper is folded in two and unfolded again. Furthermore, when the "folding fixability" is high, the destruction of the toner layer as described above does not occur, and good fixability can be achieved.

In addition, polyester has both high negative chargeability and moderate hydrophilicity as compared with other resins. Therefore, even if the surface of the developing sleeve containing more than 0.6% by mass of silicon partially has a high resistance value, the charge stability inside the toner is further enhanced. Furthermore, the image quality is also stabilized at a higher level.

The effect as described above can be confirmed when the content of the polyester in the toner particles is 60% by mass or more. When the content of the polyester in the toner particles is more than 98% by mass, for example, assuming that the remaining 2% by mass is an external additive, the amount of the external additive is designed to be relatively small. Therefore, toner particles having a polyester content of more than 98% by mass cannot be used because problems may occur in heat-resistant storage property and image quality.

From the above, in the electrophotographic image forming system of the present invention, it is preferable that the binder resin contained in the toner particles included in the toner for developing an electrostatic latent image contains polyester in a range of 50 to 95% by mass from the viewpoints of low-temperature fixability, negative chargeability, and moderate hydrophilicity of the toner.

The toner particles may contain an amorphous polyester and a crystalline polyester as binder resins. Either a crystalline resin or an amorphous resin may be used, but a crystalline resin provides a sharp-melting property.

The term "crystalline" refers to having a clear endothermic peak rather than a stepwise endothermic change in differential scanning calorimetry (DSC), and specifically refers to having an endothermic peak with a half-width of 10° C. or less when measured at a rate of temperature increase of 10 (° C./min).

On the other hand, the term "amorphous" refers to having a half width of more than 10° C., exhibiting a stepwise change in endothermic amount, or having no clear endothermic peak.

(Amorphous Polyester)

The amorphous polyester is preferably contained in a range of 50 to 88% by mass, and more preferably in a range of 60 to 80% by mass, relative to the total amount of the binder resin. Examples of the amorphous polyester include a condensation polymer of a polyvalent carboxylic acid and a polyvalent alcohol. As the amorphous polyester, a commercially available product may be used, or a synthesized product may be used.

[Polyvalent Carboxylic Acid]

Examples of the polyvalent carboxylic acid include aliphatic dicarboxylic acids, alicyclic dicarboxylic acids, aromatic dicarboxylic acids, anhydrides thereof, and lower alkyl esters thereof. Among these, as the polyvalent carboxylic acid, for example, an aromatic dicarboxylic acid is preferable.

Examples of the aliphatic dicarboxylic acid include oxalic acid, malonic acid, maleic acid, fumaric acid, citraconic acid, itaconic acid, glutaconic acid, succinic acid, alkenyl succinic acid, adipic acid, and sebacic acid.

Examples of the alicyclic dicarboxylic acid include cyclohexanedicarboxylic acid.

Examples of the aromatic dicarboxylic acid include terephthalic acid, isophthalic acid, phthalic acid, and naphthalenedicarboxylic acid.

Examples of the lower alkyl ester include those having 1 to 5 carbon atoms.

As the polyvalent carboxylic acid, a trivalent or higher valent carboxylic acid having a crosslinked structure or a branched structure may be used in combination with the dicarboxylic acid. Examples of the trivalent or higher valent carboxylic acid include trimellitic acid, pyromellitic acid, anhydrides thereof, and lower alkyl esters thereof. Examples of the lower alkyl ester include those having 1 to 5 carbon atoms. Note that the polyvalent carboxylic acids may be used alone or in combination of two or more kinds thereof.

[Polyvalent Alcohol]

Examples of the polyvalent alcohol include aliphatic diols, alicyclic diols, and aromatic diols. Among these, aromatic diols or alicyclic diols are preferable, and aromatic diols are more preferable.

Examples of the aliphatic diol include ethylene glycol, diethylene glycol, triethylene glycol, propylene glycol, butanediol, hexanediol, and neopentyl glycol.

Examples of the alicyclic diol include cyclohexanediol, cyclohexanedimethanol, and hydrogenated bisphenol A.

Examples of the aromatic diol include an ethylene oxide adduct of bisphenol A and a propylene oxide adduct of bisphenol A.

As the polyvalent alcohol, a trivalent or higher valent alcohol having a crosslinked structure or a branched structure may be used in combination with the diol. Examples of the trivalent or higher valent alcohol include glycerin, trimethylolpropane, and pentaerythritol. The polyvalent alcohol may be used alone or in combination of two or more kinds thereof.

[Glass Transition Temperature of Amorphous Polyester]

The amorphous polyester may be used inside the toner or used as a shell material of the toner surface layer. In the case of using the amorphous polyester inside the toner, the glass transition temperature (Tg) of the amorphous polyester is preferably in a range of −5 to 40° C. and more preferably in a range of 0 to 30° C. When the amorphous polyester is used as the shell material, the glass transition temperature (Tg) of the amorphous polyester is preferably in a range of 50 to 80° C., more preferably in a range of 50 to 65° C.

The glass transition temperature is determined from a DSC curve obtained by differential scanning calorimetry (DSC). To be more specific, it is determined by the "extrapolated glass-transition starting temperature" described in the method for determining a glass transition temperature in the JIS K-7121-1987 "Testing Methods for Transition Temperatures of Plastics".

[Others]

In the present embodiment, two or more kinds of amorphous polyesters may be used in combination. In this case, the absolute value of the difference in SP value between the amorphous polyester having the largest SP value (value of solubility parameter) and the amorphous polyester having the smallest SP value is preferably 0.25 or less. The SP value is more preferably in a range of 0.01 to 0.25, and still more preferably in a range of 0.10 to 0.25. When the absolute value of the difference between the SP values is 0.25 or less, the compatibility between the crystalline polyester and the amorphous polyester can be adjusted to an appropriate range.

The amorphous polyester is obtained by a well-known production method. Specifically, for example, the amorphous polyester is obtained by a method in which the polymerization temperature is set in a range of 180 to 230° C., the pressure in the reaction system is reduced as necessary, and the reaction is performed while removing water or alcohol generated at the time of condensation.

When the monomers as starting materials are not dissolved or compatible at the reaction temperature, a solvent having a high boiling point may be added as a solubilizing agent to dissolve the monomers. When a solvent having a high boiling point is added as a solubilizing agent for dissolution, the polycondensation reaction of the starting monomers is performed while distilling off the solubilizing agent. In the case where a monomer having poor compatibility is present in the copolymerization reaction, the monomer having poor compatibility and an acid or alcohol to be polycondensed with the monomer may be condensed in advance, and then polycondensed with the main component.

In the present embodiment, examples of a method of adjusting the SP value of the amorphous polyester include a method of selecting the kinds of the polyvalent carboxylic acid and the polyvalent alcohol constituting the amorphous polyester so that the SP value of the amorphous polyester becomes a desired value.

(Crystalline Polyester)

Examples of the crystalline polyester include polycondensates of a polyvalent carboxylic acid and a polyvalent alcohol. Note that as the crystalline polyester, a commercially available product may be used, or a synthesized product may be used. Here, since the crystalline polyester easily forms a crystal structure, a polycondensate using a polymerizable monomer having a linear aliphatic group is more preferable than a polymerizable monomer having an aromatic group.

[Polyvalent Carboxylic Acid]

Examples of the polyvalent carboxylic acid include aliphatic dicarboxylic acids, aromatic dicarboxylic acids, anhydrides thereof, and lower alkyl esters thereof.

Examples of the aliphatic dicarboxylic acids include oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid.

Examples of the aromatic dicarboxylic acids include dibasic acids such as phthalic acids, isophthalic acids, terephthalic acids, and naphthalene-2,6-dicarboxylic acids.

Examples of the lower alkyl ester include those having 1 to 5 carbon atoms.

As the polyvalent carboxylic acid, a trivalent or higher valent carboxylic acid having a crosslinked structure or a branched structure may be used in combination with the dicarboxylic acid.

Examples of the trivalent carboxylic acid include aromatic carboxylic acids, anhydrides of these, and lower alkyl esters of these.

Examples of the aromatic carboxylic acids include 1,2,3-benzenetricarboxylic acid, 1,2,4-benzenetricarboxylic acid, and 1,2,4-naphthalenetricarboxylic acid.

Examples of the lower alkyl ester include those having 1 to 5 carbon atoms.

As the polyvalent carboxylic acid, a dicarboxylic acid having a sulfonic acid group and a dicarboxylic acid having an ethylenic double bond may be used in combination with these dicarboxylic acids. The polyvalent carboxylic acid may be used alone or in combination of two or more kinds thereof.

[Polyvalent Alcohol]

Examples of the polyvalent alcohol include aliphatic diols. As the aliphatic diol, a straight-chain aliphatic diol, for example, in which the number of carbon atoms of a main chain portion is in a range of 7 to 20, is preferable.

Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol. Among these, 1,8-octanediol, 1,9-nonanediol, and 1,10-decanediol are preferable as the aliphatic diol.

As the polyvalent alcohol, a trivalent or higher valent alcohol having a crosslinked structure or a branched structure may be used in combination with the diol. Examples of the trivalent or higher valent alcohol include glycerin, trimethylolethane, trimethylolpropane, and pentaerythritol.

The polyvalent alcohol may be used alone or in combination of two or more kinds thereof. Here, in the polyvalent alcohol, the content of the aliphatic diol may be 80 mol % or more, and is preferably 90 mol % or more.

[Melting Temperature of Crystalline Polyester]

The melting temperature of the crystalline polyester is preferably in a range of 55 to 80° C., more preferably in a range of 55 to 78° C., and still more preferably in a range of 55 to 76° C. When the melting temperature of the crystalline polyester is 72° C. or higher, the heat storage property is further improved. When the melting temperature of the crystalline polyester is 80° C. or lower, low-temperature fixability is further improved. Note that the melting temperature is determined from a DSC curve obtained by differential scanning calorimetry (DSC), according to the "melting peak temperature" described in the method for determining a melting temperature of JIS K7121-1987 "Testing methods for transition temperatures of plastics".

[Others]

The crystalline polyester is obtained, for example, similarly to the amorphous polyester, by a well-known production method. In the present embodiment, examples of a method of adjusting the SP value of the crystalline polyester include a method of selecting the kinds of the polyvalent carboxylic acid and the polyvalent alcohol constituting the crystalline polyester so that the SP value of the crystalline polyester becomes a desired value.

(Other Resins)

In the present embodiment, any other resin besides the amorphous polyester and the crystalline polyester may be used as the binder resin. Examples of other binder resins include vinyl-based resins formed of homopolymers of monomers such as styrenes, (meth)acrylic acid esters, ethylenically unsaturated nitriles, vinyl ethers, vinyl ketones, and olefins, or copolymers obtained by combining two or more of these monomers.

Examples of the styrenes include styrene, p-chlorostyrene, and α-methylstyrene.

Examples of the (meth)acrylic acid esters include methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate.

Examples of the ethylenically unsaturated nitriles include acrylonitrile and methacrylonitrile.

Examples of the vinyl ethers include vinyl methyl ether and vinyl isobutyl ether.

Examples of the vinyl ketones include vinyl methyl ketone, vinyl ethyl ketone, and vinyl isopropenyl ketone.

Examples of the olefins include ethylene, propylene, and butadiene.

Examples of the other binder resins include non-vinyl-based resins such as epoxy resins, polyurethane resins, polyamide resins, cellulose resins, polyether resins, and modified rosins. In addition, a mixture of the resin as described above and the vinyl-based resin, a graft polymer obtained by polymerizing a vinyl-based monomer in the co-presence of these, and the like may also be mentioned. These other binder resins may be used alone or in combination of two or more kinds thereof.

In the present embodiment, a styrene-(meth)acrylic copolymer resin may be used as the other binder resin. When a styrene-(meth)acrylic copolymer resin is used as the other binder resin, fixing property such as hot offset and heat storage property are further improved.

When a styrene-(meth)acrylic copolymer resin is used as the other binder resin, the proportion of the styrene-(meth) acrylic copolymer resin in the binder resin is preferably in a range of 5 to 25% by mass. The above range is more preferably in a range of 5 to 20% by mass, and still more preferably in a range of 10 to 15% by mass.

When the proportion of the styrene-(meth)acrylic copolymer resin in the binder resin is 5% by mass or more, fixing property such as hot offset and heat storage property are further improved. When the proportion of the styrene-(meth) acrylic copolymer resin in the binder resin is 25% by mass or less, the low-temperature fixability is further improved.

In the present embodiment, (meth)acryl means acryl or methacryl.

The styrene-(meth)acrylic copolymer resin can be synthesized by various polymerization methods, for example, solution polymerization, precipitation polymerization, suspension polymerization, precipitation polymerization, bulk polymerization, and emulsion polymerization. The polymerization reaction can be carried out by a known operation such as a batch system, a semi-continuous system or a continuous system.

(3.1.4) Colorant

Examples of the colorant include a pigment and a dye.

Examples of the pigment include carbon black, chrome yellow, Hansa yellow, benzidine yellow, threne yellow, quinoline yellow, pigment yellow, permanent orange GTR, pyrazolone orange, vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate.

Examples of the dye include acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or in combination of two or more kinds thereof. As the colorant, a surface-treated colorant may be used as necessary, and a dispersant may be used in combination. In addition, a plurality of types of colorants may be used in combination. The content of the colorant is, for example, preferably in a range of 1 to 30% by mass and more preferably in a range of 3 to 15% by mass with respect to the entirety of the toner particles.

(3.1.5) Release Agent

Examples of the release agent include hydrocarbon-based waxes. Other examples include, but are not limited to, natural waxes, synthetic or mineral/petroleum-based waxes, and ester-based waxes.

Examples of the natural wax include carnauba wax, rice wax, and candelilla wax.

Examples of the synthetic or mineral/petroleum-based waxes include montan wax.

Examples of the ester-based wax include fatty acid esters and montanic acid esters.

The melting temperature of the release agent is preferably in a range of 50 to 110° C., and more preferably in a range of 60 to 100° C. The melting temperature is determined from a DSC curve obtained by differential scanning calorimetry (DSC) according to "Melting Peak Temperature" described in a method for determining a melting temperature in "Testing Methods for Transition Temperatures of Plastics" in JIS K-7121-1987.

The content of the release agent is, for example, preferably in a range of 1 to 20% by mass and more preferably in a range of 5 to 15% by mass with respect to the entirety of the toner particles.

(3.1.6) Other Additives

Examples of the other additives include well-known additives such as a magnetic body, a charge control agent, and an inorganic powder, and these additives are included in the toner particles as internal additives.

(Magnetic Body)

Examples of the magnetic body include iron oxides such as magnetite, hematite, and ferrite; metals such as iron, cobalt, and nickel; alloys of these metals and metals such as aluminum, cobalt, copper, lead, magnesium, tin, zinc, antimony, bismuth, calcium, manganese, titanium, tungsten, and vanadium; and mixtures thereof.

Examples of the shape of the magnetic body include a polyhedron, an octahedron, a hexahedron, a spherical shape, a needle-like shape, and a scale-like shape, and a shape having little anisotropy, such as a polyhedron, an octahedron, a hexahedron, or a spherical shape, is preferable from the viewpoint of increasing the image density.

The magnetic body preferably has a number-average particle size in a range of 0.10 to 0.40 μm. Generally, the smaller the particle size of the magnetic body, the greater the coloring strength while the more readily the magnetic body aggregates, so the above range is preferable from the viewpoint of the balance between the coloring strength and the aggregation property. Note that the number-average particle size of the magnetic body can be measured with a transmission electron microscope.

Specifically, toner particles to be observed are sufficiently dispersed in an epoxy resin, and then the epoxy resin is cured in an atmosphere at a temperature of 40° C. for 2 days to obtain a cured product. The obtained cured product is made into a flaky sample by a microtome, and the diameters of 100 magnetic body particles in a visual field are measured in a photograph at a magnification of 10,000 to 40,000 times with a transmission electron microscope (TEM). Then, the number-average particle size is calculated based on the equivalent diameter of a circle equal to the projected area of the magnetic body. The particle size can also be measured by an image analyzer.

The magnetic body used in the toner of the present invention can be produced, for example, by the following method.

An alkali such as sodium hydroxide is added to an aqueous ferrous salt solution in an amount equivalent to or more than equivalent to an iron component to prepare an aqueous solution containing ferrous hydroxide. While the pH of the prepared aqueous solution is maintained at 7 or more, air is blown thereinto, and while the aqueous solution is heated to 70° C. or higher, an oxidation reaction of ferrous hydroxide is performed to produce seed crystals serving as cores of a magnetic iron oxide powder.

Next, an aqueous solution containing about 1 equivalent of ferrous sulfate based on the addition amount of the alkali previously added is added to the slurry-like liquid containing the seed crystals. While the pH of the liquid is maintained in a range of 5 to 10, the reaction of the ferrous hydroxide is allowed to proceed while blowing air, and the magnetic iron oxide powder is grown with the seed crystals as cores. At this time, the shape and magnetic properties of the magnetic body can be controlled by selecting arbitrary pH, reaction temperature, and stirring conditions.

As the oxidation reaction proceeds, the pH of the liquid shifts to the acidic side, but it is preferable that the pH of the liquid is not less than 5. The magnetic body thus obtained can be filtered, washed, and dried by standard methods to obtain the desired magnetic body. When the toner is produced in an aqueous medium in the present invention, the surface of the magnetic body is very preferably subjected to a hydrophobic treatment.

When the surface treatment is performed by a dry method, the washed, filtered, and dried magnetic body is subjected to a coupling agent treatment. When the surface treatment is performed by a wet method, after the completion of the oxidation reaction, the dried product is redispersed. Alternatively, after completion of the oxidation reaction, the iron oxide body obtained by washing and filtration is not dried and is redispersed in another aqueous medium to perform the coupling treatment. Note that a wet method may be used, and either a dry method or a wet method can be selected as appropriate.

The content of the magnetic body in the toner can be measured as follows using a thermal analyzer TGA7 manufactured by PerkinElmer, Inc.

The toner is heated from normal temperature to 900° C. at a temperature rise rate of 25° C./min under a nitrogen atmosphere. The weight loss (% by mass) from 100° C. to 750° C. is defined as the amount of binder resin, and the remaining mass is approximately defined as the amount of magnetic body.

(Charge Control Agent)

In order to stabilize chargeability, a charge control agent is preferably used. As such a charge control agent, any known charge control agents can be used alone or in combination.

In view of adaptability to color toner, for example, a quaternary ammonium salt compound is preferable as the positively chargeable charge control agent. The "adaptability to color toner" means that the charge control agent itself is colorless or light-colored and does not impair the color tone of the toner.

Preferred examples of the negatively chargeable charge control agent include metal salts and metal complexes of salicylic acid or alkylsalicylic acid with chromium, zinc, aluminum, or the like, metal salts and metal complexes of benzilic acid, amide compounds, phenol compounds, naphthol compounds, and phenolamide compounds. Alternatively, the negatively chargeable charge control agent may be a polymer exhibiting negative chargeability, such as a sulfonate, a carboxylate, and a halogen.

(3.1.7) Properties and the Like of Toner Particles

The toner particles may have a single-layer structure, or a so-called core-shell structure composed of a core (core particle) and a coating layer (shell layer) coating the core. The toner particles having a core-shell structure is preferably composed of a core containing, for example, a binder resin and, if necessary, other additives such as a colorant and a release agent, and a coating layer containing a binder resin.

The volume average particle size ($D_{50}v$) of the toner particles is preferably in a range of 2 to 10 μm, and more preferably in a range of 4 to 8 μm. Note that various average particle sizes and various particle size distribution indices of the toner particles are measured using a Coulter Multisizer II (manufactured by Beckman Coulter, Inc.) and ISOTON-II (manufactured by Beckman Coulter, Inc.) as an electrolyte.

In the measurement, a measurement sample is added in an amount in a range of 0.5 to 50 mg to 2 mL of a 5% aqueous surfactant solution as a dispersing agent. This is added into an electrolytic solution in a range of 100 to 150 mL. Note that the surfactant is preferably sodium alkylbenzene sulfonate.

The electrolytic solution in which the sample is suspended is subjected to a dispersion treatment for 1 minute with an ultrasonic disperser, and the particle size distribution of particles having a particle size in a range of 2 to 60 μm is measured with a Coulter Multisizer II using an aperture having an aperture diameter of 100 μm. Note that the number of particles to be sampled is 50000.

Cumulative distributions of volume and number are drawn from the small particle size side for particle size ranges (channels) divided on the basis of the measured particle size distribution. At this time, the particle size at cumulative 16% is defined as volume particle size $D_{16}v$, number particle size $D_{16}p$, the particle size at cumulative 50% is defined as volume average particle size $D_{50}v$, cumulative number average particle size $D_{50}p$, and the particle size at cumulative 84% is defined as volume particle size $D_{84}v$, number particle size $D_{84}p$. Using these, the volume average particle size distribution index (GSDv) is calculated as $(D_{84}v/D_{16}v)^{1/2}$, and the number average particle size distribution index (GSDp) is calculated as $(D_{84}p/D_{16}p)^{1/2}$.

(3.1.8) External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O—(TiO_2)_n$, $Al_2O_3 \cdot 2SiO_2$, $CaCO_3$, $MgCO_3$, $BaSO_4$ and $MgSO_4$ and inorganic chlorides such as titanates.

The surfaces of the inorganic particles as the external additive is preferably subjected to a hydrophobic treatment. The hydrophobic treatment of the surfaces of the inorganic particles is performed, for example, by immersing the inorganic particles in a hydrophobic treatment agent. The hydrophobic treatment agent is not particularly limited, and examples thereof include a silane-based coupling agent, a silicone oil, a titanate-based coupling agent, and an aluminum-based coupling agent. These hydrophobic treatment agents may be used alone or in combination of two or more kinds thereof. The amount of the hydrophobic treatment agent is usually, for example, in a range of 1 to 10 parts by mass relative to 100 parts by mass of the inorganic particles.

Examples of the external additive include resin particles and a cleaning lubricant. Examples of the resin particles include polystyrene, polymethyl methacrylate (PMMA), and melamine resins. Examples of the cleaning lubricant include metal salts of higher fatty acids, typified by zinc stearate, and fluorine-based polymer particles.

The addition amount of the external additive is, for example, preferably in a range of 0.01 to 5% by mass and more preferably in a range of 0.01 to 2.0% by mass with respect to the entirety of the toner particles.

(3.1.9) Method for Producing Toner for Developing Electrostatic Latent Image

Next, a method for manufacturing the toner according to the present embodiment will be described.

The toner according to the present embodiment is obtained by producing toner particles and then externally adding an external additive to the toner particles. The toner particles may be prepared by any one of a dry method (e.g., a kneading-pulverization method) and a wet method (e.g., an aggregation-coalescence method, a suspension polymerization method, and a dissolution-suspension method). The method for producing the toner particles is not particularly limited to these production methods, and well-known production methods are adopted. Some examples of the method for producing the toner particles are described below.

(3.1.9.1) Aggregation-Coalescence Method

The aggregation-coalescence method includes, for example, three steps of (1) a step of preparing a resin particle dispersion, (2) a step of forming aggregated particles, and (3) a step of fusion and coalescence. Details of each step are described below. Note that in the following description, a method for obtaining toner particles containing a colorant and a release agent will be described, but the colorant and the release agent are used as necessary. Of course, additives other than the colorant and the release agent may be used.

(1) Resin Particle Dispersion Preparation Step

The resin particle dispersion preparation step is a step of preparing a resin particle dispersion in which resin particles to be a binder resin are dispersed.

First, together with a resin particle dispersion in which resin particles serving as a binder resin are dispersed, for example, a colorant particle dispersion in which colorant particles are dispersed and a release agent particle dispersion in which release agent particles are dispersed are prepared. Here, the resin particle dispersion is prepared, for example, by dispersing resin particles in a dispersion medium with a surfactant.

(Dispersion Medium)

Examples of the dispersion medium for use in the resin particle dispersion include aqueous medium. Examples of the aqueous medium include water such as distilled water and ion-exchanged water, and alcohols. These may be used alone or in combination of two or more kinds thereof.

(Surfactant)

Examples of the surfactant include an anionic surfactant, a cationic surfactant, and a nonionic surfactant, and in particular, an anionic surfactant and a cationic surfactant are preferable. The nonionic surfactant may be used in combination with an anionic surfactant or a cationic surfactant. The surfactants may be used alone or in combination of two or more kinds thereof.

Examples of the anionic surfactant include sulfate ester salt-based, sulfonate salt-based, phosphate ester-based, and soap-based anionic surfactants.

Examples of the cationic surfactant include an amine salt type and a quaternary ammonium salt type.

Examples of the nonionic surfactant include polyethylene glycol-based, alkylphenol ethylene oxide adduct-based, and polyvalent alcohol-based surfactants.

(Distribution Method)

In the resin particle dispersion, examples of a method of dispersing the resin particles in the dispersion medium include general dispersion methods using, for example, a rotary shear-type homogenizer, or a ball mill, a sand mill, or a Dyno mill having media. In addition, depending on the type of the resin particles, the resin particles may be dispersed in the resin particle dispersion using, for example, a phase inversion emulsification method. Note that the phase inversion emulsification method is the following method.

A resin to be dispersed is dissolved in a hydrophobic organic solvent in which the resin is soluble, and a base is added to the organic continuous phase (O phase) for neutralization. Thereafter, by adding an aqueous medium (W phase), the resin is converted from W/O to O/W (so-called phase inversion) to form a discontinuous phase, and the resin is dispersed in the form of particles into the aqueous medium.

(Volume Average Particle Size of Resin Particles)

The volume average particle size of the resin particles dispersed in the resin particle dispersion is, for example, preferably in a range of 0.01 to 1 μm, more preferably in a range of 0.08 to 0.8 μm, and still more preferably in a range of 0.1 to 0.6 μm. The volume average particle size of the resin particles can be measured by a laser diffraction particle size distribution analyzer.

Example of the laser diffraction particle size distribution analyzer include "LA-700" (manufactured by Horiba, Ltd.). Using the particle size distribution obtained by measurement with the above-described analyzer, a cumulative distribution is drawn from the small particle size side for the volume with respect to the divided particle size ranges (channels). Then, the particle size at which the cumulative percentage is 50% with respect to all the particles is measured as the volume average particle size $D_{50}v$. Note that the volume average particle size of particles in other dispersions is also measured in the same manner.

(Content of Resin Particles)

The content of the resin particles in the resin particle dispersion is, for example, preferably in a range of 5 to 50% by mass and more preferably in a range of 10 to 40% by mass.

(Other Preparation Methods)

Note that, for example, a colorant particle dispersion and a release agent particle dispersion are also prepared in the same manner as the resin particle dispersion. That is, the same applies to the colorant particles dispersed in the colorant particle dispersion and the release agent particles dispersed in the release agent particle dispersion with respect to the volume average particle size of particles, the dispersion medium, the dispersing method, and the content of particles in the resin particle dispersion.

(2) Aggregated Particle Forming Step

The aggregated particle forming step is a step of aggregating resin particles in a resin particle dispersion to form aggregated particles. Note that the above-described resin particle dispersion may be a resin particle dispersion after being mixed with another particle dispersion, if necessary, and this may be aggregated to form aggregated particles.

Next, the resin particle dispersion, the colorant particle dispersion, and the release agent particle dispersion are mixed. Then, the resin particles, the colorant particles, and the release agent particles are heteroaggregated in the mixed dispersion to form aggregated particles containing the resin particles, the colorant particles, and the release agent particles and having a diameter close to the diameter of the target toner particles. Specifically, the aggregated particles are formed as follows.

For example, an aggregating agent is added to the mixed dispersion while the pH of the mixed dispersion is adjusted to be acidic, and a dispersion stabilizer is added as necessary. At this time, the pH is adjusted in a range of 2 to 5. Thereafter, the mixture is heated to the glass transition temperature of the resin particles to aggregate the particles dispersed in the mixed dispersion, thereby forming aggregated particles. At this time, the glass transition temperature is in a range of (glass transition temperature of resin particles −30° C.) to (glass transition temperature of resin particles −10° C.).

In the aggregated particle forming step, for example, the aggregating agent may be added to the mixed dispersion at room temperature (for example, 25° C.) while stirring the mixed dispersion with a rotary shear-type homogenizer, the pH of the mixed dispersion may be adjusted to be acidic (for example, in a range of pH 2 to 5), a dispersion stabilizer may be added as necessary, and then the heating may be performed.

(Aggregating Agent)

Examples of the aggregating agent include a surfactant having a polarity opposite to that of a surfactant used as a dispersant to be added to the mixed dispersion. Examples of the surfactant include inorganic metal salts and divalent or higher valent metal complexes. In particular, when a metal complex is used as the aggregating agent, the amount of surfactant used is reduced, and the charging characteristics are improved. An additive which forms a complex with a metal ion of the aggregating agent or a bond similar to the metal ion may be used as necessary. As the additive, a chelating agent is suitably used.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA). The addition amount of the chelating agent is, for example, preferably in a range of 0.01 to 5.0 parts by mass, and more preferably 0.1 parts by mass or more and less than 3.0 parts by mass, relative to 100 parts by mass of the resin particles.

(3) Fusion and Coalescence Step

The fusion and coalescence process is a step of heating the aggregated particle dispersion in which the aggregated particles are dispersed, fusing and coalescing the aggregated particles, and forming toner particles. After the aggregated particle forming step, the aggregated particle dispersion in which the aggregated particles are dispersed is heated, for example, to a temperature equal to or higher than the glass transition temperature of the resin particles to fuse and coalesce the aggregated particles, thereby forming toner particles. Through the above steps, toner particles are obtained. After the aggregated particle dispersion in which the aggregated particles are dispersed is obtained, the toner particles may be manufactured through a step of forming a second aggregated particles and a step of fusing and coalescing the second aggregated particles to form toner particles having a core/shell structure.

The step of forming the second aggregated particles is a step of further mixing the aggregated particle dispersion and the resin particle dispersion in which the resin particles are dispersed, and aggregating the resin particles so as to further attach the resin particles to the surfaces of the aggregated particles.

The step of fusing and coalescing the second aggregated particles to form toner particles having a core/shell structure is a step of heating the second aggregated particle dispersion in which the second aggregated particles are dispersed to fuse and coalesce the second aggregated particles to form toner particles having a core/shell structure.

Here, after the completion of the fusion and coalescence step, the toner particles formed in the solution are subjected to a known washing step, a solid-liquid separation step, and a drying step to obtain dry toner particles. In the washing step, sufficient displacement washing with ion-exchanged water is preferably performed from the viewpoint of chargeability. The solid-liquid separation step is not particularly limited, but suction filtration, pressure filtration, or the like is preferably performed from the viewpoint of productivity. The drying step is also not particularly limited, but freeze drying, flash jet drying, fluidized drying, vibrating fluidized drying, or the like is preferably performed from the viewpoint of productivity.

In the present embodiment, after the toner particles are prepared, the toner particles may be subjected to an annealing treatment under predetermined temperature conditions and heating time conditions. The toner according to the present embodiment is produced by, for example, adding an external additive to the obtained dry toner particles and mixing them.

The mixing is preferably performed using, for example, a V blender, a Henschel mixer, or a Lödige mixer. Furthermore, if necessary, coarse particles of the toner may be removed using a vibration sifter, a wind sifter, and the like.

(3.1.9.2) Pulverization Method

In the case of producing the toner by a pulverization method, first, the binder resin, the wax, the charge control agent, and the like contained in the toner particles are sufficiently mixed with a mixer such as a Henschel mixer or a ball mill to obtain a mixture. The toner particles may be magnetic toner particles, and may contain a magnetic body in addition to a binder resin, a wax, and a charge control agent.

Next, the obtained mixture is melted and kneaded by using a heat kneading machine such as a biaxial kneading extruder, a heating roll, a kneader, or an extruder, cooled and solidified, and then pulverized and classified. Thus, toner particles are obtained. The toner can be produced by externally adding and mixing an external additive to the obtained toner particles.

Examples of the mixer include Henschel mixer (manufactured by Mitsui Mining Co., Ltd.), Supermixer (manufactured by Kawata Mfg Co., Ltd.), Ribocone (manufactured by Ohkawara Seisakusho Co., Ltd.), Nauta mixer, Turbulizer, Cyclomix (manufactured by Hosokawa Micron Corporation), Spiral Pin Mixer (manufactured by Pacific Machinery & Engineering Co., Ltd.), and Loedige Mixer (manufactured by MATSUBO Corporation).

Examples of the kneader include a KRC kneader (manufactured by Kurimoto Iron Works, Ltd.), a Buss co kneader (manufactured by Buss), a TEM embosser (manufactured by Toshiba Machine Co., Ltd.), a TEX twin-screw kneader (manufactured by The Japan Steel Works, Ltd.), a PCM kneader (manufactured by Ikegai Iron Works, Ltd.), a three roll mill, a mixing roll mill, a kneader (manufactured by Inoue Seisakusho Co., Ltd.), a Kneadex (manufactured by Mitsui Mining Co., Ltd.), an MS type pressure kneader, a kneader-ruder (manufactured by Moriyama Seisakusho Co., Ltd.), and a Banbury mixer (manufactured by Kobe Steel Works, Ltd.).

Examples of the pulverizer include Counter Jet Mill, Micron Jet, innomizer (manufactured by Hosokawa Micron Corporation), IDS Mill, PJM Jet Pulverizer (manufactured by Nippon Pneumatic Mfg. Co., Ltd.), Cross Jet Mill (manufactured by Kurimoto, Inc.), Ulmax (manufactured by Nisso Engineering), SK Jet-O Mill (manufactured by Seishin Enterprise), Kryptron (manufactured by Kawasaki Heavy Industries, Ltd.), Turbo Mill (manufactured by Turbo Industries, Ltd.), and Super Rotor (manufactured by Nisshin Engineering).

Examples of the classifier include Classoil, Micron Classifier, Spedic Classifier (manufactured by Seishin Enterprise Co., Ltd.), Turbo Classifier (manufactured by Nisshin Engineering Inc.), Micron Separator, Turboplex (ATP), TSP Separator (manufactured by Hosokawa Micron Corporation), Elbow Jet (manufactured by Nittetsu Mining Co., Ltd.), Dispersion Separator (manufactured by Nippon Pneumatic Industries, Ltd.), and YM Microcut (manufactured by Yasukawa Shoji Co., Ltd.).

As a mixing treatment device for mixing the external additive, a known mixing treatment device such as the mixer described above can be used.

Note that in a case where the pulverized toner is designed to be soft, it is necessary to separately make the surfaces thereof hard, and therefore, there is also a technique of fixing and coating the surfaces of the pulverized toner with fine particles of silica or the like, for example, using fine particles of silica or the like, such as "X24", whose particle size distribution is uniform around 110 nm. Then, the toner base particles thus produced may be subjected to an external addition treatment for the purpose of a fluidizing agent.

(3.1.9.3) Suspension Polymerization Method

The method of producing toner particles by suspension polymerization includes a dissolution step of uniformly dissolving or dispersing these additives to obtain a polymerizable monomer composition, and a granulation step of dispersing and granulating the polymerizable monomer composition in an aqueous medium containing a dispersion stabilizer with a suitable stirrer. If necessary, this is a method of obtaining toner particles having a desired particle size through a polymerization reaction step of adding an aromatic solvent and a polymerization initiator to perform a polymerization reaction, a cooling step of controlling the existence position and size of fine domains of a crystalline material, and a holding (annealing) step of controlling the crystallinity of the crystalline material.

(3.1.9.4) Surface Modification of Toner

The toner produced by the above-described method can be produced, for example, by fixing the fine particles to the surface of the core. As a method for fixing the fine particles to the surface of the core, for example, the core material and the inorganic fine particles are uniformly mixed, and the inorganic fine particles are electrostatically attached to the surface of the core material to prepare an ordered mixture. Thereafter, mechanical or thermal impact force is applied to drive and fix the inorganic fine particles into the core material.

The inorganic fine particles are not completely embedded in the core material, but are fixed so that part of the inorganic particles protrude from the core material. Apparatuses for fixing inorganic fine particles in such a way are commercially available as a surface modifying apparatus or system. As such an apparatus, for example, the following are included.

(1) Apparatus or System for dry mechanochemical method: "Mechanochemical" available from Okada Seiko Co., Ltd., "Mechanofusion System" available from Hosokawa Micron Corporation (2) Apparatus or System for impact method in high-speed airflow: "Hybridization system" of Nara Machinery Co., Ltd., "Kryptron system" of Kawasaki Heavy Industries, Ltd.

(3) Apparatus or system for wet method: "Dispercoat" available from Nisshin Flour Milling Co., Ltd., "Coatmizer" available from Freund Corporation (4) Apparatus or system for heat treatment method: "Surfusing" manufactured by Nippon Pneumatic Mfg. Co., Ltd.

(5) Other devices or systems: "Spray Dry" available from Ohkawara Kakohki Co., Ltd.

(3.2) Developer

The electrostatic latent image developer according to the present embodiment includes at least the toner for developing an electrostatic latent image according to the present embodiment. The electrostatic latent image developer according to the exemplary embodiment may be a mono-component developer containing only the toner for developing an electrostatic latent image according to the present embodiment, or may be a two-component developer obtained by mixing the toner for developing an electrostatic latent image with a carrier.

(Carrier)

One of main roles of the carrier included in the two-component developer is to be stirred and mixed with the toner in the developing box to provide the toner with a desired charge. Another role of the carrier is to serve as an electrode between the developing machine and the photoreceptor and to function as a carrier substance (i.e., carrier) that transports the charged toner to an electrostatic latent image on the photoreceptor to form a toner image.

The carrier is held on the magnet roller by, for example, a magnetic force, acts on development, then returns to the developing box again, is stirred and mixed with new toner again, and is repeatedly used for a certain period. Therefore, in order to stably maintain desired image characteristics (image density, fogging, white spots, gradation, resolving power, and the like), it is naturally required that the characteristics of the carrier be stable during the period of use.

The carrier is not particularly limited, and examples thereof include known carriers. Examples of the carrier include coated carriers in which the surface of a core material formed of conductive particles or magnetic powder is coated with a coating resin, magnetic powder dispersion-type carriers in which magnetic powder is dispersed and blended in a matrix resin, and resin-impregnated carriers in which porous magnetic powder is impregnated with a resin. Note that the magnetic powder-dispersed carrier and the resin-impregnated carrier may be a carrier in which constituent particles of the carrier are cores and the cores are coated with a coating resin.

Examples of the conductive particles include particles of metals such as gold, silver, and copper, carbon black, titanium oxide, zinc oxide, tin oxide, barium sulfate, aluminum borate, and potassium titanate.

Examples of the magnetic powder include magnetic metals such as iron, nickel, and cobalt, and magnetic oxides such as ferrite and magnetic.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin containing an organosiloxane bond or a modified product thereof, a fluororesin, polyester, polycarbonate, a phenol resin, and an epoxy resin.

Note that the coating resin and the matrix resin may contain other additives such as a conductive material.

Here, in order to coat the surface of the core material with the coating resin, a method of coating with a coating layer forming solution in which the coating resin and, if necessary, various additives are dissolved in an appropriate solvent, and the like are exemplified. The solvent is not particularly limited, and may be selected in consideration of the coating resin to be used, coating suitability, and the like.

Specific examples of the resin coating method include a dipping method, a spraying method, a fluidized bed method, and a kneader coater method. The dipping method is a method of dipping the core material in the coating layer forming solution. The spraying method is a method of spraying the coating layer forming solution onto the surface of the core material. The fluidized bed method is a method of spraying the coating layer forming solution in a state where the core material is floated by fluidized air. The kneader coater method is a method in which the core material of the carrier and the coating layer forming solution are mixed in a kneader coater, and the solvent is removed.

The mixing ratio (weight ratio) between the toner and the carriers in the two-component developer is preferably toner: carrier=1:100 to 30:100, and more preferably 3:100 to 20:100.

EXAMPLES

Hereinafter, the present invention will be specifically described with reference to Examples, but the present invention is not limited thereto. In Examples, "part(s)" or "%" means "part(s) by mass" or "% by mass" unless otherwise specified. A pH value is a value measured at 25° C., unless otherwise noted.

A. Production of Developing Roller (A.1) Production of Developing Roller 1

(A.1.1) Production of Developing Sleeve 1

A developing sleeve 1 was produced according to the following procedure.

(Preparation of Support)

A cylindrical support made of an aluminum alloy was prepared. The silicon content in the aluminum alloy of this cylindrical support is 0.61% by mass. The cylindrical support is a thin-walled cylindrical support having an outer diameter of 16 mm, an inner diameter of 14 mm, and a thickness of 1 mm.

(Sandblasting Treatment)

Glass beads were ejected onto the above-described cylindrical support made of an aluminum alloy with a blast gun to perform sandblasting treatment on the outer circumferential surface of the cylinder, thereby producing a developing sleeve 1. The processing conditions of the sandblasting treatment were as follows.

<Processing Conditions>

Type of glass beads: FGB #80 (manufactured by Fuji Manufacturing Co., Ltd.)

Feed rate of glass beads: 200 g/min

Ejection distance from blast gun to cylinder: 100 mm

Movement speed of blast gun: 5.0 cm/sec

Compressed air pressure: 0.23 MPa

Rotation speed of cylinder: 545 rpm (A.1.2) Installation of Magnet Roller

A developing roller 1 was produced by providing a magnet roller inside the above-described developing sleeve 1 as illustrated in FIG. 2.

(A.2) Production of Developing Rollers 2 to 12

Developing sleeves 2 to 12 were produced in the same manner as the production procedure of the developing sleeve 1 except that the content of silicon in the aluminum alloy was changed to the amount listed in Table I. Installation of a magnet roller was also performed in the same manner as in the case of the developing roller 1, and thus developing rollers 2 to 12 were produced.

TABLE I

| | | ALUMINUM ALLOY | |
|---|---|---|---|
| DEVELOPING ROLLER NO. | DEVELOPING SLEEVE NO. | Si CONTENT [% BY MASS] | Li |
| 1 | 1 | 0.61 | 0.19 |
| 2 | 2 | 0.81 | 0.00 |
| 3 | 3 | 4.82 | 0.00 |
| 4 | 4 | 12.60 | 0.42 |
| 5 | 5 | 25.00 | 0.23 |
| 6 | 6 | 29.50 | 1.20 |
| 7 | 7 | 38.20 | 0.95 |
| 8 | 8 | 0.61 | 0.19 |
| 9 | 9 | 0.81 | 0.00 |
| 10 | 10 | 4.82 | 0.00 |
| 11 | 11 | 0.00 | 0.00 |
| 12 | 12 | 0.50 | 0.50 |

IN THE TABLE, "Si" REPRESENTS SILICON, AND "Li" REPRESENTS LITHIUM.

B. Production of Toner (B.1) Resin and Dispersion to be Used for Each Toner (Preparation for Production of Toners 1 to 3)

(B.1.1) Amorphous Polyester (B.1.1.1) Production of Each Amorphous Polyester (Production of Amorphous Polyester [a1])

The following components were charged into a reaction vessel equipped with a stirrer, a thermometer, a condenser, and a nitrogen gas introducing tube, the inside of the reaction vessel was replaced with dry nitrogen gas, and then tin dioctanoate was charged in an amount of 0.3% based on the total amount of the components.

<Components>

| | |
|---|---|
| Ethylene glycol | 106 parts by mass |
| Dimethyl terephthalate | 245 parts by mass |
| 1,10-Decanedicarboxylic acid | 105 parts by mass |

Under a nitrogen gas flow, the temperature was raised to 235° C. over 1 hour, and the mixture was reacted for 3 hours. The pressure in the reaction vessel was reduced to 10.0 mmHg, and the mixture was stirred and reacted. When a desired molecular weight was obtained, the reaction was terminated to produce an amorphous polyester [a1].

(Production of Amorphous Polyester [a2])

An amorphous polyester [a2] was produced in the same manner as the amorphous polyester [a1] except that the following components were charged.

<Components>

| | |
|---|---|
| Bisphenol A ethylene oxide adduct | 30 parts by mass |
| Bisphenol A propylene oxide adduct | 270 parts by mass |
| Terephthalic acid | 60 parts by mass |
| Fumaric acid | 40 parts by mass |
| Tetrapropenylsuccinic anhydride | 40 parts by mass |

(Production of Amorphous Polyester [a3])

An amorphous polyester [a3] was produced in the same manner as the amorphous polyester [a1] except that the following components were charged.

<Components>

| | |
|---|---|
| Bisphenol A ethylene oxide adduct | 210 parts by mass |
| Bisphenol A propylene oxide adduct | 230 parts by mass |
| Terephthalic acid | 30 parts by mass |
| Fumaric acid | 135 parts by mass |
| Tetrapropenylsuccinic anhydride | 40 parts by mass |

(Production of Amorphous Polyester [a4])

An amorphous polyester [a4] was produced in the same manner as the amorphous polyester [a1] except that the following components were charged.

<Components>

| | |
|---|---|
| Bisphenol A ethylene oxide adduct | 150 parts by mass |
| Bisphenol A propylene oxide adduct | 250 parts by mass |
| Terephthalic acid | 100 parts by mass |
| Tetrapropenylsuccinic anhydride | 130 parts by mass |
| Trimellitic acid | 15 parts by mass |

(Production of Amorphous Polyester [a5])

An amorphous polyester [a5] was produced in the same manner as the amorphous polyester [a1] except that the following components were charged.

<Components>

| | |
|---|---|
| Bisphenol A propylene oxide adduct | 350 parts by mass |
| Terephthalic acid | 35 parts by mass |
| Fumaric acid | 90 parts by mass |
| Tetrapropenylsuccinic anhydride | 13 parts by mass |

(B.1.1.2) Preparation of Each Amorphous Polyester Dispersion (Preparation of Amorphous Polyester Dispersion (A1))

The following components were charged into a reaction vessel equipped with a stirrer and dissolved at 60° C.

<Components>

| | |
|---|---|
| Amorphous polyester [a1] | 100 parts by mass |
| Methyl ethyl ketone | 60 parts by mass |
| Isopropyl alcohol | 10 parts by mass |

After dissolution was confirmed, the reaction vessel was cooled to 35° C., and then 3.5 parts by mass of a 10% aqueous ammonia solution was added. Then, 300 parts by mass of ion-exchanged water was added dropwise to the reaction vessel over 3 hours. Next, methyl ethyl ketone and isopropyl alcohol were removed by an evaporator to prepare an amorphous polyester dispersion (A1).

(Preparation of Amorphous Polyester Dispersion (A2))

An amorphous polyester dispersion (A2) was prepared in the same manner as the amorphous polyester dispersion (A1) except that the amorphous polyester [a2] was used in place of the amorphous polyester [a1].

(Preparation of Amorphous Polyester Dispersion (A3))

An amorphous polyester dispersion (A3) was prepared in the same manner as the amorphous polyester dispersion (A1) except that the amorphous polyester [a3] was used in place of the amorphous polyester [a1].

(Preparation of Amorphous Polyester Dispersion (A4))

An amorphous polyester dispersion (A4) was prepared in the same manner as the amorphous polyester dispersion (A1) except that the amorphous polyester [a4] was used in place of the amorphous polyester [a1].

(Preparation of Amorphous Polyester Dispersion (A5))

An amorphous polyester dispersion (A5) was prepared in the same manner as the amorphous polyester dispersion (A1) except that the amorphous polyester [a5] was used in place of the amorphous polyester [a1].

(B.1.2) Crystalline Polyester (B.1.2.1) Production of Each Crystalline Polyester (Production of Crystalline Polyester [c1])

The following components were introduced into a reaction vessel equipped with a stiffer, a thermometer, a condenser, and a nitrogen gas introducing tube, the inside of the reaction vessel was substituted with dry nitrogen gas, and then 0.3 parts by mass of tin dioctanoate was introduced relative to 100 parts by mass of the following components.

<Components>

| | |
|---|---|
| 1,10-Decanedicarboxylic acid | 300 parts by mass |
| Ethylene glycol | 100 parts by mass |

The mixture was stirred and reacted at 160° C. for 3 hours under a nitrogen gas flow, the temperature was further increased to 180° C. over 1.5 hours, the pressure in the reaction vessel was reduced to 3 kPa, and the reaction was terminated when a desired molecular weight was obtained to produce a crystalline polyester [c1].

(Production of Crystalline Polyester [c2])

A crystalline polyester [c2] was produced in the same manner as the crystalline polyester [c1] except that the following components were charged.

<Components>

| | |
|---|---|
| 1,10-Decanedicarboxylic acid | 350 parts by mass |
| 1,6-Hexanediol | 170 parts by mass |

(Production of Crystalline Polyester [c3])

A crystalline polyester [c3] was produced in the same manner as the crystalline polyester [c1] except that the following components were charged.

<Components>

| | |
|---|---|
| 1,10-Decanedicarboxylic acid | 350 parts by mass |
| 1,9-Nonanediol | 240 parts by mass |

(B.1.2.2) Preparation of Each Crystalline Polyester Dispersion (Preparation of Crystalline Polyester Dispersion (C1))

The following components were charged into a reaction vessel equipped with a stiffer and dissolved at 65° C.

<Components>

| | |
|---|---|
| Crystalline polyester [c1] | 100 parts by mass |
| Methyl ethyl ketone | 60 parts by mass |
| Isopropyl alcohol | 15 parts by mass |

After dissolution was confirmed, the reaction vessel was cooled to 60° C., and then 5 parts by mass of a 10% aqueous ammonia solution was added. Then, 300 parts by mass of ion-exchanged water was added dropwise to the reaction vessel over 3 hours. Next, methyl ethyl ketone and isopropyl alcohol were removed by an evaporator to prepare a crystalline polyester dispersion (C1).

(Preparation of Crystalline Polyester Dispersion (C2))

A crystalline polyester dispersion (C2) was prepared in the same manner as the crystalline polyester dispersion (C1) except that the crystalline polyester [c2] was used in place of the crystalline polyester [c1].

(Preparation of Crystalline Polyester Dispersion (C3))

A crystalline polyester dispersion (C3) was prepared in the same manner as the crystalline polyester dispersion (C1) except that the crystalline polyester [c3] was changed to the crystalline polyester [c1].

(B.1.3) Styrene-Acrylic Copolymer Resin (Preparation of Styrene-Acrylic Copolymer Resin Dispersion (S1))

The following components were charged into a vessel and emulsified by using a homogenizer to prepare a monomer emulsion (S).

<Components>

| | |
|---|---|
| Styrene | 126 parts by mass |
| n-Butyl acrylate | 14 parts by mass |
| Dodecanethiol | 2.1 parts by mass |
| Isopropyl alcohol | 0.88 parts by mass |
| Anionic surfactant (Dowfax, manufactured by Dow Chemical Company) | 4 parts by mass |
| Ion-exchanged water | 59.2 parts by mass |

On the other hand, the following components were charged into a reaction vessel for polymerization.

<Components>

| | |
|---|---|
| Anionic surfactant (Dowfax, available from Dow Chemical Company) | 0.6 parts by mass |
| Ion-exchanged water | 133 parts by mass |

Thereafter, a reflux tube was installed, the mixture was slowly stirred while injecting nitrogen, and the flask for polymerization was heated to 75° C. in a water bath and held. Into this vessel, 10 parts by mass of the monomer emulsion (S) was added dropwise over 10 minutes using a metering pump.

Next, 1.05 parts by mass of ammonium persulfate was dissolved in 10 parts by mass of ion-exchanged water, and the mixture was added dropwise to the flask for polymerization over 10 minutes using a metering pump. In this state, stirring was continued for 1 hour. Further, the remaining monomer emulsion (S) was added dropwise over 2 hours using a metering pump.

After completion of the addition of all, the stirring was further continued for 3 hours to prepare a styrene-acrylic copolymer resin dispersion (S1).

(B.1.4) Release Agent Dispersion (Preparation of Release Agent Dispersion (W1))

The following components were mixed, the release agent was dissolved at an internal liquid temperature of 120° C. with a pressure-ejection type homogeniser (Gaulin homogeniser, manufactured by Gaulin), then the mixture was dispersed with a dispersion-pressure of 5 MPa for 120 minutes and subsequently 40 MPa for 360 minutes and cooled to prepare a release agent dispersion (W1).

<Components>

| | |
|---|---|
| Hydrocarbon-based wax | 270.0 parts by mass |
| Anionic surfactant (3.0% as an active ingredient with respect to release agent) | 13.5 parts by mass |
| Ion-exchanged water | 700.0 parts by mass |

Note that the hydrocarbon-based wax in the above components is "FNP0090" (manufactured by Nippon Seiro Co., Ltd.) having a melting temperature Tw of 90.2° C.

The anionic surfactant in the above components is "TAYCA Power BN2060" (manufactured by Tayca Corporation) having an active ingredient amount of 60%.

The volume average particle size $D_{50}v$ of the particles in the release agent dispersion (W1) was 220 nm.

Thereafter, ion-exchanged water was added to adjust the solid content concentration to 20.0%.

(B.1.5) Colorant Dispersion (Preparation of Black Colorant Dispersion (B1))

The following components were charged into a stainless steel vessel having a size such that a liquid level became ⅓ of a height of the vessel when all of the following components were charged, then 280 parts by mass of ion-exchanged water and an anionic surfactant were added, and the surfactant was sufficiently dissolved.

Thereafter, all of the pigments were charged, and the mixture was stirred with a stirrer until no more unwetted pigments remained, then the remainder of the ion-exchanged water was added, and the mixture was further stirred to be fully defoamed.

<Components>

| | |
|---|---|
| Carbon black | 200 parts by mass |
| Anionic surfactant (10% as an active ingredient with respect to colorant) | 33 parts by mass |
| Ion-exchanged water | 750 parts by mass |

Note that the carbon black in the above components is "REGAL330" (manufactured by Cabot Corp.).

The anionic surfactant in the above components is "Neogen SC" (manufactured by Dai-ichi Kogyo Seiyaku Co., Ltd.) having an active ingredient amount of 60%.

After the defoaming, the mixture was dispersed at 5000 rpm for 10 minutes using a homogeniser "Ultra-Turrax T50" (manufactured by Ika-Werke GmbH & Co. KG), and then stirred for 24 hours with a stirrer to be defoamed.

After the defoaming, the mixture was dispersed again at 6000 rpm for 10 minutes using a homogeniser, and then stirred for 24 hours with a stirrer to be defoamed.

After defoaming, the mixture was dispersed with a pressure of 240 MPa using a high-pressure impact type dispersing machine Ultimizer "HJP30006" (manufactured by Sugino Machine Limited). The dispersion was performed correspondingly to 25 passes based on the calculation from the total charged amount and the processing capacity of the apparatus.

The obtained dispersion was allowed to stand for 72 hours, precipitates were removed, and ion-exchanged water was added to adjust the solid concentration to 15% to prepare a black colorant particle-dispersion (B1). The volume average particle size $D_{50}v$ of the particles in the black colorant particle-dispersion (B1) was 110 nm.

(B.2) Production of Toner 1

(Production of Toner Base Particles [1])

As toner core components, the respective dispersions were weighed so that the solid contents became the following amounts.

<Core Components>

| | |
|---|---|
| Amorphous polyester [a1] | 47.5 parts by mass |
| Crystalline polyester [c1] | 22.0 parts by mass |
| Black colorant [B1] (solid content) | 6.0 parts by mass |
| Release agent [W1] (solid content) | 1.5 parts by mass |

Each dispersion was charged into a round stainless steel flask, then ion-exchanged water was added thereto so that the solid content concentration becomes 12.5%, and 6.3 parts of a 10% aqueous aluminum sulfate solution was further charged thereinto. Next, the mixture was mixed and dispersed at 5000 rpm for 10 minutes using a homogeniser (Ultra-Turrax T50, manufactured by IKA), and then the content in the flask was heated and stirred to 40° C. while being stirred.

Thereafter, the temperature was raised at 0.5° C. per minute, and the temperature was maintained when the particle size reached 6.1 μm. Next, the respective dispersions were weighed and mixed so that the solid content as the toner shell component became the following amount, and the mixed dispersion was charged and held for 60 minutes.

<Shell Components>

| | |
|---|---|
| Amorphous polyester [a5] | 20 parts by mass |
| Release agent dispersion [W1] (solid content) | 3 parts by mass |

The obtained content was observed with an optical microscope, and it was confirmed that aggregated particles were generated.

After 11 parts of ethylenediaminetetraacetic acid (EDTA) tetrasodium salt "Chelest 40" (manufactured by Chelest Corporation) was added, an aqueous sodium hydroxide solution was added to adjust the pH to 8. Thereafter, the temperature was raised to 82.5° C., then the pH was lowered by 0.05 per 10 minutes with nitric acid, and stirring was continued for 45 minutes. After cooling, the mixture was filtered, thoroughly washed with ion-exchanged water and dried to prepare toner base particles [1].

(Addition of External Additive)

To 100 parts by mass of the toner base particles [1] obtained as described above, 1.5 parts by mass of hydrophobic silica "RY50" (manufactured by Nippon Aerosil Co., Ltd.) was added, and the mixture was mixed at 13000 rpm for 30 seconds using a sample mill. Thereafter, the resultant was sieved with a vibration sieve having an opening of 45 μm to prepare a toner 1.

(Measurement of Glass Transition Temperature)

The glass transition temperature (Tg) of the toner 1 was 0.4° C.

Note that the glass transition temperatures of the toner 1 and the other toners were measured by differential scanning calorimetry in accordance with JIS K7121-1987. Specifically, the measurement was performed as follows.

A substance to be measured (each toner) was set in a differential scanning calorimeter "DSC-50 type" (manufactured by Shimadzu Corp.) equipped with an automatic tangential treatment system. Liquid nitrogen was set as a cooling medium.

The sample was heated from 0° C. to 150° C. at a temperature increase rate of 10° C./min (first temperature increase process) to determine the relationship between the temperature (° C.) and the heat amount (mW).

Next, the sample was cooled to 0° C. at a temperature decrease rate of −10° C./min, and heated again to 150° C. at a temperature increase rate of 10° C./min (second temperature increase process) to collect data. Note that the temperature was held at 0° C. and 150° C. for 10 minutes each.

The melting temperature of the mixture of indium and zinc was used for temperature correction of the detector of the measurement apparatus, and the heat of fusion of indium was used for correction of the amount of heat.

The sample was placed in an aluminum pan, and the aluminum pan containing the sample and an empty aluminum pan for control were set.

The glass transition temperature was defined as the temperature at the intersection of the extension lines of the base line and the rising line in the endothermic part of the DSC curve obtained in the second temperature increase process.

(B.3) Production of Toners 2 and 3

Toner base particles [2] and [3] were produced in the same manner as in the Production of the toner base particles [1] so that the components of the toner base particles were as shown in Table II.

Note that the solid content [S1] of the styrene-acrylic copolymer resin dispersion (S1) in the production of the toner base particles [2] was 4.5 parts by mass.

TABLE II

| TONER BASE PARTICLES NO. | | | [1] | [2] | [3] |
|---|---|---|---|---|---|
| CORE | AMORPHOUS PEs | [a1] | 47.5 | — | — |
| | | [a2] | — | 23.0 | — |
| | | [a3] | — | 23.0 | — |
| | | [a4] | — | — | 26.0 |
| | | [a5] | — | — | 26.0 |
| | CRYSTALLINE PEs | [c1] | 22.0 | 20.0 | — |
| | | [c2] | — | — | 19.5 |
| | | [c3] | — | — | — |
| | St•Ac | [S1] | — | 4.5 | — |
| | RELEASE AGENT | [W1] | 1.5 | 1.5 | 1.5 |
| | COLORANT | [B1] | 6.0 | 6.0 | 6.0 |
| SHELL | AMORPHOUS PEs | [a1] | — | — | — |
| | | [a2] | — | — | — |
| | | [a3] | — | — | — |
| | | [a4] | — | — | — |
| | | [a5] | 20.0 | 19.0 | 18.0 |
| | RELEASE AGENT | | 3.0 | 3.0 | 3.0 |

THE NUMBERS IN THE TABLE REPRESENT THE ADDITION AMOUNTS [PARTS BY MASS].
IN THE TABLE, “PEs” REPRESENTS POLYESTER, AND “St•Ac” REPRESENTS STYRENE-ACRYLIC RESIN.

Toners 2 and 3 were produced by adding the external additive to the above-described toner base particles [2] and [3], and the glass transition temperatures (Tg) were measured.

The type and addition amount of the external additive, the polyester content in the toner containing the external additive, and the glass transition temperature of each of the toners 1 to 3 are shown in Table III.

TABLE III

| TONER NO. | 1 | 2 | 3 |
|---|---|---|---|
| ADDITION AMOUNT OF EXTERNAL ADDITIVE (HYDROPHOBIC SILICA “RY50”) [PARTS BY MASS] | 1.5 | 1.5 | 1.5 |
| CONTENT OF Pes IN TONER INCLUDING EXTERNAL ADDITIVE [% BY MASS] | 88.2 | 83.7 | 88.2 |
| GLASS TRANSITION TEMPERATURE [° C.] | 0.4 | 24.8 | 37.8 |

IN THE TABLE, “PEs” REPRESENTS POLYESTER, AND “St•Ac” REPRESENTS STYRENE-ACRYLIC RESIN.

(B.4) Resin and Dispersion to be Used for Each Toner (Preparation for Production of Toners 4 to 6)

(B.4.1) Amorphous Polyester (Production of Amorphous Polyester [a7])

The following components were added to a 5 L four-necked flask equipped with a nitrogen introducing tube, a dewatering tube, a stirrer, and a thermocouple, and allowed to react under normal pressure at 230° C. for 10 hours.

<Components>

| | |
|---|---|
| Ethylene glycol | 106 parts by mass |
| Dimethyl terephthalate | 245 parts by mass |
| 1,10-Decanedicarboxylic acid | 105 parts by mass |
| Dibutyltin oxide | 2 parts by mass |

Thereafter, the mixture was reacted under reduced pressure of 10 to 15 mmHg for 5 hours, 30 parts by mass of trimellitic anhydride was added to the reaction vessel, and the mixture was reacted at 180° C. under normal pressure for 3 hours to produce an amorphous polyester [a7] that is a low molecular weight polyester having a hydroxyl group.

(Production of Amorphous Polyester [a8])

The following components were added to a 5 L four-necked flask equipped with a nitrogen introducing tube, a dewatering tube, a stiffer, and a thermocouple, and allowed to react under normal pressure at 230° C. for 10 hours.

<Components>

| | |
|---|---|
| Bisphenol A ethylene oxide 2 mol adduct | 229 parts by mass |
| Bisphenol A propylene oxide 3 mol adduct | 529 parts by mass |
| Isophthalic acid | 100 parts by mass |
| Terephthalic acid | 108 parts by mass |
| Adipic acid | 46 parts by mass |
| Dibutyltin oxide | 2 parts by mass |

Thereafter, the mixture was reacted under reduced pressure of 10 to 15 mmHg for 5 hours, 30 parts by mass of trimellitic anhydride was added to the reaction vessel, and the mixture was reacted at 180° C. under normal pressure for 3 hours to produce an amorphous polyester [a8] that is a low molecular weight polyester having a hydroxyl group.

(Production of Amorphous Polyester [a9])

The following components were placed in a 5 L four-necked flask equipped with a nitrogen introducing tube, a dewatering tube, a stirrer, and a thermocouple, and allowed to react under normal pressure at 240° C. for 10 hours.

<Components>

| | |
|---|---|
| Bisphenol A ethylene oxide 2 mol adduct | 235 parts by mass |
| Bisphenol A propylene oxide 3 mol adduct | 535 parts by mass |
| Terephthalic acid | 215 parts by mass |
| Adipic acid | 50 parts by mass |
| Dibutyltin oxide | 3 parts by mass |

Thereafter, the mixture was reacted under reduced pressure of 10 to 20 mmHg for 5 hours, 45 parts by mass of trimellitic anhydride was added to the reaction vessel, and the mixture was reacted at 185° C. under normal pressure for 3 hours to produce an amorphous polyester [a9] that is a low molecular weight polyester having a hydroxyl group.

(B.4.2) Crystalline polyester (B.4.2.1) Production of Each Crystalline Polyester (Production of Crystalline Polyester [c4])

The following components were placed in a 5 L four-necked flask equipped with a nitrogen introducing tube, a dewatering tube, a stiffer and a thermocouple, and reacted at 180° C. for 10 hours.

<Components>

| | |
|---|---|
| 1,10-Decanedioic acid | 2300 g |
| 1,8-Octanediol | 2530 g |
| Hydroquinone | 4.9 g |

Thereafter, the temperature was raised to 200° C., and the mixture was reacted for 3 hours, and further reacted at 8.3 kPa for 2 hour to prepare a crystalline polyester [c4].

(Production of Crystalline Polyester [c5])

A crystalline polyester [c5] was produced in completely the same manner as the crystalline polyester [c4].

(Production of Crystalline Polyester [c6])

The following components were placed in a 5 L four-necked flask equipped with a nitrogen introducing tube, a dewatering tube, a stirrer, and a thermocouple, and reacted at 150° C. for 6 hours.

<Components>

| | |
|---|---|
| 1,4-Butanediol | 50 mol |
| Fumaric acid | 50 mol |
| Hydroquinone | 6.0 g |

Thereafter, the temperature was raised to 200° C., and the mixture was reacted for 1 hour, and further reacted at 8.3 kPa for 1 hour to prepare a crystalline polyester [c6].

(B.4.2.2) Preparation of Each Crystalline Polyester Dispersion (Preparation of Crystalline Polyester Dispersion (C4))

The following components were placed in a 2 L metal vessel, heated and dissolved at 75° C., and then rapidly cooled at a rate of 27° C./min in an ice water bath.

<Components>

| | |
|---|---|
| Crystalline polyester [c4] | 100 g |
| Ethyl acetate | 400 g |

Thereafter, 500 mL of glass beads (3 mmφ) were added, and the mixture was pulverized for 10 hours with a batch-type sand mill device (manufactured by Kanpe Hapio Co., Ltd.) to prepare a crystalline polyester dispersion (C4).

(Preparation of Crystalline Polyester Dispersion (C5))

The following components were placed in a 2 L metal vessel, heated and dissolved at 75° C., and then rapidly cooled at a rate of 27° C./min in an ice water bath.

<Components>

| | |
|---|---|
| Crystalline polyester [c5] | 100 g |
| Ethyl acetate | 400 g |

Thereafter, 500 mL of glass beads (3 mmφ) were added, and the mixture was pulverized for 10 hours with a batch-type sand mill device (manufactured by Kanpe Hapio Co., Ltd.) to prepare a crystalline polyester dispersion (C5).

(Preparation of Crystalline Polyester Dispersion (C6))

The following components were placed in a 2 L metal vessel, heated and dissolved at 80° C., and then rapidly cooled at a rate of 27° C./min in an ice water bath.

<Components>

| | |
|---|---|
| Crystalline polyester [c6] | 110 g |
| Ethyl acetate | 450 g |

Thereafter, 500 mL of glass beads (3 mmφ) were added, and the mixture was pulverized for 10 hours with a batch-type sand mill device (manufactured by Kanpe Hapio Co., Ltd.) to prepare a crystalline polyester dispersion (C6).

(B.4.3) Polyester Prepolymer (B.4.3.1) Production of Intermediate Polyester (Production of Intermediate Polyester [p1])

The following components were placed in a reaction vessel equipped with a cooling tube, a stirrer, and a nitrogen introducing tube, and reacted at 230° C. under normal pressure for 8 hours.

<Components>

| | |
|---|---|
| Ethylene glycol | 106 parts by mass |
| Dimethyl terephthalate | 245 parts by mass |
| 1,10-Decanedicarboxylic acid | 105 parts by mass |
| Dibutyltin oxide | 2 parts by mass |

Thereafter, the mixture was reacted under reduced pressure of 10 to 15 mmHg for 5 hours to produce an intermediate polyester [p1].

(Production of Intermediate Polyester [p2])

The following components were placed in a reaction vessel equipped with a cooling tube, a stirrer, and a nitrogen introducing tube, and reacted at 230° C. under normal pressure for 8 hours.

<Components>

| | |
|---|---|
| Bisphenol A ethylene oxide 2 mol adduct | 682 parts by mass |
| Bisphenol A propylene oxide 2 mol adduct | 81 parts by mass |
| Terephthalic acid | 283 parts by mass |
| Trimellitic anhydride | 22 parts by mass |
| Dibutyltin oxide | 2 parts by mass |

Thereafter, the mixture was reacted under reduced pressure of 10 to 15 mmHg for 5 hours to produce an intermediate polyester [p2].

(Production of Intermediate Polyester [p3])

The following components were placed in a reaction vessel equipped with a cooling tube, a stirrer, and a nitrogen introducing tube, and reacted at 240° C. under normal pressure for 10 hours.

<Components>

| | |
|---|---|
| Bisphenol A ethylene oxide 2 mol adduct | 700 parts by mass |
| Bisphenol A propylene oxide 2 mol adduct | 85 parts by mass |
| Terephthalic acid | 300 parts by mass |
| Trimellitic anhydride | 25 parts by mass |
| Dibutyltin oxide | 3 parts by mass |

Thereafter, the mixture was reacted under reduced pressure of 10 to 20 mmHg for 6 hours to produce an intermediate polyester [p3].

(B.4.3.2) Preparation of Polyester Prepolymer Dispersion (Preparation of Polyester Prepolymer Dispersion (P1))

Next, the following components were placed in a reaction vessel equipped with a cooling tube, a stirrer, and a nitrogen introducing tube, and allowed to react at 100° C. for 5 hours.

<Components>

| | |
|---|---|
| Intermediate polyester [p1] | 410 parts by mass |
| Isophorone diisocyanate | 89 parts by mass |
| Ethyl acetate | 500 parts by mass |

Thus, a polyester prepolymer dispersion (P1) having an isocyanate group was prepared.

(Preparation of Polyester Prepolymer Dispersion (P2))

Next, the following components were placed in a reaction vessel equipped with a cooling tube, a stirrer, and a nitrogen introducing tube, and allowed to react at 100° C. for 5 hours.

<Components>

| | |
|---|---|
| Intermediate polyester [p2] | 410 parts by mass |
| Isophorone diisocyanate | 89 parts by mass |
| Ethyl acetate | 500 parts by mass |

Thus, a polyester prepolymer dispersion (P2) having an isocyanate group was prepared.

(Preparation of Polyester Prepolymer Dispersion (P3))

Next, the following components were placed in a reaction vessel equipped with a cooling tube, a stiffer, and a nitrogen introducing tube, and reacted at 110° C. for 6 hours.

<Components>

| | |
|---|---|
| Intermediate polyester [p3] | 400 parts by mass |
| Isophorone diisocyanate | 90 parts by mass |
| Ethyl acetate | 500 parts by mass |

Thus, a polyester prepolymer dispersion (P3) having an isocyanate group was obtained.

(B.4.4) Ketimine Compound (Synthesis of Ketimine Compound (K1))

The following components were charged into a reaction vessel in which a stirring rod and a thermometer were set, and reacted at 50° C. for 5 hours to synthesize a ketimine compound (K1).

<Components>

| | |
|---|---|
| Isophoronediamine | 170 parts by mass |
| Methyl ethyl ketone | 75 parts by mass |

(Synthesis of Ketimine Compound (K2))

A ketimine compound (K2) was synthesized in completely the same manner as the ketimine compound (K1).

(Synthesis of Ketimine Compound (K3))

The following components were charged into a reaction vessel in which a stirring rod and a thermometer were set, and reacted at 50° C. for 6 hours to synthesize a ketimine compound (K3).

<Components>

| | |
|---|---|
| Isophoronediamine | 180 parts by mass |
| Methyl ethyl ketone | 80 parts by mass |

(B.4.5) Aqueous Phase (B.4.5.1) Preparation of Fine Particle Dispersion for Aqueous Phase Preparation (Preparation of Organic Fine Particle Emulsion (1))

The following components were charged into a reaction vessel in which a stirring rod and a thermometer were set, and the mixture was stirred at 400 rpm for 15 minutes to obtain a white emulsion.

<Components>

| | |
|---|---|
| Water | 683 parts by mass |
| "ELEMINOL RS-30" (manufactured by Sanyo Chemical Industries, Ltd.) | 11 parts by mass |
| Styrene | 138 parts by mass |
| Methacrylic acid | 138 parts by mass |
| Ammonium persulfate | 1.0 part by mass |

Note that "ELEMINOL RS-30" (manufactured by Sanyo Chemical Industries, Ltd.) in the above components is a sodium salt of methacrylic acid ethylene oxide adduct sulfate ester.

The white emulsion was heated to a system temperature of 75° C. and reacted for 5 hours. Furthermore, 30 parts by mass of a 1% aqueous ammonium persulfate solution was added, and the mixture was aged at 75° C. for 5 hours to prepare an organic fine particle emulsion (1) that is an aqueous dispersion of a vinyl-based resin. The vinyl-based resin is a copolymer of styrene-methacrylic acid-sodium salt of methacrylic acid ethylene oxide adduct sulfate ester.

When the organic fine particle emulsion (1) was measured with a laser diffraction/scattering particle size distribution analyzer "LA-920" (manufactured by Horiba, Ltd.), the volume average particle size was 0.14 μm.

(Preparation of Organic Fine Particle Emulsion (2))

The following components were charged into a reaction vessel in which a stirring rod and a thermometer were set, and the mixture was stirred at 400 rpm for 15 minutes to obtain a white emulsion.

<Components>

| | |
|---|---|
| Water | 683 parts by mass |
| "ELEMINOL RS-30" (manufactured by Sanyo Chemical Industries, Ltd.) | 11 parts by mass |
| Styrene | 138 parts by mass |
| Methacrylic acid | 138 parts by mass |
| Ammonium persulfate | 1.0 part by mass |

Note that "ELEMINOL RS-30" (manufactured by Sanyo Chemical Industries, Ltd.) in the above components is a sodium salt of methacrylic acid ethylene oxide adduct sulfate ester.

The white emulsion was heated to a system temperature of 75° C. and reacted for 5 hours. Furthermore, 30 parts by mass of a 1% aqueous ammonium persulfate solution was added, and the mixture was aged at 75° C. for 5 hours to obtain an organic fine particle emulsion (2) that is an aqueous dispersion of a vinyl-based resin (a copolymer of styrene-methacrylic acid-sodium salt of methacrylic acid ethylene oxide adduct sulfate ester).

When the organic fine particle emulsion (2) was measured with a laser diffraction/scattering particle size distribution analyzer "LA-920" (manufactured by Horiba, Ltd.), the volume average particle size was 0.14 μm.

(Preparation of Organic Fine Particle Emulsion (3))

The following components were charged into a reaction vessel in which a stirring rod and a thermometer were set, and the mixture was stirred at 450 rpm for 20 minutes to obtain a white emulsion.

<Components>

| | |
|---|---|
| Water | 700 parts by mass |
| "ELEMINOL RS-30" (manufactured by Sanyo Chemical Industries, Ltd.) | 12 parts by mass |
| Styrene | 140 parts by mass |
| Methacrylic acid | 140 parts by mass |
| Ammonium persulfate | 1.5 parts by mass |

Note that "ELEMINOL RS-30" (manufactured by Sanyo Chemical Industries, Ltd.) in the above components is a sodium salt of methacrylic acid ethylene oxide adduct sulfate ester.

The white emulsion was heated to a system temperature of 75° C. and reacted for 5 hours. Furthermore, 35 parts by mass of a 1% aqueous ammonium persulfate solution was added, and the mixture was aged at 75° C. for 5 hours to prepare an organic fine particle emulsion (3) that is an aqueous dispersion of a vinyl-based resin (a copolymer of styrene-methacrylic acid-sodium salt of methacrylic acid ethylene oxide adduct sulfate ester).

When the organic fine particle emulsion (3) was measured with a laser diffraction/scattering particle size distribution analyzer "LA-920" (manufactured by Horiba, Ltd.), the volume average particle size was 0.30 μm.

(B.4.5.2) Preparation of Aqueous Phase (Preparation of Aqueous Phase (1))

A part of the organic fine particle emulsion (1) was dried to isolate a resin content.

Thereafter, the following components were mixed and stirred.

<Components>

| | |
|---|---|
| Water | 990 parts by mass |
| Organic fine particle emulsion (1) | 83 parts by mass |
| "ELEMINOL MON-7" (manufactured by Sanyo Chemical Industries, Ltd.) | 37 parts by mass |
| Ethyl acetate | 90 parts by mass |

Note that the above-mentioned "ELEMINOL MON-7" (manufactured by Sanyo Chemical Industries, Ltd.) is an aqueous solution of sodium dodecyl diphenyl ether disulfonate. Thus, an aqueous phase (1), which was a milky white liquid, was prepared.

(Preparation of Aqueous Phase (2))

A part of the organic fine particle emulsion (2) was dried to isolate a resin content.

Thereafter, the following components were mixed and stirred.

<Components>

| | |
|---|---|
| Water | 990 parts by mass |
| Organic fine particle emulsion (2) | 83 parts by mass |
| "ELEMINOL MON-7" (manufactured by Sanyo Chemical Industries, Ltd.) | 37 parts by mass |
| Ethyl acetate | 90 parts by mass |

Note that the above-mentioned "ELEMINOL MON-7" (manufactured by Sanyo Chemical Industries, Ltd.) is an aqueous solution of sodium dodecyl diphenyl ether disulfonate. Thus, an aqueous phase (2), which was a milky white liquid, was prepared.

(Preparation of Aqueous Phase (3))

The following components were mixed and stirred.

<Components>

| | |
|---|---|
| Water | 1000 parts by mass |
| Organic fine particle emulsion (3) | 85 parts by mass |
| "ELEMINOL MON-7" (manufactured by Sanyo Chemical Industries, Ltd.) | 40 parts by mass |
| Ethyl acetate | 95 parts by mass |

Note that the above-mentioned "ELEMINOL MON-7" (manufactured by Sanyo Chemical Industries, Ltd.) is an aqueous solution of sodium dodecyl diphenyl ether disulfonate. Thus, an aqueous phase (3), which was a milky white liquid, was prepared.

(B.4.6) Preparation of Oil Phase (Release Agent and Masterbatch Dispersion)

(B.4.6.1) Preparation of Release Agent Dispersion (Preparation of Release Agent Dispersion (W2))

The following components were charged into a reaction vessel in which a stirring rod and a thermometer were set, and the mixture was stirred while the temperature was raised to 80° C., held at 80° C. for 5 hours, and then cooled to 30° C. over 1 hour.

<Components>

| | |
|---|---|
| Amorphous polyester [a7] | 378 parts by mass |
| Carnauba wax (release agent) | 110 parts by mass |
| CCA | 22 parts by mass |
| Ethyl acetate | 947 parts by mass |

Note that "carnauba wax" in the above components is purified carnauba wax No. 1 powder manufactured by S.KATO & CO. Furthermore, "CCA" in the above components is salicylic acid metal complex E-84 (Orient Chemical Industries Co., Ltd.). Thus, a release agent dispersion (W2) was prepared.

(Preparation of Release Agent Dispersion (W3))

The following components were charged into a reaction vessel in which a stirring rod and a thermometer were set, and the mixture was stirred while the temperature was raised to 80° C., held at 80° C. for 5 hours, and then cooled to 30° C. over 1 hour.

<Components>

| | |
|---|---|
| Amorphous polyester [a8] | 378 parts by mass |
| Carnauba wax (release agent) | 110 parts by mass |
| CCA | 22 parts by mass |
| Ethyl acetate | 947 parts by mass |

Note that "carnauba wax" in the above components is purified carnauba wax No. 1 powder manufactured by S.KATO & CO. Furthermore, "CCA" in the above components is salicylic acid metal complex E-84 (Orient Chemical Industries Co., Ltd.). Thus, a release agent dispersion (W3) was prepared.

(Preparation of Release Agent Dispersion (W4))

The following components were charged into a reaction vessel in which a stirring rod and a thermometer were set, and the mixture was stirred while the temperature was raised to 80° C., held at 80° C. for 8 hours, and then cooled to 24° C. over 1 hour.

<Components>

| | |
|---|---|
| Amorphous polyester [a9] | 400 parts by mass |
| Microcrystalline wax (release agent) | 100 parts by mass |
| CCA | 20 parts by mass |
| Ethyl acetate | 1000 parts by mass |

Note that the "microcrystalline wax" in the above components has an acid number of 0.1 mgKOH/g, a melting point of 65° C., 80 carbon atoms, and a ratio of linear hydrocarbon of 70 wt %. Furthermore, "CCA" in the above components is salicylic acid metal complex E-84 (Orient Chemical Industries Co., Ltd.). Thus, a release agent dispersion (W4) was prepared.

(B.4.6.2) Masterbatch (Production of Masterbatch [1])

The following components were added and mixed with a Henschel mixer (manufactured by Mitsui Mining Co., Ltd.).

<Components>

| | |
|---|---|
| Carbon black (pigment) | 540 parts by mass |
| Amorphous polyester [a7] | 1200 parts by mass |

Note that the carbon black described above is "Printex35" (manufactured by Degussa AG) [DBP oil absorption amount=43 mL/100 mg, pH level=9.5].

Thereafter, the mixture was kneaded with two rolls at 150° C. for 30 minutes, further rolled and cooled, and pulverized with a pulverizer to produce a masterbatch [1].

(Production of Masterbatch [2])

The following components were added and mixed with a Henschel mixer (manufactured by Mitsui Mining Co., Ltd.).

<Components>

| | |
|---|---|
| Carbon black (pigment) | 540 parts by mass |
| Amorphous polyester [a8] | 1200 parts by mass |

Note that the carbon black described above is "Printex35" (manufactured by Degussa AG) [DBP oil absorption amount=43 mL/100 mg, pH level=9.5].

Thereafter, the mixture was kneaded with two rolls at 150° C. for 30 minutes, further rolled and cooled, and pulverized with a pulverizer to produce a masterbatch [2].

(Production of Masterbatch [3])

The following components were added and mixed with a Henschel mixer (manufactured by Mitsui Mining Co., Ltd.).

<Components>

| | |
|---|---|
| Carbon black (pigment) | 550 parts by mass |
| Amorphous polyester [a9] | 1300 parts by mass |

Note that the carbon black described above is "Printex35" (manufactured by Degussa AG) [DBP oil absorption amount=43 mL/100 mg, pH level=9.5].

Thereafter, the mixture was kneaded with two rolls at 160° C. for 45 minutes, further rolled and cooled, and pulverized with a pulverizer to produce a masterbatch [3].

(B.4.6.3) Starting Material Solution (Preparation of Starting Material Solution (1))

The following components were charged into a vessel containing the release agent dispersion (W2) and mixed for 1 hour to prepare a starting material solution (1).

<Components>

| | |
|---|---|
| Masterbatch [1] | 480 parts by mass |
| Ethyl acetate | 550 parts by mass |

(Preparation of Starting Material Solution (2))

The following components were charged into the vessel containing the release agent dispersion (W3) and mixed for 1 hour to prepare a starting material solution (2).

<Components>

| | |
|---|---|
| Masterbatch [2] | 480 parts by mass |
| Ethyl acetate | 550 parts by mass |

(Preparation of Starting Material Solution (3))

The following components were charged into the vessel containing the release agent dispersion (W4) and mixed for 1 hour to prepare a starting material solution (3).

<Components>

| | |
|---|---|
| Masterbatch [3] | 480 parts by mass |
| Ethyl acetate | 550 parts by mass |

(B.4.6.4) Dispersion and Addition of Each Solution (Preparation of Oil Phase (1))

1324 parts by mass of the starting material solution (1) was transferred to another vessel, and the carbon black and the release agent were dispersed using a bead mill under the following conditions. Note that the bead mill is "ULTRA-VISCO MILL" manufactured by Imex Co., Ltd.

<Conditions>

| | |
|---|---|
| Liquid feeding speed: | 1 kg/hour |
| Disc circumferential speed: | 6 m/second |
| 80 vol % Filling with 0.5 mm zirconia beads, 3 passes | |

Next, 1042.3 parts by mass of 65% ethyl acetate solution of the amorphous polyester [a7] was added thereto, and the mixture was passed once with the bead mill under the above-described conditions to prepare an oil phase (1). Note that the 65% ethyl acetate-solution of amorphous polyester [a7] is a solution in which 65% by mass of amorphous polyester [a7] is dissolved in ethyl acetate.

The solid content concentration (130° C., 30 minutes) of the oil phase (1) was 50% by mass.

(Preparation of Oil Phase (2))

1324 parts by mass of the starting material solution (2) was transferred to another vessel, and the carbon black and the release agent were dispersed using a bead mill under the following conditions. Note that the bead mill is "ULTRA-VISCO MILL" manufactured by Imex Co., Ltd.

<Conditions>

| |
|---|
| Liquid feeding speed: 1 kg/hour |
| Disc circumferential speed: 6 m/second |
| 80 vol % Filling with 0.5 mm zirconia beads, 3 passes |

Next, 1042.3 parts by mass of 65% ethyl acetate solution of the amorphous polyester [a8] was added thereto, and the mixture was passed once with the bead mill under the above-described conditions to prepare an oil phase (2). Note that the 65% ethyl acetate-solution of amorphous polyester [a8] is a solution in which 65% by mass of amorphous polyester [a8] is dissolved in ethyl acetate.

The solid content concentration (130° C., 30 minutes) of the oil phase (2) was 50% by mass.

(Preparation of Oil Phase (3))

1324 parts by mass of the starting material solution (3) was transferred to another vessel, and the carbon black and the release agent were dispersed using a bead mill under the following conditions. Note that the bead mill is "ULTRA-VISCO MILL" manufactured by Imex Co., Ltd.

<Conditions>

| |
|---|
| Liquid feeding speed: 1 kg/hour |
| Disc circumferential speed: 6 m/second |
| 80 vol % Filling with 0.5 mm zirconia beads, 3 passes |

Next, 1000 parts by mass of 65% ethyl acetate solution of the amorphous polyester [a9] was added thereto, and the mixture was passed once with the bead mill under the above-described conditions to prepare an oil phase (3). Note that the 65% ethyl acetate-solution of amorphous polyester [a9] is a solution in which 65% by mass of amorphous polyester [a9] is dissolved in ethyl acetate.

The solid content concentration (130° C., 30 minutes) of the oil phase (3) was 53% by mass.

(B.5) Production of Toner 4

(B.5.1) Production of Toner Base Particles [4]

(Emulsification Step)

The following components were placed in a vessel, and mixed with a TK homomixer (manufactured by Tokushu Kika Kogyo Co., Ltd.) at 5000 rpm for 1 minute.

<Components>

| | |
|---|---|
| Oil phase (1) | 664 parts by mass |
| Polyester prepolymer dispersion (P1) | 109.4 parts by mass |
| Crystalline polyester dispersion (C4) | 73.9 parts by mass |
| Ketimine compound (K1) | 4.6 parts by mass |

Thereafter, 1200 parts of the aqueous phase (1) was added to the vessel, and mixed with a TK homomixer at a rotational speed of 13000 rpm for 20 minutes to obtain an emulsified slurry [1].

(Desolvation Step)

The emulsified slurry [1] was charged into a vessel equipped with a stirrer and a thermometer, and was desolvated at 30° C. for 8 hours and then aged at 45° C. for 4 hours to obtain a dispersion slurry [1].

(Washing and Drying Step)

After 100 parts by mass of the dispersion slurry [1] was subjected to filtration under reduced pressure, (1): 100 parts by mass of ion-exchanged water was added to the filtration cake, and the mixture was mixed with a TK homomixer at a rotational speed of 12000 rpm for 10 minutes, and then filtered.

(2): 100 parts by mass of a 10% aqueous sodium hydroxide solution was added to the filtration cake of (1), and the mixture was mixed with a TK homomixer at a rotational speed of 12000 rpm for 30 minutes, and then filtered under reduced pressure.

(3): 100 parts by mass of a 10% aqueous hydrochloric acid solution was added to the filtration cake of (2), and the mixture was mixed with a TK homomixer at a rotational speed of 12000 rpm for 10 minutes, and then filtered.

(4): 300 parts of ion-exchanged water was added to the filtration cake of (3), and the mixture was mixed with a TK homomixer at a rotational speed of 12000 rpm for 10 minutes, and then filtered, which were operated twice to obtain a filtration cake [1].

The filtration cake [1] was dried with an air-circulating drier at 45° C. for 48 hours and sieved with a mesh having an opening of 75 μm to prepare toner base particles [4].

(B.5.2) Addition of External Additive and Measurement of Glass Transition Temperature The external additive was added in the same procedure as in the toner 1. The glass transition temperature was also measured in the same manner, and the glass transition temperature (Tg) of the toner 4 was 0.1° C.

(B.6) Production of Toner 5

(B.6.1) Production of Toner Base Particles [5]

(Emulsification Step)

The following components were placed in a vessel, and mixed with a TK homomixer (manufactured by Tokushu Kika Kogyo Co., Ltd.) at 5000 rpm for 1 minute.

<Components>

| | |
|---|---|
| Oil phase (2) | 664 parts by mass |
| Polyester prepolymer dispersion (P2) | 109.4 parts by mass |
| Crystalline polyester dispersion (C5) | 73.9 parts by mass |
| Ketimine compound (K2) | 4.6 parts by mass |

Thereafter, 1200 parts of the aqueous phase (2) was added to the vessel, and mixed with a TK homomixer at a rotational speed of 13000 rpm for 20 minutes to obtain an emulsified slurry [2].

(Desolvation Step)

The emulsified slurry [2] was charged into a vessel equipped with a stirrer and a thermometer, and was desolvated at 30° C. for 8 hours and then aged at 45° C. for 4 hours to obtain a dispersion slurry [2].

(Washing and Drying Step)

After 100 parts by mass of the dispersion slurry [2] was subjected to filtration under reduced pressure, (1): 100 parts by mass of ion-exchanged water was added to the filtration cake, and the mixture was mixed with a TK homomixer at a rotational speed of 12000 rpm for 10 minutes, and then filtered.

(2): 100 parts by mass of a 10% aqueous sodium hydroxide solution was added to the filtration cake of (1), and the mixture was mixed with a TK homomixer at a rotational speed of 12000 rpm for 30 minutes, and then filtered under reduced pressure.

(3): 100 parts by mass of a 10% aqueous hydrochloric acid solution was added to the filtration cake of (2), and the mixture was mixed with a TK homomixer at a rotational speed of 12000 rpm for 10 minutes, and then filtered.

(4): 300 parts of ion-exchanged water was added to the filtration cake of (3), and the mixture was mixed with a TK homomixer at a rotational speed of 12000 rpm for 10 minutes, and then filtered, which were operated twice to obtain a filtration cake [2].

The filtration cake [2] was dried with an air-circulating drier at 45° C. for 48 hours and sieved with a mesh having an opening of 75 μm to prepare toner base particles [5].

(B.6.2) Addition of External Additive and Measurement of Glass Transition Temperature The external additive was added in the same procedure as in the toner 1. The glass transition temperature was also measured in the same manner, and the glass transition temperature (Tg) of the toner 5 was 26.3° C.

(B.7) Production of Toner 6

(B.7.1) Production of Toner Base Particles [6]

(Emulsification Step)

The following components were placed in a vessel, and mixed with a TK homomixer (manufactured by Tokushu Kika Kogyo Co., Ltd.) at 6000 rpm for 1 minute.

<Components>

| | |
|---|---|
| Oil phase (3) | 700 parts by mass |
| Polyester prepolymer dispersion (P2) | 120 parts by mass |
| Crystalline polyester dispersion (C6) | 80 parts by mass |
| ketimine compound (K3) | 5 parts by mass |

Thereafter, 1300 parts of the aqueous phase (3) was added to the vessel, and mixed with a TK homomixer at a rotational speed of 13000 rpm for 20 minutes to obtain an emulsified slurry [3].

(Desolvation Step)

The emulsified slurry [3] was charged into a vessel equipped with a stirrer and a thermometer, and was desolvated at 30° C. for 10 hours and then aged at 45° C. for 5 hours to obtain a dispersion slurry [3].

(Washing and Drying Step)

After 100 parts by mass of the dispersion slurry [3] was subjected to filtration under reduced pressure, (1): 100 parts by mass of ion-exchanged water was added to the filtration cake, and the mixture was mixed with a TK homomixer at a rotational speed of 12000 rpm for 10 minutes, and then filtered.

(2): 100 parts by mass of a 10% aqueous sodium hydroxide solution was added to the filtration cake of (1), and the mixture was mixed with a TK homomixer at a rotational speed of 12000 rpm for 30 minutes, and then filtered under reduced pressure.

(3): 100 parts by mass of a 10% aqueous hydrochloric acid solution was added to the filtration cake of (2), and the mixture was mixed with a TK homomixer at a rotational speed of 12000 rpm for 10 minutes, and then filtered.

(4): 300 parts by mass of ion-exchanged water was added to the filtration cake of (3), and the mixture was mixed with a TK homomixer at a rotational speed of 12000 rpm for 10 minutes, and then filtered, which were operated twice to obtain a filtration cake [3].

The filtration cake [3] was dried with an air-circulating drier at 45° C. for 48 hours and sieved with a mesh having an opening of 75 μm to prepare toner base particles [6].

(B.7.2) Addition of External Additive and Measurement of Glass Transition Temperature The external additive was added in the same procedure as in the toner 1. The glass transition temperature was also measured in the same manner, and the glass transition temperature (Tg) of the toner 6 was 37.2° C.

Components of the toner base particles [4] to [6] are shown in Table IV. The type and addition amount of the external additive, the polyester content in the toner containing the external additive, and the glass transition temperature of each of the toners 4 to 6 are shown in Table V.

TABLE IV

| TONER BASE PARTICLES NO. | | | [4] | [5] | [6] |
|---|---|---|---|---|---|
| OIL PHASE (1) | MASTERBATCH | [1] | 664 | — | — |
| | RELEASE AGENT DISPERSION | (W2) | | | |
| | AMORPHOUS PEs | [a7] | | | |
| OIL PHASE (2) | MASTERBATCH | [2] | — | 664 | — |
| | RELEASE AGENT DISPERSION | (W3) | | | |
| | AMORPHOUS PEs | [a8] | | | |
| OIL PHASE (3) | MASTERBATCH | [3] | — | — | 700 |
| | RELEASE AGENT DISPERSION | (W4) | | | |
| | AMORPHOUS PEs | [a9] | | | |
| PEs PREPOLYMER DISPERSION | | (P1) | 109.4 | — | — |
| | | (P2) | — | 109.4 | — |
| | | (P3) | — | — | 120.0 |
| CRYSTALLINE PEs | | (C4) | 73.9 | — | — |
| | | (C5) | — | 73.9 | — |
| | | (C6) | — | — | 80.0 |
| KETIMINE COMPOUND | | (K1) | 4.6 | — | — |
| | | (K2) | — | 4.6 | — |
| | | (K3) | — | — | 5.0 |
| AQUEOUS PHASE | | (1) | 1200.0 | — | — |
| | | (2) | — | 1200.0 | — |
| | | (3) | — | — | 1300.0 |

THE NUMBERS IN THE TABLE REPRESENT THE ADDITION AMOUNTS [PARTS BY MASS].
"PEs" IN THE TABLE REPRESENTS POLYESTER.

TABLE V

| TONER NO. | 4 | 5 | 6 |
|---|---|---|---|
| ADDITION AMOUNT OF EXTERNAL ADDITIVE (HYDROPHOBIC SILICA "RY50") | 1.5 | 1.5 | 1.5 |

TABLE V-continued

| TONER NO. | 4 | 5 | 6 |
|---|---|---|---|
| [PARTS BY MASS] | | | |
| CONTENT OF PEs IN TONER INCLUDING EXTERNAL ADDITIVE [% BY MASS] | 82.6 | 82.6 | 80.4 |
| GLASS TRANSITION TEMPERATURE [° C.] | 0.1 | 26.3 | 37.2 |

"PEs" IN THE TABLE REPRESENTS POLYESTER.

(B.8.1) Preparation of Dispersion for Core (B.8.1.1) Vinyl Resin Dispersion (Preparation of Vinyl Resin Dispersion (D1))

(1) First Stage Polymerization

Into a 5 L reaction vessel equipped with a stirring device, a temperature sensor, a cooling tube, and a nitrogen introduction device, 8 parts by mass of sodium dodecyl sulfate and 3000 parts by mass of ion-exchanged water were charged, and the internal temperature was raised to 80° C. while stirring at a speed of 230 rpm under a nitrogen gas flow. After the temperature rise, a solution prepared by dissolving 10 parts by mass of potassium persulfate in 200 parts by mass of ion-exchanged water was added, the liquid temperature was again set to 80° C., and the following components were added dropwise over 1 hour.

<Components>

| | |
|---|---|
| n-Butyl acrylate | 526 parts by mass |
| Methacrylic acid | 474 parts by mass |

After the dropwise addition, the mixture was heated and stirred at 80° C. for 2 hours to perform polymerization, thereby preparing a dispersion of vinyl polymer particles [d1].

(2) Second Stage Polymerization: Formation of Intermediate Layer

Into a 5 L reaction vessel equipped with a stirring device, a temperature sensor, a cooling tube, and a nitrogen introduction device, a solution prepared by dissolving 7 parts by mass of sodium dodecyl sulfate in 3000 parts by mass of ion-exchanged water was charged and heated to 98° C. After the heating, 300 parts by mass on a solid basis of the dispersion of the vinyl polymer particles [d1] prepared by the first stage polymerization and a mixed liquid in which the following monomers, a chain transfer agent, and a release agent were dissolved at 90° C. were added.

<Components>

| | |
|---|---|
| 2-Ethylhexyl acrylate | 90.5 parts by mass |
| Methacrylic acid | 33.1 parts by mass |
| n-Octyl mercaptan (chain transfer agent) | 5.5 parts by mass |
| Behenyl behenate (release agent, melting point 73° C.) | 130.0 parts by mass |

Mixing and dispersing treatment was performed for 1 hour with a mechanical disperser CLEARMIX (manufactured by M Technique Co., Ltd.) having a circulation path to prepare a dispersion containing emulsified particles (oil droplets). To this dispersion, a solution of a polymerization initiator prepared by dissolving 6 parts by mass of potassium persulfate in 200 parts by mass of ion-exchanged water was added, and this system was heated and stirred at 78° C. for 1 hour to perform polymerization, thereby preparing a dispersion of vinyl polymer particles [d2].

(3) Third Stage Polymerization: Formation of Outer Layer

To the dispersion of vinyl polymer particles [d2] obtained by the second stage polymerization, 400 parts by mass of ion-exchanged water was further added and mixed well. Thereafter, a solution prepared by dissolving 6.0 parts by mass of potassium persulfate in 400 parts by mass of ion-exchanged water was added. Furthermore, under a temperature condition of 81° C., the following components were added dropwise over 1 hour.

<Components>

| | |
|---|---|
| n-Butyl acrylate | 143.2 parts by mass |
| Methacrylic acid | 52.0 parts by mass |
| n-Octyl mercaptan (chain transfer agent) | 8.0 parts by mass |

After completion of the dropwise addition, the mixture was heated and stirred for 2 hours to perform polymerization, and then cooled to 28° C. to prepare a vinyl resin dispersion (D1).

The weight average molecular weight (Mw) of the vinyl resin in the vinyl resin dispersion (D1) was 35000.

(Preparation of Vinyl Resin Dispersions (D2) and (D3))

Vinyl polymer dispersions (D2) and (D3) were prepared in the same manner as the vinyl polymer dispersion (D1) except that the components for the first, second, and third stage polymerizations were as follows.

[Components in Preparation of Vinyl Resin Dispersion (D2)]

<Components of First Stage Polymerization>

| | |
|---|---|
| n-Butyl acrylate | 396 parts by mass |
| Methacrylic acid | 604 parts by mass |

<Components of Second Stage Polymerization>

| | |
|---|---|
| 2-Ethylhexyl acrylate | 90.5 parts by mass |
| Methacrylic acid | 33.1 parts by mass |
| n-Octyl mercaptan (chain transfer agent) | 5.5 parts by mass |
| Behenyl behenate (release agent, melting point 73° C.) | 130.0 parts by mass |

<Components of Third Stage Polymerization>

| | |
|---|---|
| n-Butyl acrylate | 143.2 parts by mass |
| Methacrylic acid | 200.5 parts by mass |
| n-Octyl mercaptan (chain transfer agent) | 8.0 parts by mass |

[Components in Preparation of Vinyl Resin Dispersion (D3)]

<Components of First Stage Polymerization>

| | |
|---|---|
| Styrene | 480.0 parts by mass |
| n-Butyl acrylate | 250.0 parts by mass |
| Methacrylic acid | 68.0 parts by mass |

<Components of Second Stage Polymerization>

| | |
|---|---|
| Styrene | 243.0 parts by mass |
| 2-Ethylhexyl acrylate | 90.5 parts by mass |
| Methacrylic acid | 33.1 parts by mass |
| n-Octyl mercaptan (chain transfer agent) | 5.5 parts by mass |
| Behenyl behenate (release agent, melting point 73° C.) | 130.0 parts by mass |

<Components of Third Stage Polymerization>

| | |
|---|---|
| Styrene | 354.8 parts by mass |
| n-Butyl acrylate | 143.2 parts by mass |
| Methacrylic acid | 52.0 parts by mass |
| n-Octyl mercaptan (chain transfer agent) | 8.0 parts by mass |

(B.8.1.2) Crystalline Polyester Dispersion (Preparation of Crystalline Polyester Dispersion (E1))

The following components of the vinyl polymerization segment (styrene-acrylic polymerization segment) including the bireactive monomer were placed in the dropping funnel. Hereinafter, the "styrene-acrylic polymerized segment" is also referred to as "St•Ac Segment".

<Components>

| | |
|---|---|
| n-Butyl acrylate | 12 parts by mass |
| Acrylic acid | 2 parts by mass |
| Radical polymerization initiator (di-t-butyl peroxide) | 7 parts by mass |

In addition, starting monomers of a crystalline polyester polymerization segment (CPEs segment) described below were placed in a four-necked flask equipped with a nitrogen introducing tube, a dewatering tube, a stirrer, and a thermocouple, and heated to 170° C. to be dissolved.

<Starting Monomers>

| | |
|---|---|
| Ethylene glycol | 106 parts by mass |
| Dimethyl terephthalate | 245 parts by mass |
| 1,10-Decanedicarboxylic acid | 105 parts by mass |

Next, the starting monomers of the vinyl polymerization segment were added dropwise under stirring over 90 minute, and aged for 60 minutes. Thereafter, the unreacted starting monomers of the vinyl polymerization segment were removed under reduced pressure (8 kPa). Note that the amount of the monomer removed at this time was an extremely small as compared with the amount of the monomer of the vinyl polymerization segment.

Thereafter, 0.8 parts by mass of $Ti(O\text{-}n\text{-}Bu)_4$ was added as an esterifying agent, the temperature was raised to 235° C., and the reaction was performed for 5 hours under normal pressure (101.3 kPa) and further for 1 hour under reduced pressure (8 kPa).

Next, after cooling to 200° C., the mixture was reacted for 1 hour under reduced pressure (20 kPa) to obtain a crystalline polyester [e1] that is a hybrid crystalline polyester.

The crystalline polyester [e1] was a resin including 8% by mass of a polymerized segment (St•Ac segment) other than the CPEs segment with respect to the total amount thereof, and having a form in which the CPEs segment was grafted to the St•Ac segment.

Thirty (30) parts by mass of the crystalline polyester [e1] was melted and transferred in a molten state to an emulsifying disperser "CAVITRON CD1010" (manufactured by Eurotec Co., Ltd.) at a transfer rate of 100 parts by mass per minute. At the same time as this transfer of the crystalline polyester [e1] in a molten state, diluted ammonium water having a concentration of 0.37% by mass, which was prepared by diluting 70 parts by mass of an aqueous ammonia solution reagent with ion-exchanged water in a separate aqueous-solvent tank, was transferred to the emulsifying disperser "CAVITRON CD1010" (manufactured by Eurotec, Inc.) at a transfer rate of 0.1 L per minute while the diluted ammonium water was heated to 100° C. by a heat exchanger.

Then, the emulsifying disperser was operated under conditions of the rotor rotation speed of 60 Hz and the pressure of 5 kg/cm$^2$ to prepare a crystalline polyester dispersion (E1) having a solid content of 30% by mass. At this time, the volume-based median particle size of the crystalline polyester particles contained in the crystalline polyester dispersion (E1) was 200 nm.

(Preparation of Crystalline Polyester Dispersion (E2))

A crystalline polyester dispersion (E2) was prepared in the same manner as the crystalline polyester dispersion (E1), except that the components of the vinyl polymerization segment (St Ac Segment) and the starting monomers of the crystalline polyester polymerization segment (CPEs segment) were changed as follows.

<Components of St •Ac Segment>

| | |
|---|---|
| n-Butyl acrylate | 12 parts by mass |
| Acrylic acid | 2 parts by mass |
| Radical polymerization initiator (di-t-butyl peroxide) | 7 parts by mass |

<Components of CPEs Segment>

| | |
|---|---|
| Bisphenol A ethylene oxide adduct | 210 parts by mass |
| Bisphenol A propylene oxide adduct | 230 parts by mass |
| Terephthalic acid | 30 parts by mass |
| Fumaric acid | 135 parts by mass |
| Tetrapropenylsuccinic anhydride | 40 parts by mass |

(Preparation of Crystalline Polyester Dispersion (E3))

A crystalline polyester dispersion (E3) was prepared in the same manner as the crystalline polyester dispersion (E1), except that the components of the vinyl polymerization segment (St-Ac segment) and the starting monomers of the crystalline polyester polymerization segment (CPEs segment) were changed as follows.

<Components of St •Ac Segment>

| | |
|---|---|
| Styrene | 34 parts by mass |
| n-Butyl acrylate | 12 parts by mass |
| Acrylic acid | 2 parts by mass |
| Radical polymerization initiator (di-t-butyl peroxide) | 7 parts by mass |

<Components of CPEs Segment>

| | |
|---|---|
| Hexadecanedioic acid | 281 parts by mass |
| 1,4-Butanediol | 94 parts by mass |

(B.8.2) Dispersion for Shell Layer (Preparation of Amorphous Polyester Dispersion (F))

The following components of the vinyl polymerization segment (St Ac segment) including the bireactive monomer were placed in the dropping funnel.

<Components>

| | |
|---|---|
| Styrene | 80 parts by mass |
| n-Butyl acrylate | 20 parts by mass |
| Acrylic acid | 10 parts by mass |
| Radical polymerization initiator (di-t-butyl peroxide) | 16 parts by mass |

In addition, starting monomers of an amorphous polyester polymerization segment (APEs segment) described below were placed in a four-necked flask equipped with a nitrogen introducing tube, a dewatering tube, a stirrer, and a thermocouple, and heated to 170° C. to be dissolved.

<Starting Monomers>

| | |
|---|---|
| Bisphenol A propylene oxide 2 mol adduct | 228.6 parts by mass |
| Bisphenol A ethylene oxide 2 mol adduct | 57.1 parts by mass |
| Terephthalic acid | 66.9 parts by mass |
| Fumaric acid | 47.4 parts by mass |

Next, the starting monomers of the vinyl polymerization segment were added dropwise over 90 minute under stirring, and after aging for 60 minutes, the unreacted starting monomers of the vinyl polymerization segment were removed under reduced pressure (8 kPa). Thereafter, 0.4 parts by mass of $Ti(O\text{-}n\text{-}Bu)_4$ was added as an esterifying agent, the temperature was raised to 235° C., and the reaction was performed for 5 hours under normal pressure (101.3 kPa) and further for 1 hour under reduced pressure (8 kPa).

Next, after cooling to 200° C., a reaction was performed under reduced pressure (20 kPa) until a desired softening point was reached. Next, desolvation was performed to produce an amorphous polyester [f1].

The amorphous polyester [f1] was a hybrid amorphous polyester including 8% by mass of a polymerized segment (St•Ac segment) other than the APEs segment with respect to the total amount of thereof, and having a form in which the APEs segment was grafted to the St•Ac segment.

100 parts by mass of the obtained amorphous polyester [f1] was dissolved in 400 parts by mass of ethyl acetate (manufactured by Kanto Chemical Co., Inc.). Furthermore, the resultant was mixed with 638 parts by mass of sodium laurylsulfate having a concentration of 0.26% by mass which had been prepared in advance, and the mixture was subjected to ultrasonic dispersion with an ultrasonic homogeniser "US-150T" (manufactured by NISSEI Corporation) at V-LEVEL 300 µA for 30 minutes while stirring.

Thereafter, ethyl acetate was completely removed while stirring for 3 hours under reduced pressure using a diaphragm vacuum pump "V-700" (manufactured by Buchi Labortechnik GmbH) in a state of being heated to 40° C., thereby preparing an amorphous polyester dispersion (F) having a solid content of 13.5% by mass.

(B.8.3) Colorant Dispersion (Preparation of Black Colorant Dispersion (B2))

Ninety (90) parts by mass of sodium dodecyl sulfate was dissolved in 1600 parts by mass of ion-exchanged water with stirring. While stirring this solution, 420 parts by mass of carbon black "Regal 330R" (manufactured by Cabot Corp.) was gradually added, and then the mixture was subjected to a dispersion treatment using a stirring apparatus "CLEARMIX" (manufactured by M Technique Co., Ltd.), thereby preparing a black colorant dispersion (B2). The particle size of the colorant particles in the black colorant dispersion (B2) was measured using an electrophoretic light scattering spectrometer "ELS-800" (manufactured by Otsuka Electronics Co., Ltd.) and found to be 110 nm.

(B.8.4) Production of Toner Base Particles [7]

Into a reaction vessel equipped with a stirrer, a thermometer, and a cooling tube, 285 parts by mass (on a solid basis) of the vinyl polymer dispersion (D1) for core, 40 parts by mass (on a solid basis) of the crystalline polyester dispersion (E1) that was another one for core, and 2000 parts by mass of ion-exchanged water were charged.

Furthermore, sodium dodecyldiphenyl ether disulfonate was charged in an amount of 1% by mass (on a solid basis) with respect to the total amount of the vinyl resin and the crystalline polyester, and then a 5 mol/L aqueous sodium hydroxide solution was added to adjust the pH to 10.

Thereafter, 30 parts by mass (on a solid basis) of the black colorant dispersion (B2) was charged, and then an aqueous solution prepared by dissolving 60 parts by mass of manganese chloride in 60 parts by mass of ion-exchanged water was added at 30° C. over 10 minutes under stirring. Thereafter, the mixture was allowed to stand for 3 minutes, and then the temperature increase was started, and this system was heated to 80° C. over 60 minutes.

After the temperature reached 80° C., while the stirring speed was adjusted such that the growth rate of the particle size became 0.01 µm/min, the particle size of the associated particles was measured with "Coulter Multisizer 3" (manufactured by Beckman Coulter, Inc.), and the particles were grown until the volume-based median diameter became 6.0 µm.

Thereafter, 37 parts by mass (on a solid basis) of the amorphous polyester dispersion (F) for a shell layer was charged over 30 minutes. At the time point when a supernatant of the reaction liquid became transparent, an aqueous solution in which 190 parts by mass of sodium chloride was dissolved in 760 parts by mass of ion-exchanged water was added to stop the particle growth. Furthermore, the temperature was increased, fusion of the particles was allowed to proceed by heating and stirring in a state of 80° C., the average circularity of the toner was measured using a measurement apparatus "FPIA-3000" (manufactured by Sysmex Corporation) (the number of HPF detections was 4000), and when the average circularity reached 0.970, the toner was cooled to 30° C. at a cooling rate of 2.5° C./min.

Next, solid-liquid separation was performed, and washing was performed by repeating three times the operation of re-dispersing the dehydrated toner cake in ion-exchanged water and performing solid-liquid separation, followed by drying at 40° C. for 24 hours to prepare toner base particles [7].

(B.8.5) Addition of External Additive and Measurement of Glass Transition Temperature The external additive was added in the same procedure as in the toner 1. Furthermore, the glass transition temperature of the toner 7 was measured in the same manner as the toner 1, and the glass transition temperature (Tg) of the toner 7 was 0.3° C.

(B.9) Production of Toners 8 and 9

Toner base particles [8] and [9] were produced in the same manner as in the production of the toner base particles [7] so that the components of the toner base particles were as shown in Table VI.

Note that in Table VI, amorphous PEs [D1], [D2], [D3], and [F] are contents of the amorphous polyester dispersions (D1), (D2), (D3), and (F) on a solid basis, respectively, crystalline PEs [E1], [E2], and [E3] are contents of the crystalline polyester dispersions [E1], [E2], and [E3] on a solid basis, and the colorant [B2] is a content of the colorant dispersion (B2) on a solid basis.

TABLE VI

| TONER BASE PARTICLES NO. | | | [7] | [8] | [9] |
|---|---|---|---|---|---|
| CORE | AMORPHOUS | [D1] | 280.0 | — | — |
| | PEs | [D2] | — | 270.0 | — |
| | | [D3] | — | — | 270.0 |
| | CRYSTALLINE | [E1] | 300.0 | — | — |
| | PEs | [E2] | — | 300.0 | — |
| | | [E3] | — | — | 300.0 |
| | COLORANT | [B2] | 50.0 | 50.0 | 50.0 |
| SHELL | AMORPHOUS PEs | [F] | 45.0 | 40.0 | 37.0 |

THE NUMBERS IN THE TABLE REPRESENT THE ADDITION AMOUNTS [PARTS BY MASS ON A SOLID BASIS].
"PEs" IN THE TABLE REPRESENTS POLYESTER.

Further, toners 8 and 9 were produced by adding an external additive to the toner base particles [8] and [9] in the same procedure as in the toner 1, and the glass transition temperature was measured.

The type and addition amount of the external additive, the polyester content in the toner containing the external additive, and the glass transition temperature of each of the toners 7 to 9 are shown in Table VII.

TABLE VII

| TONER NO. | 7 | 8 | 9 |
|---|---|---|---|
| ADDITION AMOUNT OF EXTERNAL ADDITIVE (HYDROPHOBIC SILICA "RY50") [PARTS BY MASS] | 1.5 | 1.5 | 1.5 |
| CONTENT OF PEs IN TONER INCLUDING EXTERNAL ADDITIVE [% BY MASS] | 51.1 | 51.5 | 51.3 |
| GLASS TRANSITION TEMPERATURE [° C.] | 0.3 | 29.1 | 38.2 |

"PEs" IN THE TABLE REPRESENTS POLYESTER.

(B.10) Production of Toner 10

(B.10.1) Production of Amorphous Polyester [a10]

The following polyester monomers were added, 2 parts by mass of tetrabutyl titanate was added as a condensation catalyst, and a reaction was performed at 220° C. under a nitrogen gas flow while generated water was distilled off.

<Polyester Monomers>

| | |
|---|---|
| Ethylene glycol | 108 parts by mass |
| Dimethyl terephthalate | 245 parts by mass |
| 1,10-Decanedicarboxylic acid | 105 parts by mass |

It was then cooled to 180° C. After completion of the reaction, the resultant was removed from the vessel, cooled, and pulverized to produce an amorphous Polyester [a10].

(B.10.2) Preparation of Magnetic Body [1]

A magnetic body [1] in which the number-average particle size D1 of the primary particles was 120 nm, the shape was octahedral, and the saturation magnetism at 796 kA/m was 88 $Am^2/kg$ was prepared as the magnetic body used in the production of the magnetic toner core base particles.

(B.10.3) Production of Magnetic Toner Core Base Particles [10*c*]

The following components were premixed with a Henschel mixer, and then, the mixture was melt-kneaded by using PCM-30 (manufactured by Ikegai Iron Works, Ltd.) while the temperature was set so that the temperature of the molten product at the ejection port was 150° C.

<Components>

| | |
|---|---|
| Amorphous polyester [a10] | 100 parts by mass |
| Magnetic body [1] | 60 parts by mass |
| Sasol wax C105 (manufactured by Sasol Limited) | 1 part by mass |
| Charge control agent "T-77" (manufactured by Hodogaya Chemical Co., Ltd.) | 2 parts by mass |

Note that Sazol Wax C105 (manufactured by Sazol Co., Ltd.) in the above components is Fischer-Tropsch wax and has a melting point of 105° C.

The obtained kneaded product was cooled, coarsely pulverized with a hammermill, and then finely pulverized using a Turbo Mill T250 (manufactured by Turbo Kogyo Co., Ltd.) as a pulverizer. The resulting finely pulverized powder was classified using a multi-class classifier utilizing the Coanda effect to prepare magnetic toner core base particles [10*c*] having a weight-average particle size (D4) of 6.5 μm.

(B.10.4) Production of Toner Base Particles [10]

(Surface Modification Treatment of Magnetic Toner Core Base Particles with Inorganic Particles)

The following materials were charged into "Impact method in high-speed airflow: Hybridization System, Nara Machinery Co., Ltd." to produce an ordered mixture.

Magnetic toner core base particles [10*c*] 100 parts by mass

Inorganic fine particles "X24" (for surface modification) 4.5 parts by mass

Note that the above-described inorganic fine particles "X24" were sol-gel silica spherical fine particles "X24-9163A" manufactured by Shin-Etsu Chemical Co., Ltd, and those having an average particle size of 110 nm were used.

Thereafter, the number of blade rotations and the product temperature were controlled to fix the inorganic fine particles "X24" on the surfaces of the magnetic toner core base particles [10*c*], thereby producing toner base particles [10]. At this time, the toner base particles [10] in which the inorganic fine particles "X24" were fixed had a weight-average particle size of 6.7 μm.

(B.10.5) Addition of External Additive and Measurement of Glass Transition Temperature The following fine particles were externally added to and mixed with 100 parts by mass of the toner base particles [10] using a Henschel mixer (FM-10 type manufactured by Mitsui Miike Chemical Engineering Machinery Co., Ltd.).

<Fine Particles>

| | |
|---|---|
| Hydrophobic silica fine particles [1] | 0.5 parts by mass |
| Hydrophobic silica fine particles [2] | 0.5 parts by mass |

Note that the above-described hydrophobic silica fine particles [1] are hydrophobic silica fine particles having a number-average particle size of 20 nm of primary particles surface-treated with 25% by mass of hexamethyldisilazane.

The above-described hydrophobic silica fine particles [2] are hydrophobic silica fine particles having a number-average particle size of 40 nm of primary particles surface-treated with 15% by mass of hexamethyldisilazane.

The glass transition temperature was measured in the same manner as in the toner 1, and the glass transition temperature (Tg) of the toner 10 was 0.2° C.

(B.11) Production of Toner 11

(B.11.1) Production of Amorphous Polyester [a11]

The following polyester monomers were added, 2 parts by mass of tetrabutyl titanate was added as a condensation catalyst, and a reaction was performed at 220° C. under a nitrogen gas flow while generated water was distilled off.

<Polyester Monomers>

| | |
|---|---|
| Ethylene glycol | 108 parts by mass |
| Dimethyl terephthalate | 280 parts by mass |
| 1,10-Decanedicarboxylic acid | 70 parts by mass |

It was then cooled to 180° C. After completion of the reaction, the resultant was removed from the vessel, cooled, and pulverized to produce an amorphous polyester [a11].

(B.11.2) Preparation of Magnetic Body [2]

A magnetic body [2] in which the number-average particle size D1 of the primary particles was 120 nm, the shape was octahedral, and the saturation magnetism at 796 kA/m was 88 $Am^2/kg$ was prepared as the magnetic body used in the production of the magnetic toner core base particles.

(B.11.3) Production of Magnetic Toner Core Base Particles [11*c*]

The following components were premixed with a Henschel mixer, and then, the mixture was melt-kneaded by using PCM-30 (manufactured by Ikegai Iron Works, Ltd.) while the temperature was set so that the temperature of the molten product at the ejection port was 150° C.

<Components>

| | |
|---|---|
| Amorphous polyester [a11] | 100 parts by mass |
| Magnetic body [2] | 60 parts by mass |
| Sasol wax "C105" (manufactured by Sasol Limited) | 1 part by weight |
| Charge control agent "T-77" (manufactured by Hodogaya Chemical Co., Ltd.) | 2 parts by mass |

Note that Sazol Wax "C105" (manufactured by Sazol Co., Ltd.) in the above components is Fischer-Tropsch wax and has a melting point of 105° C.

The obtained kneaded product was cooled, coarsely pulverized with a hammermill, and then finely pulverized using a Turbo Mill T250 (manufactured by Turbo Kogyo Co., Ltd.) as a pulverizer. The resulting finely pulverized powder was classified using a multi-class classifier utilizing the Coanda effect to prepare magnetic toner core base particles [11*c*] having a weight-average particle size (D4) of 6.5 μm.

(B.11.4) Production of Toner Base Particles [11]

(Surface Modification Treatment of Magnetic Toner Core Base Particles with Inorganic Particles)

The following materials were charged into "Impact method in high-speed airflow: Hybridization System, Nara Machinery Co., Ltd." to produce an ordered mixture.

| | |
|---|---|
| Magnetic toner core base particles [11c] | 100 parts by mass |
| Inorganic Fine Particles "X24" (for surface modification) | 3.5 parts by mass |

Note that the above-described inorganic fine particles "X24" were sol-gel silica spherical fine particles "X24-9600A-80" manufactured by Shin-Etsu Chemical Co., Ltd, and those having an average particle size of 80 nm were used.

Thereafter, the number of blade rotations and the product temperature were controlled to fix the inorganic fine particles "X24" on the surfaces of the magnetic toner core base particles [11*c*], thereby producing toner base particles [11].

(B.11.5) Addition of External Additive and Measurement of Glass Transition Temperature The external additive was added in the same manner as in Toner 10. The glass transition temperature was measured in the same manner as in the toner 1, and the glass transition temperature (Tg) of the toner 11 was 28.6° C.

(B.12) Production of Toner 12

(B.12.1) Production of Amorphous Polyester Particles [a12]

The following polyester monomers were added, 2 parts by mass of tetrabutyl titanate was added as a condensation catalyst, and a reaction was performed at 220° C. under a nitrogen gas flow while generated water was distilled off.

<Polyester Monomers>

| | |
|---|---|
| Bisphenol A propylene oxide 2 mol adduct | 400 parts by mass |
| Bisphenol A propylene oxide 3 mol adduct | 280 parts by mass |
| Terephthalic acid | 120 parts by mass |
| Isophthalic acid | 120 parts by mass |

Then, the mixture was cooled to 180° C., and 250 parts by mass of trimellitic anhydride was added and the reaction was performed. After completion of the reaction, the resultant was removed from the vessel, cooled, and pulverized to produce an amorphous polyester [a12].

(B.12.2) Preparation of Magnetic Body [3]

A magnetic body [3] in which the number-average particle size D1 of the primary particles was 120 nm, the shape was octahedral, and the saturation magnetism at 796 kA/m was 88 $Am^2/kg$ was prepared as the magnetic body used in the production of the magnetic toner core base particles.

(B.12.3) Production of Magnetic Toner Core Base Particles [12*c*]

The following components were premixed with a Henschel mixer, and then, the mixture was melt-kneaded by using PCM-30 (manufactured by Ikegai Iron Works, Ltd.) while the temperature was set so that the temperature of the molten product at the ejection port was 150° C.

<Components>

| | |
|---|---|
| Amorphous polyester [a12] | 100 parts by mass |
| Magnetic body [3] | 60 parts by mass |
| Sasol wax C105 (manufactured by Sasol Limited) | 1 part by mass |
| Charge control agent "T-77" (manufactured by Hodogaya Chemical Co., Ltd.) | 2 parts by mass |

Note that Sazol Wax C105 (manufactured by Sazol Co., Ltd.) in the above components is Fischer-Tropsch wax and has a melting point of 105° C.

The obtained kneaded product was cooled, coarsely pulverized with a hammermill, and then finely pulverized using a Turbo Mill T250 (manufactured by Turbo Kogyo Co., Ltd.) as a pulverizer. The resulting finely pulverized powder was classified using a multi-class classifier utilizing the Coanda effect to prepare magnetic toner core base particles [12*c*] having a weight-average particle size (D4) of 6.7 μm.

(B.12.4) Production of Toner Base Particles [12]

The toner base particles [12] were not subjected to the surface modification treatment of the magnetic toner core base particles with inorganic particles, and the magnetic toner core base particles [12*c*] were directly used as the toner base particles [12]. The toner base particles [12] had a weight average particle size of 6.7 μm.

(B.12.5) Addition of External Additive and Measurement of Glass Transition Temperature The external additive was added in the same manner as in Toner 10. The glass transition temperature was measured in the same manner as in the toner 1, and the glass transition temperature (Tg) of the toner 12 was 38.2° C.

The components and addition amounts of the magnetic toner core base particles [10*c*], [11*c*], and [12*c*] are shown in Table VIII.

The magnetic toner core base particles [10*c*] and [11*c*] used in the production of the toner base particles [10] and the toner base particles [11] were subjected to a surface-modifying treatment by "High-Speed Airflow Impact Method: Hybridization System, Nara Machinery Co., Ltd.", and thus the combination, the addition amounts, and the like are summarized in Table IX.

Table X shows the toner base particles and the magnetic toner core base particles, the presence or absence of the surface modification treatment by the hybridization system, the type and addition amount of the external additive, and the polyester content and the glass transition temperature in the toner containing the external additive of the toners 10 to 12.

TABLE VIII

| MAGNETIC TONER CORE BASE PARTICLES NO. | | [10c] | [11c] | [12c] |
|---|---|---|---|---|
| AMORPHOUS PEs | [a10] | 100.0 | — | — |
| | [a11] | — | 100.0 | — |
| | [a12] | — | — | 100.0 |
| MAGNETIC BODY | [1] | 60.0 | — | — |
| | [2] | — | 60.0 | — |
| | [3] | — | — | 60.0 |
| RELEASE AGENT | C105 | 1.0 | 1.0 | 1.0 |
| CHARGE CONTROL AGENT | T-77 | 2.0 | 2.0 | 2.0 |

THE NUMBERS IN THE TABLE REPRESENT THE ADDITION AMOUNTS [PARTS BY MASS].
"PEs" IN THE TABLE REPRESENTS POLYESTER.

TABLE IX

| TONER BASE PARTICLES NO. | | [10] | [11] |
|---|---|---|---|
| MAGNETIC TONER CORE BASE PARTICLE | [10c] | 100.0 | — |
| | [11c] | — | 100.0 |
| SURFACE MODIFIED PARTICLE "X24" | [X24-9163A] | 4.5 | — |
| | [X24-9600A-80] | — | 3.5 |

THE NUMBERS IN THE TABLE REPRESENT THE ADDITION AMOUNTS [PARTS BY MASS].

TABLE X

| TONER NO. | | 10 | 11 | 12 |
|---|---|---|---|---|
| TONER BASE PARTICLES NO. | | [10] | [11] | [12] |
| MAGNETIC TONER CORE BASE PARTICLES NO. | | [10c] | [11c] | [12c] |
| SURFACE MODIFICATION BY HYBRIDIZER | | YES | YES | NO |
| ADDITION AMOUNT OF EXTERNAL ADDITIVE [PARTS BY MASS] | HYDROPHOBIC SILICA FINE PARTICLES [1] | 0.5 | 0.5 | 0.5 |
| | HYDROPHOBIC SILICA FINE PARTICLES [2] | 0.5 | 0.5 | 0.5 |
| CONTENT OF PEs IN TONER INCLUDING EXTERNAL ADDITIVE [% BY MASS] | | 52.8 | 54.3 | 60.7 |
| GLASS TRANSITION TEMPERATURE [° C.] | | 0.2 | 28.6 | 38.2 |

"PEs" IN THE TABLE REPRESENTS POLYESTER.
THE VALUES IN THE TABLE REPRESENT THE ADDITION AMOUNTS [PARTS BY MASS].

(B.13) Production of Toner 13

(B.13.1) Production of Magnetic Iron Oxide Particles [1]

To 50 L of an aqueous ferrous sulfate solution containing 2.0 mol/L of $Fe^{2+}$, 55 L of a 4.0 mol/L aqueous sodium hydroxide solution was mixed and stirred to prepare an aqueous ferrous salt solution containing ferrous hydroxide colloid. This aqueous solution was held at 85° C., and an oxidation reaction was performed while blowing air at 20 L/min to obtain a slurry containing core particles.

The obtained slurry was filtered and washed with a filter press, and then, the core particles were again dispersed in water and reslurried. To this reslurry liquid, sodium silicate was added in an amount of 0.20% by mass in terms of silicon based on 100 parts by mass of the core particles, and the pH of the slurry liquid was adjusted to 6.0, followed by stirring to prepare a reslurry liquid containing magnetic iron oxide particles having a silicon-rich surface.

The prepared reslurry liquid was filtered with a filter press, washed, and further reslurried with ion-exchanged water. To this reslurry liquid (solid content 50 g/L), 500 g (10% by mass with respect to the magnetic iron oxide) of an ion exchange resin SK110 (manufactured by Mitsubishi Chemical Corporation) was charged, and the mixture was stirred for 2 hours to perform ion exchange.

Thereafter, the ion exchange resin was removed by filtration with a mesh, the resultant was filtered and washed with a filter press, dried, and cracked to prepare magnetic iron oxide particles [1] having a number-average particle size of 0.23 μm.

(B.13.2) Preparation of Aqueous Silane Compound Solution

While stirring, 30 parts by mass of iso-butyltrimethoxysilane was added dropwise to 70 parts by mass of ion-exchanged water. Thereafter, the aqueous solution was held at pH 5.5 and a temperature of 55° C., and was dispersed for 120 minutes at a circumferential speed of 0.46 m/s using a disper blade to perform hydrolysis. Thereafter, the aqueous solution was adjusted to pH 7.0 and cooled to 10° C. to stop the hydrolysis reaction. Thus, an aqueous silane compound solution (1) containing a silane compound was prepared.

(B.13.3) Production of Magnetic Body [4]

One hundred (100) parts by mass of the magnetic iron oxides [1] were placed in a high-speed mixer (LFS-2 type, manufactured by Fukae Powtec Co., Ltd.) and stirred at a rotational speed of 2000 rpm while 8.0 parts by mass of the aqueous silane compound solution (1) was added dropwise over 2 minutes. Thereafter, the mixture was mixed and stirred for 5 minutes to obtain a mixture [1].

Next, in order to increase the fixing property of the silane compound, the mixture was dried at 40° C. for 1 hour to reduce the water content, and then the mixture [1] was dried at 110° C. for 3 hours to allow the condensation reaction of the silane compound to proceed. Thereafter, the resultant was cracked and passed through a sieve having an opening of 100 μm to produce a magnetic body [4].

(B.13.4) Production of Crystalline Polyester [c7]

The following components were placed in a reaction tank equipped with a nitrogen introducing tube, a dewatering tube, a stirrer, and a thermocouple.

<Components>

| | |
|---|---|
| 1,9-Nonanediol | 49 mol % |
| 1,10-Decanedioic acid | 49 mol % |
| n-Octadecanoic acid | 2 mol % |

Thereafter, 1 part by mass of tin dioctylate was added as a catalyst relative to 100 parts by mass of the total amount of monomers, and the mixture was heated to 140° C. in a nitrogen atmosphere and reacted for 6 hours while water was distilled off under normal pressure. The mixture was then reacted while the temperature was raised to 200° C. at 10° C./hour, and reacted for 2 hours after reaching 200° C.

Thereafter, the pressure in the reaction tank was reduced to 5 kPa or less, and the mixture was reacted at 200° C. for 3 hours to produce a crystalline polyester [c7]. At this time, the acid number of the crystalline polyester [c7] was 2.2 mgKOH/g, and the weight average molecular weight (Mw) thereof was 34200.

(B.13.5) Preparation of First Aqueous Medium [1]

To 353.8 parts by mass of ion-exchanged water, 2.9 parts by mass of sodium phosphate dodecahydrate was added, and the mixture was heated to 60° C. while stirring with a TK-type homomixer (manufactured by Tokushu Kika Kogyo Co., Ltd.).

Thereafter, an aqueous calcium chloride solution prepared by adding 1.7 parts by mass of calcium chloride dihydrate to 11.7 parts by mass of ion-exchanged water and an aqueous magnesium chloride solution prepared by adding 0.5 parts by mass of magnesium chloride to 15.0 parts by mass of ion-exchanged water were added thereto, and the mixture was stirred to prepare a first aqueous medium [1].

(B.13.6) Production of Polymerizable Monomer Composition [1]

The following components were uniformly dispersed and mixed using an attritor (manufactured by Mitsui Miike Chemical Engineering Machinery Co., Ltd.).

<Components>

| | |
|---|---|
| Stearyl methacrylate | 90.0 parts by mass |
| Methyl methacrylate | 10.0 parts by mass |
| Magnetic body [4] | 95.0 parts by mass |
| Crystalline polyester [c7] | 5.0 parts by mass |

Thereafter, the mixture was heated to 60° C., and the following components were added thereto, mixed, and dissolved to produce a polymerizable monomer composition [1].

<Components>

| | |
|---|---|
| Behenyl stearate wax | 15.0 parts by mass |
| "HNP-9" (manufactured by Nippon Seiro Co., Ltd.) | 8.0 parts by mass |

Note that the behenyl stearate wax as the above-described component is an ester wax and has a melting point of 68° C. The above-described component "HNP-9" is a hydrocarbon wax (paraffin wax).

(B.13.7) Preparation of Second Aqueous Medium [1]

To 166.8 parts by mass of ion-exchanged water, 0.6 parts by mass of sodium phosphate dodecahydrate was added, and the mixture was heated to 60° C. while stirring with a paddle stirring blade.

Thereafter, an aqueous calcium chloride solution prepared by adding 0.3 parts by mass of calcium chloride dihydrate to 2.3 parts by mass of ion-exchanged water was added thereto, and the mixture was stirred to prepare a second aqueous medium [1].

(B.13.8) Preparation of Granulation Liquid [1A] Containing Polymerizable Monomer Composition The polymerizable monomer composition [1] was added to the first aqueous medium [1] to obtain a granulation liquid [1*a*].

The granulated liquid [1*a*] was treated for 1 hour with CAVITRON (manufactured by Eurotec) at a circumferential speed of the rotor of 29 m/s, and was uniformly dispersed and mixed. Furthermore, 7.0 parts by mass of t-butyl peroxypivalate was added as a polymerization initiator, and granulation was performed while stirring for 10 minutes at a circumferential speed of 22 m/s using CLEARMIX (manufactured by M Technique Co., Ltd.) under an atmosphere of $N_2$ at 60° C. Thus, a granulation liquid [1A] containing a polymerizable monomer composition was prepared.

(B.13.9) Polymerization/Distillation/Drying/External Addition

The granulation liquid [1A] containing the polymerizable monomer composition was added to the above-described second aqueous medium [1], and the mixture was reacted for 3 hours at 74° C. while stirring with a paddle stirring blade. After the completion of the reaction, the mixture was heated to 98° C. and distilled for 3 hours to obtain a reaction slurry [1].

Thereafter, as a cooling step, water at 0° C. was added to the reaction slurry [1], and the reaction slurry [1] was cooled from 98° C. to 45° C. at a rate of 100° C./min. Further, thereafter, the temperature was increased and the reaction slurry was held at 50° C. for 3 hours. Thereafter, the reaction slurry was allowed to cool at room temperature to 25° C.

The cooled slurry [1] was washed by adding hydrochloric acid, filtered, and dried to prepare magnetic toner core base particles [13*c*] having a weight-average particle size of 6.1 μm.

(B.13.10) Surface Modification Treatment of Magnetic Toner Core Base Particles with Inorganic Particles The following materials were charged into "Impact method in high-speed airflow: Hybridization System, Nara Machinery Co., Ltd." to produce an ordered mixture.

Magnetic toner core base particles [13*c*] 100 parts by mass Inorganic Fine Particles "X24" (for surface modification) 4.5 parts by mass Note that the above-described inorganic fine particles "X24" were sol-gel silica spherical fine particles "X24-9163A" manufactured by Shin-Etsu Chemical Co., Ltd, and those having an average particle size of 110 nm were used.

Thereafter, the blade rotational speed and the product temperature were controlled to fix the inorganic fine particles "X24" on the surfaces of the magnetic toner core base particles [13*c*], thereby producing toner base particles [13]. At this time, the toner base particles [13] in which the inorganic fine particles "X24" were fixed had a weight-average particle size of 6.4 μm.

(B.13.11) Addition of External Additive and Measurement of Glass Transition Temperature The external additive was added in the same manner as in Toner 10. The glass transition temperature was measured in the same manner as in the toner 1, and the glass transition temperature (Tg) of the toner 13 was 0.3° C.

(B.14) Production of Toner 14

(B.14.1) Production of Magnetic Iron Oxide Particles [2]

To 50 L of an aqueous ferrous sulfate solution containing 2.0 mol/L of $Fe^{2+}$, 55 L of a 4.0 mol/L aqueous sodium hydroxide solution was mixed and stirred to prepare an aqueous ferrous salt solution containing ferrous hydroxide colloid.

This aqueous solution was held at 85° C., and an oxidation reaction was performed while blowing air at 20 L/min to obtain a slurry containing core particles.

The obtained slurry was filtered and washed with a filter press, and then, the core particles were again dispersed in water and reslurried.

To this reslurry liquid, sodium silicate was added in an amount of 0.20% by mass in terms of silicon based on 100 parts by mass of the core particles, and the pH of the slurry liquid was adjusted to 6.0, followed by stirring to prepare a reslurry liquid containing magnetic iron oxide particles having a silicon-rich surface.

The obtained reslurry liquid was filtered with a filter press, washed, and further reslurried with ion-exchanged water. To this reslurry liquid (solid content 50 g/L), 500 g (10% by mass with respect to the magnetic iron oxide) of an ion exchange resin SK110 (manufactured by Mitsubishi Chemical Corporation) was charged, and the mixture was stirred for 2 hours to perform ion exchange.

Thereafter, the ion exchange resin was removed by filtration with a mesh, the resultant was filtered and washed with a filter press, dried, and cracked to prepare magnetic iron oxide particles [2] having a number-average particle size of 0.23 μm.

(B.14.2) Preparation of Aqueous Silane Compound Solution

While stirring, 30 parts by mass of iso-butyltrimethoxysilane was added dropwise to 70 parts by mass of ion-exchanged water. Thereafter, the aqueous solution was held at pH 5.5 and a temperature of 55° C., and was dispersed for 120 minutes at a circumferential speed of 0.46 m/s using a disper blade to perform hydrolysis. Thereafter, the aqueous solution was adjusted to pH 7.0 and cooled to 10° C. to stop the hydrolysis reaction. Thus, an aqueous silane compound solution (2) containing a silane compound was prepared.

(B.14.3) Production of Magnetic Body [5]

One hundred (100) parts by mass of the magnetic iron oxides [2] were placed in a high-speed mixer (LFS-2 type, manufactured by Fukae Powtec Co., Ltd.) and stirred at a rotational speed of 2000 rpm while 8.0 parts by mass of the aqueous silane compound solution (2) was added dropwise over 2 minutes. Thereafter, the mixture was mixed and stirred for 5 minutes to obtain a mixture [2].

Next, in order to increase the fixing property of the silane compound, the mixture was dried at 40° C. for 1 hour to reduce the water content, and then the mixture [2] was dried at 110° C. for 3 hours to allow the condensation reaction of the silane compound to proceed. Thereafter, the resultant was cracked and passed through a sieve having an opening of 100 μm to produce a magnetic body [5].

(B.14.4) Production of Crystalline Polyester [c8]

The following components were placed in a reaction tank equipped with a nitrogen introducing tube, a dewatering tube, a stirrer, and a thermocouple.

<Components>

| | |
|---|---|
| 1,9-Nonanediol | 49 mol % |
| 1,10-Decanedioic acid | 49 mol % |
| n-Octadecanoic acid | 2 mol % |

Thereafter, 1 part by mass of tin dioctylate was added as a catalyst relative to 100 parts by mass of the total amount of monomers, and the mixture was heated to 140° C. in a nitrogen atmosphere and reacted for 6 hours while water was distilled off under normal pressure. The mixture was then reacted while the temperature was raised to 200° C. at 10° C./hour, and reacted for 2 hours after reaching 200° C.

Thereafter, the pressure in the reaction tank was reduced to 5 kPa or less, and the mixture was reacted at 200° C. for 3 hours to produce a crystalline polyester [c8]. At this time, the acid number of the crystalline polyester [c8] was 2.2 mgKOH/g, and the weight average molecular weight (Mw) thereof was 34200.

(B.14.5) Preparation of First Aqueous Medium [2]

To 353.8 parts by mass of ion-exchanged water, 2.9 parts by mass of sodium phosphate dodecahydrate was added, and the mixture was heated to 60° C. while stirring with a TK-type homomixer (manufactured by Tokushu Kika Kogyo Co., Ltd.). Thereafter, an aqueous calcium chloride solution prepared by adding 1.7 parts by mass of calcium chloride dihydrate to 11.7 parts by mass of ion-exchanged water and an aqueous magnesium chloride solution prepared by adding 0.5 parts by mass of magnesium chloride to 15.0 parts by mass of ion-exchanged water were added thereto, and the mixture was stirred to obtain a first aqueous medium [2].

(B.14.6) Production of Polymerizable Monomer Composition [2]

The following components were uniformly dispersed and mixed using an attritor (manufactured by Mitsui Miike Chemical Engineering Machinery Co., Ltd.).

<Components>

| | |
|---|---|
| Stearyl methacrylate | 67.0 parts by mass |
| Methyl methacrylate | 33.0 parts by mass |
| Magnetic body [5] | 95.0 parts by mass |
| Crystalline polyester [c8] | 5.0 parts by mass |

Thereafter, the mixture was heated to 60° C., and the following components were added thereto, mixed, and dissolved to prepare a polymerizable monomer composition [2].

<Components>

| | |
|---|---|
| Behenyl stearate wax | 15.0 parts by mass |
| "HNP-9" (manufactured by Nippon Seiro Co., Ltd.) | 8.0 parts by mass |

Note that the behenyl stearate wax as the above-described component is an ester wax and has a melting point of 68° C. The above-described component "HNP-9" is a hydrocarbon wax (paraffin wax).

(B.14.7) Preparation of Second Aqueous Medium [2]

To 166.8 parts by mass of ion-exchanged water, 0.6 parts by mass of sodium phosphate dodecahydrate was added, and the mixture was heated to 60° C. while stirring with a paddle stirring blade. Thereafter, an aqueous calcium chloride solution prepared by adding 0.3 parts by mass of calcium chloride dihydrate to 2.3 parts by mass of ion-exchanged water was added thereto, and the mixture was stirred to prepare a second aqueous medium [2].

(B.14.8) Preparation of Granulation Liquid [2A] Containing Polymerizable Monomer Composition The polymerizable monomer composition [2] was added to the first aqueous medium [2] to obtain a granulation liquid [2*a*]. The granulated liquid [2*a*] was treated for 1 hour with CAVITRON (manufactured by Eurotec) at a circumferential speed of the rotor of 29 m/s, and was uniformly dispersed and mixed. Furthermore, 7.0 parts by mass of t-butyl peroxypivalate was added as a polymerization initiator, and granulation was performed while stirring for 10 minutes at a circumferential speed of 22 m/s using CLEARMIX (manufactured by M Technique Co., Ltd.) under an atmosphere of $N_2$ at 60° C., thereby preparing a granulation liquid [2A] containing a polymerizable monomer composition.

(B.14.9) Polymerization/Distillation/Drying/External Addition

The granulation liquid [2A] containing the polymerizable monomer composition was added to the above-described second aqueous medium [2], and the mixture was reacted for 3 hours at 74° C. while stirring with a paddle stirring blade. After the completion of the reaction, the mixture was heated to 98° C. and distilled for 3 hours to obtain a reaction slurry [2].

Thereafter, as a cooling step, water at 0° C. was added to the reaction slurry [2], and the reaction slurry [2] was cooled from 98° C. to 45° C. at a rate of 100° C./min. Further, thereafter, the temperature was increased and the reaction slurry was held at 50° C. for 3 hours. Thereafter, the reaction slurry was allowed to cool at room temperature to 25° C.

The cooled slurry [2] was washed by adding hydrochloric acid, filtered, and dried to prepare magnetic toner core base particles [14*c*] having a weight-average particle size of 6.1 μm.

(B.14.10) Surface Modification Treatment of Magnetic Toner Core Base Particles with Inorganic Particles The following materials were charged into "Impact method in high-speed airflow: Hybridization System, Nara Machinery Co., Ltd." to produce an ordered mixture.

Magnetic toner core base particles [14*c*] 100 parts by mass

Inorganic Fine Particles "X24" (for surface modification) 3.5 parts by mass

Note that the above-described inorganic fine particles "X24" were sol-gel silica spherical fine particles "X24-9600A-80" manufactured by Shin-Etsu Chemical Co., Ltd, and those having an average particle size of 80 nm were used.

Thereafter, the blade rotational speed and the product temperature were controlled to fix the inorganic fine particles "X24" on the surfaces of the magnetic toner core base particles [11*c*], thereby producing toner base particles [14]. The toner base particles [14] had a weight-average particle size of 6.4 μm.

(B.14.11) Addition of External Additive and Measurement of Glass Transition Temperature The external additive was added in the same manner as in Toner 10. The glass transition temperature was measured in the same manner as in the toner 1, and the glass transition temperature (Tg) of the toner 14 was 25.6° C.

(B.15) Production of Toner 15

(B.15.1) Production of Magnetic Iron Oxide Particles [15]

To 50 L of an aqueous ferrous sulfate solution containing 2.0 mol/L of $Fe^{2+}$, 55 L of a 4.0 mol/L aqueous sodium hydroxide solution was mixed and stirred to prepare an aqueous ferrous salt solution containing ferrous hydroxide colloid. This aqueous solution was held at 85° C., and an oxidation reaction was performed while blowing air at 20 L/min to obtain a slurry containing core particles.

The obtained slurry was filtered and washed with a filter press, and then, the core particles were again dispersed in water and reslurried. To this reslurry liquid, sodium silicate was added in an amount of 0.20% by mass in terms of silicon based on 100 parts by mass of the core particles, and the pH of the slurry liquid was adjusted to 6.0, followed by stirring to prepare a reslurry liquid containing magnetic iron oxide particles having a silicon-rich surface.

The prepared reslurry liquid was filtered with a filter press, washed, and further reslurried with ion-exchanged water. To this reslurry liquid (solid content 50 g/L), 500 g (10% by mass with respect to the magnetic iron oxide) of an ion exchange resin SK110 (manufactured by Mitsubishi Chemical Corporation) was charged, and the mixture was stirred for 2 hours to perform ion exchange.

Thereafter, the ion exchange resin was removed by filtration with a mesh, the resultant was filtered and washed with a filter press, dried, and cracked to prepare magnetic iron oxide particles [3] having a number-average particle size of 0.23 μm.

(B.15.2) Preparation of Aqueous Silane Compound Solution

While stirring, 30 parts by mass of iso-butyltrimethoxysilane was added dropwise to 70 parts by mass of ion-exchanged water. Thereafter, the aqueous solution was held at pH 5.5 and a temperature of 55° C., and was dispersed for 120 minutes at a circumferential speed of 0.46 m/s using a disper blade to perform hydrolysis. Thereafter, the aqueous solution was adjusted to pH 7.0 and cooled to 10° C. to stop the hydrolysis reaction. Thus, an aqueous silane compound solution (3) containing a silane compound was prepared.

(B.15.3) Production of Magnetic Body [6]

One hundred (100) parts by mass of the magnetic iron oxides [3] were placed in a high-speed mixer (LFS-2 type, manufactured by Fukae Powtec Co., Ltd.) and stirred at a rotational speed of 2000 rpm while 8.0 parts by mass of the aqueous silane compound solution (3) was added dropwise over 2 minutes. Thereafter, the mixture was mixed and stirred for 5 minutes to obtain a mixture [3].

Next, in order to increase the fixing property of the silane compound, the mixture was dried at 40° C. for 1 hour to reduce the water content, and then the mixture [3] was dried at 110° C. for 3 hours to allow the condensation reaction of the silane compound to proceed. Thereafter, the resultant was cracked and passed through a sieve having an opening of 100 μm to produce a magnetic body [6].

(B.15.4) Production of Crystalline Polyester [c9]

The following components were placed in a reaction tank equipped with a nitrogen introducing tube, a dewatering tube, a stirrer, and a thermocouple.

<Components>

| | |
|---|---|
| 1,9-Nonanediol | 49 mol % |
| 1,10-Decanedioic acid | 49 mol % |
| n-Octadecanoic acid | 2 mol % |

Thereafter, 1 part by mass of tin dioctylate was added as a catalyst relative to 100 parts by mass of the total amount of monomers, and the mixture was heated to 140° C. in a nitrogen atmosphere and reacted for 6 hours while water was distilled off under normal pressure. The mixture was then reacted while the temperature was raised to 200° C. at 10° C./hour, and reacted for 2 hours after reaching 200° C.

Thereafter, the pressure in the reaction tank was reduced to 5 kPa or less, and the mixture was reacted at 200° C. for 3 hours to produce a crystalline polyester [c9]. At this time, the acid number of the crystalline polyester [c9] was 2.2 mgKOH/g, and the weight average molecular weight (Mw) thereof was 34200.

(B.15.5) Preparation of First Aqueous Medium [3]

To 353.8 parts by mass of ion-exchanged water, 2.9 parts by mass of sodium phosphate dodecahydrate was added, and the mixture was heated to 60° C. while stirring with a TK-type homomixer (manufactured by Tokushu Kika Kogyo Co., Ltd.).

Thereafter, an aqueous calcium chloride solution prepared by adding 1.7 parts by mass of calcium chloride dihydrate to 11.7 parts by mass of ion-exchanged water and an aqueous magnesium chloride solution prepared by adding 0.5 parts by mass of magnesium chloride to 15.0 parts by mass of ion-exchanged water were added thereto, and the mixture was stirred. Thus, a first aqueous medium [3] was prepared.

(B.15.6) Production of Polymerizable Monomer Composition [3]

The following components were uniformly dispersed and mixed using an attritor (manufactured by Mitsui Miike Chemical Engineering Machinery Co., Ltd.).

<Components>

| | |
|---|---|
| Styrene | 75.0 parts by mass |
| n-Butyl acrylate | 25.0 parts by mass |
| 1-6 Hexanediol diacrylate | 0.5 parts by mass |
| Magnetic body [6] | 95.0 parts by mass |
| Crystalline polyester [c9] | 5.0 parts by mass |

Thereafter, the mixture was heated to 60° C., and the following components were added thereto, mixed, and dissolved to produce a polymerizable monomer composition [3].

<Components>

| | |
|---|---|
| Behenyl stearate wax | 15.0 parts by mass |
| "HNP-9" (manufactured by Nippon Seiro Co., Ltd.) | 8.0 parts by mass |

Note that the behenyl stearate wax as the above-described component is an ester wax and has a melting point of 68° C. The above-described component "HNP-9" is a hydrocarbon wax (paraffin wax).

(B.15.7) Preparation of Second Aqueous Medium [3]

To 166.8 parts by mass of ion-exchanged water, 0.6 parts by mass of sodium phosphate dodecahydrate was added, and the mixture was heated to 60° C. while stirring with a paddle stirring blade.

Thereafter, an aqueous calcium chloride solution prepared by adding 0.3 parts by mass of calcium chloride dihydrate to 2.3 parts by mass of ion-exchanged water was added thereto, and the mixture was stirred to prepare a second aqueous medium [3].

(B.15.8) Preparation of Granulation Liquid [15] Containing Polymerizable Monomer Composition The polymerizable monomer composition [3] was added to the first aqueous medium [3] to obtain a granulation liquid [3_a_]. The granulated liquid [3_a_] was treated for 1 hour with CAVITRON (manufactured by Eurotec) at a circumferential speed of the rotor of 29 m/s, and was uniformly dispersed and mixed.

Furthermore, 7.0 parts by mass of t-butyl peroxypivalate was added as a polymerization initiator, and granulation was performed while stirring for 10 minutes at a circumferential speed of 22 m/s using CLEARMIX (manufactured by M Technique Co., Ltd.) under an atmosphere of $N_2$ at 60° C. Thus, a granulation liquid [3A] containing a polymerizable monomer composition was prepared.

(B.15.9) Polymerization/Distillation/Drying/External Addition

The granulation liquid [3A] containing the polymerizable monomer composition was added to the above-described second aqueous medium [3], and the mixture was reacted for 3 hours at 74° C. while stirring with a paddle stirring blade. After the completion of the reaction, the mixture was heated to 98° C. and distilled for 3 hours to obtain a reaction slurry [3].

Thereafter, as a cooling step, water at 0° C. was added to the reaction slurry [3], and the reaction slurry [3] was cooled from 98° C. to 45° C. at a rate of 100° C./min. Further, thereafter, the temperature was increased and the reaction slurry was held at 50° C. for 3 hours. Thereafter, the reaction slurry was allowed to cool at room temperature to 25° C.

The cooled slurry [3] was washed by adding hydrochloric acid, filtered, and dried to prepare magnetic toner core base particles [15_c_] having a weight-average particle size of 6.1 μm. The magnetic toner core base particles [15_c_] were not subjected to a surface-modifying treatment, and the magnetic toner core base particles [15_c_] were used as they were as toner base particles [15]. At this time, the toner base particles [15] had a weight-average particle size of 6.4 μm.

(B.15.10) Addition of External Additive and Measurement of Glass Transition Temperature The external additive was added in the same manner as in Toner 10. The glass transition temperature was measured in the same manner as in the toner 1, the glass transition temperature (Tg) of the toner 15 was 39.1° C.

The components and addition amounts of the magnetic toner core base particles [13_c_], [14_c_], and [15_c_] are shown in Table XI. The magnetic toner core base particles [13_c_] and [14_c_] used in the Production of the toner base particles [13] and the toner base particles [14] were subjected to a surface-modifying treatment by "High-Speed Airflow Impact Method: Hybridization System, Nara Machinery Co., Ltd.", and thus the combination, the addition amounts, and the like are summarized in Table XII.

Table XIII shows the toner base particles and the magnetic toner core base particles, the presence or absence of the surface modification treatment by the hybridization system, the type and addition amount of the external additive, and the polyester content and the glass transition temperature in the toner containing the external additive of the toners 13 to 15.

TABLE XI

| | | MAGNETIC TONER CORE BASE PARTICLES NO. | | |
|---|---|---|---|---|
| | | [13c] | [14c] | [15c] |
| AMORPHOUS PEs | [c7] | 2.2 | — | — |
| | [c8] | — | 2.2 | — |
| | [c9] | — | — | 2.5 |
| St•Ac | STEARYL METHACRYLATE METHYL METHACRYLATE | 43.5 | 44.6 | 50.1 |
| MAGNETIC BODY | [4] | ○ 54.3 | — 53.2 | — 47.4 |
| | [5] | — | ○ | — |
| | [6] | — | — | ○ |
| RELEASE AGENT | ESTER WAX | ○ | ○ | ○ |
| | PARAFFIN WAX | ○ | ○ | ○ |
| | OTHERS | | OTHERS | OTHERS |

THE NUMBERS IN THE TABLE REPRESENT THE ADDITION AMOUNTS [PARTS BY MASS].
IN THE TABLE, "PEs" REPRESENTS POLYESTER, AND "St•Ac" REPRESENTS STYRENE-ACRYLIC RESIN.
"○" IN THE TABLE INDICATES THAT THE COMPONENT IS CONTAINED IN THE MAGNETIC TONER CORE BASE PARTICLES.
"—" IN THE TABLE INDICATES THAT THE COMPONENT IS NOT CONTAINED IN THE MAGNETIC TONER CORE BASE PARTICLES.
"OTHERS" IN THE TABLE REPRESENTS COMPONENTS OTHER THAN CRYSTALLINE PEs, St•Ac, MAGNETIC BODY AND RELEASE AGENT IN THE MAGNETIC TONER CORE BASE PARTICLES.
FOR EXAMPLE, MAGNETIC TONER CORE BASE PARTICLES NO. [13C] HAS 2.2 PARTS BY MASS OF CRYSTALLINE PEs, 43.5 PARTS BY MASS OF St•Ac, AND 54.3 PARTS BY MASS OF MAGNETIC BODY [4], ESTER WAX, PARAFFIN WAX AND OTHER INGREDIENTS.

TABLE XII

| TONER BASE PARTICLES NO. | | [13] | [14] |
|---|---|---|---|
| MAGNETIC TONER CORE BASE PARTICLE | [13c] | 100.0 | — |
| | [14c] | — | 100.0 |
| SURFACE MODIFIED PARTICLE "X24" | [X24-9163A] | 4.5 | — |
| | [X24-9600A- 80] | — | 3.5 |

THE NUMBERS IN THE TABLE REPRESENT THE ADDITION AMOUNT [PARTS BY MASS].

TABLE XIII

| | | TONER NO. | | |
|---|---|---|---|---|
| | | 13 | 14 | 15 |
| TONER BASE PARTICLES NO. | | [13] | [14] | [15] |
| MAGNETIC TONER CORE BASE PARTICLES NO. | | [13c] | [14c] | [15c] |
| SURFACE MODIFICATION BY HYBRIDIZER | | YES | YES | NO |
| ADDITION AMOUNT OF EXTERNAL ADDITIVE [PARTS BY MASS] | HYDROPHOBIC SILICA PARTICLES [1] | 0.5 | 0.5 | 0.5 |
| | HYDROPHOBIC SILICA PARTICLES [2] | 0.5 | 0.5 | 0.5 |
| CONTENT OF PEs IN TONER INCLUDING EXTERNAL ADDITIVE [% BY MASS] | | 2.1 | 2.2 | 2.5 |
| GLASS TRANSITION TEMPERATURE [° C.] | | 0.3 | 25.6 | 39.1 |

"PEs" IN THE TABLE REPRESENTS POLYESTER.
THE VALUES IN THE TABLE REPRESENT THE ADDITION AMOUNTS [PARTS BY MASS].

(B.16) Production of Toner 16

(B.16.1) Production of Amorphous Polyester [Ha]

The following components were charged into a reaction vessel equipped with a stirrer, a thermometer, a condenser, and a nitrogen gas introducing tube, the inside of the reaction vessel was replaced with dry nitrogen gas, and then tin dioctanoate was charged in an amount of 0.3% based on the total amount of the components.

<Components>

| | |
|---|---|
| Ethylene glycol | 106 parts by mass |
| Dimethyl terephthalate | 228 parts by mass |
| 1,10-Decanedicarboxylic acid | 123 parts by mass |

Under a nitrogen gas flow, the temperature was raised to 235° C. over 1 hour, and the mixture was reacted for 3 hours. The pressure in the reaction vessel was reduced to 10.0 mmHg, and the mixture was stirred and reacted. When a desired molecular weight was obtained, the reaction was terminated to produce an amorphous polyester [Ha].

(B.16.2) Preparation of Amorphous Polyester Dispersion (HA)

The following components were charged into a reaction vessel equipped with a stiffer and dissolved at 60° C.

<Components>

| | |
|---|---|
| Amorphous polyester [Ha] | 100 parts by mass |
| Methyl ethyl ketone | 60 parts by mass |
| Isopropyl alcohol | 10 parts by mass |

After dissolution was confirmed, the reaction vessel was cooled to 35° C., and then 3.5 parts by mass of a 10% aqueous ammonia solution was added. Then, 300 parts by mass of ion-exchanged water was added dropwise to the reaction vessel over 3 hours. Next, methyl ethyl ketone and isopropyl alcohol were removed by an evaporator to prepare an amorphous polyester dispersion (A1).

(B.16.3) Production of Toner Base Particles [16]

As toner core components, the respective dispersions were weighed so that the solid contents became the following amounts.

<Core Components>

| | |
|---|---|
| Amorphous polyester [Ha] | 47.5 parts by mass |
| Crystalline polyester [c1] | 22.0 parts by mass |
| Black colorant [B1] (solid content) | 6.0 parts by mass |
| Release agent [W1] (solid content) | 1.5 parts by mass |

Each dispersion was charged into a round stainless steel flask, then ion-exchanged water was added thereto so that the solid content concentration becomes 12.5%, and 6.3 parts of a 10% aqueous aluminum sulfate solution was further charged thereinto. Next, the mixture was mixed and dispersed at 5000 rpm for 10 minutes using a homogeniser (Ultra-Turrax T50, manufactured by IKA), and then the content in the flask was heated and stirred to 40° C. while being stirred.

Thereafter, the temperature was raised at 0.5° C. per minute, and the temperature was maintained when the particle size reached 6.1 μm. Next, the respective dispersions were weighed and mixed so that the solid content as the toner shell component became the following amount, and the mixed dispersion was charged and held for 60 minutes.

<Shell Components>

| | |
|---|---|
| Amorphous polyester [a5] | 20 parts by mass |
| Release agent dispersion [W1] (solid content) | 3 parts by mass |

The obtained content was observed with an optical microscope, and it was confirmed that aggregated particles were generated. After 11 parts of ethylenediaminetetraacetic acid (EDTA) tetrasodium salt "Chelest 40" (manufactured by Chelest Corporation) was added, an aqueous sodium hydroxide solution was added to adjust the pH to 8.

Thereafter, the temperature was raised to 82.5° C., then the pH was lowered by 0.05 per 10 minutes with nitric acid, and stirring was continued for 45 minutes. After cooling, the mixture was filtered, thoroughly washed with ion-exchanged water and dried to prepare toner base particles [16].

(B.16.4) Addition of External Additive and Measurement of Glass Transition Temperature To 100 parts by mass of the produced toner base particles [16], 3.0 parts by mass of hydrophobic silica "RY50" (manufactured by Nippon Aerosil Co., Ltd.) was added, and the mixture was mixed at 13000 rpm for 30 seconds using a sample mill. Thereafter, the resultant was sieved with a vibration sieve having an opening of 45 μm to prepare a toner 16.

The glass transition temperature (Tg) of the toner 16 was −1.5° C. Note that the glass transition temperature of the toner 16 was measured in the same manner as in the toner 1.

(B.17) Production of Toner 17

(B.17.1) Production of Amorphous Polyester [Hb]

An amorphous polyester [Hb] was produced in the same manner as the amorphous polyester [Ha] except that the following components were charged.

<Components>

| | |
|---|---|
| Bisphenol A ethylene oxide adduct | 140 parts by mass |
| Bisphenol A propylene oxide adduct | 260 parts by mass |
| Terephthalic acid | 100 parts by mass |
| Tetrapropenylsuccinic anhydride | 130 parts by mass |
| Trimellitic acid | 16 parts by mass |

(B.17.2) Preparation of Amorphous Polyester Dispersion (HB)

An amorphous polyester dispersion (HB) was prepared in the same manner as the amorphous polyester dispersion (HA) except that the amorphous polyester [Hb] was used in place of the amorphous polyester [Ha].

(B.17.3) Production of Toner Base Particles [17]

Toner base particles [17] were produced in the same manner as the toner base particles [16] except that the core components and the shell components were changed as follows.

<Core Components>

| | |
|---|---|
| Amorphous polyester [Hb] | 26.0 parts by mass |
| Amorphous polyester [a5] | 26.0 parts by mass |
| Crystalline polyester [c3] | 19.5 parts by mass |
| Black colorant [B1] (solid content) | 6.0 parts by mass |
| Release agent [W1] (solid content) | 1.5 parts by mass |

<Shell Components>

| | |
|---|---|
| Amorphous polyester [a5] | 18 parts by mass |
| Release agent dispersion [W1] (solid content) | 3 parts by mass |

(B.17.4) Addition of External Additive and Measurement of Glass Transition Temperature To 100 parts by mass of the produced toner base particles [17], 3.0 parts by mass of hydrophobic silica "RY50" (manufactured by Nippon Aerosil Co., Ltd.) was added, and the mixture was mixed at 13000 rpm for 30 seconds using a sample mill. Thereafter, the resultant was sieved with a vibration sieve having an opening of 45 μm to prepare a toner 17.

The glass transition temperature (Tg) of the toner 16 was 41.2° C. Note that the glass transition temperature of the toner 17 was measured in the same manner as in the toner 1.

The components and addition amounts of the toner base particles [16] and [17] are summarized in Table XIV. The type and addition amounts of the external additive, the polyester content in the toner containing the external additive, and the glass transition temperature of each of the toners 16 and 17 are shown in Table XV.

TABLE XIV

| | | | TONER BASE PARTICLES NO. | |
|---|---|---|---|---|
| | | | [16] | [17] |
| CORE | AMORPHOUS PEs | [Ha] | 47.5 | — |
| | | [Hb] | — | 26.0 |
| | | [a5] | — | 26.0 |
| | CRYSTALLINE PEs | [c1] | 22.0 | — |
| | | [c3] | — | 19.5 |
| | RELEASE AGENT | [W1] | 1.5 | 1.5 |
| SHELL | COLORANT | [B1] | 6.0 | 6.0 |
| | AMORPHOUS PEs | [a5] | 20.0 | 18.0 |
| | RELEASE AGENT | [W1] | 3.0 | 3.0 |

THE NUMBERS IN THE TABLE REPRESENT THE ADDITION AMOUNTS [PARTS BY MASS].
"PEs" IN THE TABLE REPRESENTS POLYESTER.

TABLE XV

| | TONER NO. | |
|---|---|---|
| | 16 | 17 |
| ADDITION AMOUNT OF EXTERNAL ADDITIVE (HYDROPHOBIC SILICA "RY50") [PARTS BY MASS] | 3.0 | 3.0 |
| CONTENT OF PEs IN TONER INCLUDING EXTERNAL ADDITIVE [% BY MASS]. | 86.9 | 86.9 |
| GLASS TRANSITION TEMPERATURE [° C.] | −1.5 | 41.2 |

"PEs" IN THE TABLE REPRESENTS POLYESTER.

C. Production of Carrier (Production of Resin-Coated Carrier [C])

The following components [1] excluding ferrite particles and glass beads (φ1 mm, the same amount as toluene) were stirred for 30 minutes at 1200 rpm using a sand mill (manufactured by Kansai Paint Co., Ltd.) to prepare a solution for forming a resin-coated layer (c1).

<Component [1]>

| | |
|---|---|
| Ferrite particles [f1] | 100.0 parts by mass |
| Toluene | 14.0 parts by mass |
| Copolymer A | 2.0 parts by mass |

Note that the ferrite particles [f1] are Mn—Mg—Sr-based ferrite particles having an average particle size of 40 m. The above copolymer A is a cyclohexylmethacrylate/dimethylaminoethylmethacrylate copolymer (weight ratio 99:1, Mw80000).

The solution for forming a resin-coated layer (c1) and the ferrite particles [f1] were placed in a vacuum degassing kneader, the pressure was reduced, and toluene was distilled off for drying. Thus, a resin-coated carrier [C] was produced.

D. Production of Developer (D.1) Production of Developer 1

The toner 1 and the carrier [C] were charged into a 2-liter V blender in the following amounts, stirred for 20 minutes in a normal temperature and normal humidity environment, and then sieved with a 105 μm sieve to produce a developer 1.

| | |
|---|---|
| Carrier 1 | 100 parts by mass |
| Toner 1 | 7 parts by mass |

(D.2) Production of Developers 2 to 9, 16, and 17

Developers 2 to 9, 16, and 17 were prepared in the same manner as in the procedure for preparing the developer 1 except that the type of toner was changed as in Table XVI from the toner 1.

(D.3) Production of Developers 10 to 15

The developers 10 to 15 were mono-component developers containing no carrier [C], and the toners 10 to 15 were used as the developers 10 to 15 without being processed.

TABLE XVI

| DEVELOPER NO. | TONER NO. | CARRIER NO. |
|---|---|---|
| 1 | 1 | [C] |
| 2 | 2 | [C] |
| 3 | 3 | [C] |
| 4 | 4 | [C] |
| 5 | 5 | [C] |
| 6 | 6 | [C] |
| 7 | 7 | [C] |
| 8 | 8 | [C] |
| 9 | 9 | [C] |
| 10 | 10 | — |
| 11 | 11 | — |
| 12 | 12 | — |
| 13 | 13 | — |
| 14 | 14 | — |
| 15 | 15 | — |
| 16 | 16 | [C] |
| 17 | 17 | [C] |

(D.3) Summary of Configuration of Developer

The above developers are summarized in Table XVII.

TABLE XVII

| | | TONER | | | | | |
|---|---|---|---|---|---|---|---|
| | | TONER BASE PARTICLE COMPOSITION | | | GLASS | EXTERNAL ADDITIVE | |
| DEVELOPER | No. | PEs CONTENT [% BY MASS] | St•Ac CONTENT [% BY MASS] | OTHERS CONTENT [% BY MASS] | TRANSITION TEMPERATURE [° C.] | CONTENT [PARTS BY MASS] | PEs *1 CONTENT [% BY MASS] |
| DEVELOPER 1 | 1 | 89.5 | 0.0 | 10.5 | 0.4 | 1.5 | 88.2 |
| DEVELOPER 2 | 2 | 85.0 | 4.5 | 10.5 | 24.8 | 1.5 | 83.7 |
| DEVELOPER 3 | 3 | 89.5 | 0.0 | 10.5 | 37.8 | 1.5 | 88.2 |
| DEVELOPER 4 | 4 | 83.8 | 5.8 | 10.4 | 0.1 | 1.5 | 82.6 |
| DEVELOPER 6 | 5 | 83.8 | 5.8 | 10.4 | 26.3 | 1.5 | 82.6 |
| DEVELOPER 6 | 6 | 81.6 | 5.4 | 13.0 | 37.2 | 1.5 | 80.4 |
| DEVELOPER 7 | 7 | 51.1 | 41.5 | 7.4 | 0.3 | 1.5 | 50.3 |
| DEVELOPER 8 | 8 | 51.5 | 40.9 | 7.6 | 29.1 | 1.5 | 50.7 |
| DEVELOPER 9 | 9 | 51.3 | 41.1 | 7.6 | 38.2 | 1.5 | 50.5 |
| DEVELOPER 10 | 10 | 53.3 | 0.0 | 46.7 | 0.2 | 1.0 | 52.8 |
| DEVELOPER 11 | 11 | 54.8 | 0.0 | 45.2 | 28.6 | 1.0 | 54.3 |
| DEVELOPER 12 | 12 | 61.3 | 0.0 | 38.7 | 38.2 | 1.0 | 60.7 |
| DEVELOPER 13 | 13 | 2.2 | 43.5 | 54.3 | 0.3 | 1.0 | 2.1 |
| DEVELOPER 14 | 14 | 2.2 | 44.6 | 53.2 | 25.6 | 1.0 | 2.2 |

TABLE XVII-continued

| DEVELOPER | No. | TONER BASE PARTICLE COMPOSITION PEs | St•Ac | OTHERS | GLASS TRANSITION TEMPERATURE [° C.] | EXTERNAL ADDITIVE CONTENT [PARTS BY MASS] | PEs *1 CONTENT [% BY MASS] |
|---|---|---|---|---|---|---|---|
| | | CONTENT [% BY MASS] | | | | | |
| DEVELOPER 15 | 15 | 2.5 | 50.1 | 47.4 | 39.1 | 1.0 | 2.5 |
| DEVELOPER 16 | 16 | 89.5 | 0.0 | 10.5 | −1.5 | 3.0 | 86.9 |
| DEVELOPER 17 | 17 | 89.5 | 0.0 | 10.5 | 41.2 | 3.0 | 86.9 |

*1: AMOUNT OF POLYESTER IN TONER INCLUDING EXTERNAL ADDITIVE

E. Evaluation (E.1) Preparation of Evaluation Apparatus (E.1.1) Two-Component Developing Apparatus (Preparation of Evaluation Apparatus when Using Developers 1 to 9, 16, and 17 in Image Formation)

As an image forming apparatus, "bizhub C650i (manufactured by Konica Minolta, Inc.) was prepared, and this apparatus was modified so that a black developing roller mounted therein was replaced with a predetermined developing roller to enable image outputting. Hereinafter, this apparatus is referred to as a two-component developing apparatus.

(E.1.2) Magnetic Mono-Component Developing Apparatus (Preparation of Evaluation Apparatus when Using Developers 10 to 15 in Image Formation)

As an image forming apparatus, a commercially available laser printer HP LaserJet Enterprise M506 (manufactured by Hewlett-Packard Company) was prepared. Tis apparatus was modified so that a black developing roller mounted therein was replaced with a predetermined developing roller to enable image outputting. Hereinafter, this apparatus is referred to as a magnetic mono-component developing apparatus.

With respect to each of the main bodies, the cartridge was taken out from the main body, the product toner was taken out from the cartridge, and 300 g of each developer was filled. The main body and the cartridge were left to stand for 24 hours in each environment in which temperature and humidity were controlled at the time of each image output evaluation, and then the image output evaluation was performed.

(E.2) Evaluation Methods and Evaluation Criteria (E.2.1) Charge Amount Change (Evaluation Method with Two-Component Developing Apparatus: Evaluation Method for Developers 1 to 9, 16, and 17)

The developing rollers and the developers according to the combinations in Table XVIII were set in the two-component developing apparatus.

The charge amount of the developer on the developing roller was measured at the start of printing and after printing of 5000 sheets in continuous printing using a chart with a print percentage of 2%, and the degree of decrease in the charge amount was compared by calculating the absolute value of the difference, and evaluated according to the following evaluation criteria. A and B were accepted, and C was rejected. The results are shown in Table XVIII.

Note that the absolute value of the difference was calculated by the following Expression (1).

Absolute value of differences=|(value of charge amount at start of printing −value of charge amount after printing of 5000 sheets)| Expression (1)

(Evaluation Criteria)

A: The absolute value of the difference is 4 μC/g or less.

B: The absolute value of the difference is more than 4 μC/g and 10 μC/g or less.

C: The absolute value of the difference is a value more than 10 μC/g or less.

Figure 8:
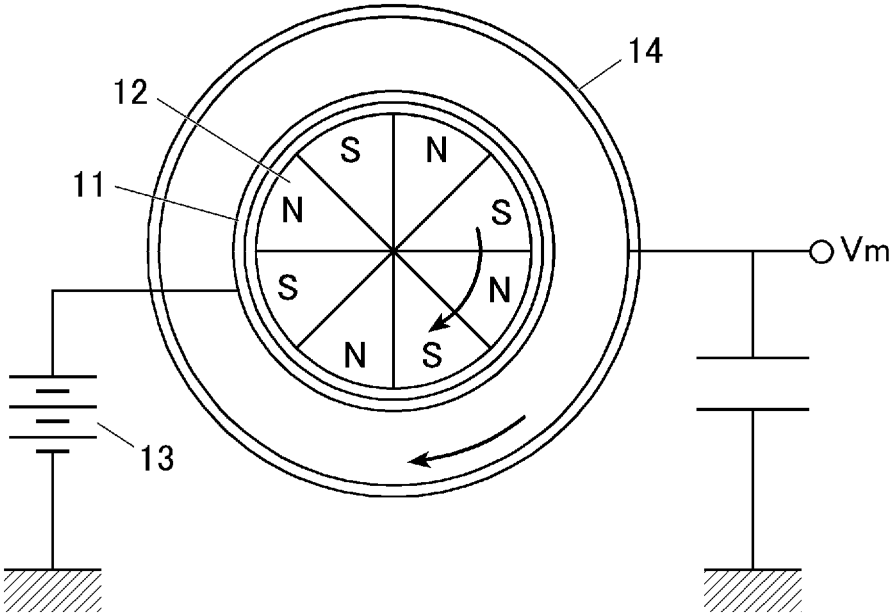
FIG. 8 is a schematic diagram of a charge amount measurement apparatus.

As a measurement apparatus, an apparatus as illustrated in FIG. 8 was used for measurement. As a measurement apparatus, a suction-type compact charge amount measurement device "Model 212HS" (manufactured by West One Corporation) was used. The measurement method was as follows.

First, 1 g of a two-component developer weighed with a precision balance was placed on the entire surface of a conductive sleeve 11 so as to be uniform. A 2 kV voltage was supplied from the bias power source 13 to the conductive sleeve 11, and the number of rotations of the magnet roller 12 provided in the conductive sleeve 11 was set to a 1000 rpm.

The two-component developer was allowed to stand for 30 seconds under the above conditions, and collected on the cylindrical electrode 14. Then, after 30 seconds, the potential Vm of the cylindrical electrode 14 was read, and at the same time, the amount of charge of the two-component developer was obtained, and furthermore, the mass of the collected two-component developer was measured with a precision balance, and the average charge amount (−μC/g) was obtained and used as a measurement value.

(Evaluation Method with Magnetic Mono-Component Developing Apparatus: Evaluation Method for Developers 10 to 15)

The developing rollers and the developers according to the combinations in Table XVIII were set in the magnetic mono-component developing apparatus. The toner charge amount on the developing roller was measured at the start of printing and after printing of 5000 sheets, and the degree of decrease in the charge amount was compared by calculating the absolute value of the difference, and evaluated according to the following evaluation criteria. A and B were accepted, and C was rejected. The results are shown in Table XVIII. Note that the absolute value of the difference was calculated by the above-described Expression (1), and the evaluation criteria was also the same as those of the evaluation method by the two-component developing apparatus. In addition, the same measurement apparatus as that used in the evaluation by the two-component developing apparatus was used.

TABLE XVIII

| EXAMPLES OR COMPARATIVE EXAMPLES | DEVELOPER ROLLER NO. | DEVELOPER NO. | GLASS TRANSITION TEMPERATURE [° C.] | CHARGE AMOUNT [μC/g] AT THE START OF PRINTING | AFTER PRINTING 5000 SHEETS | DIFFERENCE *2 | ABSOLUTE VALUE OF DIFFERENCE | EVAL-UATION |
|---|---|---|---|---|---|---|---|---|
| EXAMPLE 1 | 1 | 1 | 0.4 | 54.4 | 49.6 | −4.8 | 4.8 | B |
| EXAMPLE 2 | 2 | 2 | 24.8 | 54.8 | 51.7 | −3.1 | 3.1 | A |
| EXAMPLE 3 | 3 | 3 | 37.8 | 54.9 | 52.8 | −2.1 | 2.1 | A |
| EXAMPLE 4 | 4 | 4 | 0.1 | 53.4 | 50.2 | −3.3 | 3.3 | A |
| EXAMPLE 5 | 5 | 5 | 26.3 | 54.8 | 52.3 | −2.6 | 2.6 | A |
| EXAMPLE 6 | 6 | 6 | 37.2 | 53.1 | 44.0 | −9.1 | 9.1 | B |
| EXAMPLE 7 | 7 | 7 | 0.3 | 54.2 | 45.8 | −8.4 | 8.4 | B |
| EXAMPLE 8 | 1 | 8 | 29.1 | 53.7 | 46.5 | −7.2 | 7.2 | B |
| EXAMPLE 9 | 2 | 9 | 38.2 | 53.6 | 49.9 | −3.7 | 3.7 | A |
| EXAMPLE 10 | 8 | 10 | 0.2 | 34.1 | 29.2 | −4.9 | 4.9 | B |
| EXAMPLE 11 | 9 | 11 | 28.6 | 33.4 | 29.6 | −3.8 | 3.8 | A |
| EXAMPLE 12 | 10 | 12 | 38.2 | 33.2 | 31.4 | −1.9 | 1.9 | A |
| EXAMPLE 13 | 8 | 13 | 0.3 | 33.2 | 27.8 | −5.4 | 5.4 | B |
| EXAMPLE 14 | 9 | 14 | 25.6 | 33.0 | 27.1 | −6.0 | 6.0 | B |
| EXAMPLE 15 | 10 | 15 | 39.1 | 33.6 | 30.9 | −2.7 | 2.7 | A |
| EXAMPLE 16 | 2 | 16 | −1.5 | 54.3 | 49.0 | −5.3 | 5.3 | B |
| EXAMPLE 17 | 2 | 17 | 41.2 | 54.5 | 51.6 | −2.9 | 2.9 | A |
| COMPARATIVE EXAMPLE 1 | 11 | 2 | 24.8 | 53.3 | 27.1 | −26.3 | 26.3 | C |
| COMPARATIVE EXAMPLE 2 | 12 | 2 | 24.8 | 53.5 | 38.7 | −14.8 | 14.8 | C |

*2: (VALUE AT START OF PRINTING) − (VALUE AFTER PRINTING 5000 SHEETS)

(E.2.2) In-Machine Scattering Confirmation (Evaluation Method with Two-Component Developing Apparatus and Magnetic Mono-Component Developing Apparatus)

A double-sided tape was attached to the upper portion of the developing device before the start of printing, and a toner contamination component caused by toner scattering in the machine after printing of 5000 sheets was measured with a reflection densitometer (RD-918; Macbeth Co). The difference from the start of printing to after printing of 5000 sheets was quantified and evaluated according to the following evaluation criteria. A and B were accepted, and C was rejected. The results are shown in Table XIX.

(Evaluation Criteria)

A: Almost no increase in density due to toner scattering is observed from the start of printing, and the difference of density is 0.1 or less.

B: Although slight toner scattering is observed from the start of printing, there is no practical problem, and the difference of density is 0.8 or less.

C: The amount of toner scattering from the start of printing is large, which is a practical problem, and the difference of density is more than 0.8.

(E.2.3) Evaluation of Image Quality (Evaluation Method with Two-Component Developing Apparatus and Magnetic Mono-Component Developing Apparatus)

The graininess was evaluated using the GI value described in Journal of the Imaging Society of Japan, 39 (2), 84-93 (2000), and the quality of the halftone, that is, the image quality was evaluated. Specifically, in each of the evaluations after the durable printing of 5000 sheets, an image of a gradation pattern having 32 levels of gradation ratio was output. The graininess of this image was evaluated by reading a gradation pattern with a CCD. The obtained read value was subjected to Fourier transform processing in consideration of Modulation Transfer Function (MTF) correction, a GI value (Graininess Index) corresponding to human relative luminous efficiency was measured, and a maximum GI value was obtained.

The smaller the GI value, the better, and the lower the graininess of the image. However, when heat fusion between toners begins on the developing roller, graininess appears, and the GI value becomes a high value. In addition, when the aggregate becomes large, a thin layer forming portion of the developer starts to be clogged with the aggregate, and image defects such as white streaks also occur.

Next, according to the following evaluation criteria, the graininess of the gradation pattern in the above image was evaluated for each of the evaluation apparatus at the initial stage of printing (zero sheet) and after the durable printing of 5000 sheets. The images of the gradation pattern output at the initial stage and after the durable printing were evaluated based on the maximum GI values of the images according to the following evaluation criteria. A and B were accepted, and C and D were rejected. The results are shown in Table XIX.

(Evaluation Criteria)

A The GI value is less than 0.26.

B The GI value is 0.26 or more and less than 0.30.

C The GI value is 0.30 or more.

D Aggregates are visually observed, and white streaks appear on the image.

(E.2.4) Evaluation of Low-Temperature Fixability (Evaluation Method)

For the evaluation of the low-temperature fixability of the present embodiment, the fixing device of each actual machine used for actual printing was modified so that the fixing temperature was controlled to a "normal temperature −30° C.". Using Konica Minolta J paper as recording medium, a solid image (25 mm×25 mm) was formed and fixed.

The image surface of the fixed image after printing of 5000 sheets was valley-folded, the degree of peeling of the image at the fold line portion was observed, and the distance of the sheets appearing at the fold line portion as a result of peeling of the image was measured. The evaluation criteria was as follows. A and B were accepted, and C was rejected. The results are shown in Table XIX.

(Evaluation Criteria)

A: The distance of the sheets does not appear at the fold line portion, and the fixing property is satisfactory.

B: The distance of the sheets of 1 mm or less is confirmed at the fold line portion, and fixing is possible.

C: The distance of the sheets of more than 1 mm is confirmed at the fold line portion (not suitable for practical use).

TABLE XIX

| EXAMPLES OR COMPARATIVE EXAMPLES | DEVELOPER ROLLER NO. | DEVELOPER NO. | GLASS TRANSITION TEMPERATURE [° C.] | IN-MACHINE SCATTERING AFTER PRINTING 5000 SHEETS: DENSITY | IN-MACHINE SCATTERING AFTER PRINTING 5000 SHEETS: EVALUATION | IMAGE QUALITY: GI VALUE | IMAGE QUALITY: EVALUATION | LOW-TEMPERATURE FIXABILITY: PAPER WIDTH [mm] | LOW-TEMPERATURE FIXABILITY: EVALUATION |
|---|---|---|---|---|---|---|---|---|---|
| EXAMPLE 1 | 1 | 1 | 0.4 | 0.18 | B | 0.22 | A | 0.00 | A |
| EXAMPLE 2 | 2 | 2 | 24.8 | 0.05 | A | 0.22 | A | 0.00 | A |
| EXAMPLE 3 | 3 | 3 | 37.8 | 0.08 | A | 0.22 | A | 0.00 | A |
| EXAMPLE 4 | 4 | 4 | 0.1 | 0.35 | B | 0.22 | A | 0.00 | A |
| EXAMPLE 5 | 5 | 5 | 26.3 | 0.52 | B | 0.23 | A | 0.00 | A |
| EXAMPLE 6 | 6 | 6 | 37.2 | 0.77 | B | 0.29 | B | 0.00 | A |
| EXAMPLE 7 | 7 | 7 | 0.3 | 0.75 | B | 0.28 | B | 0.11 | B |
| EXAMPLE 8 | 1 | 8 | 29.1 | 0.03 | A | 0.24 | A | 0.23 | B |
| EXAMPLE 9 | 2 | 9 | 38.2 | 0.07 | A | 0.26 | B | 0.24 | B |
| EXAMPLE 10 | 8 | 10 | 0.2 | 0.45 | B | 0.24 | A | 0.38 | B |
| EXAMPLE 11 | 9 | 11 | 28.6 | 0.03 | A | 0.25 | A | 0.42 | B |
| EXAMPLE 12 | 10 | 12 | 38.2 | 0.06 | A | 0.23 | A | 0.43 | B |
| EXAMPLE 13 | 8 | 13 | 0.3 | 0.33 | B | 0.27 | A | 0.62 | B |
| EXAMPLE 14 | 9 | 14 | 25.6 | 0.04 | A | 0.25 | B | 0.72 | B |
| EXAMPLE 15 | 10 | 15 | 39.1 | 0.07 | A | 0.26 | B | 0.79 | B |
| EXAMPLE 16 | 2 | 16 | −1.5 | 0.79 | B | 0.23 | A | 0.00 | A |
| EXAMPLE 17 | 2 | 17 | 41.2 | 0.52 | B | 0.22 | A | 0.43 | B |
| COMPARATIVE EXAMPLE 1 | 11 | 2 | 24.8 | 1.45 | C | 0.41 | D | 0.00 | A |
| COMPARATIVE EXAMPLE 2 | 12 | 2 | 24.8 | 1.43 | C | 0.32 | C | 0.00 | A |

(E.3) Summary

For the above evaluation, the combinations of the developing sleeves and the toners and the evaluation results thereof are summarized and shown in Table XX.

TABLE XX

| EXAMPLES OR COMPARATIVE EXAMPLES | DEVELOPING ROLLER: No. | ALUMINUM ALLOY: Si CONTENT [% BY MASS] | ALUMINUM ALLOY: Li CONTENT [% BY MASS] | TONER: No. | PEs CONTENT [% BY MASS] *3 | GLASS TRANSITION TEMPERATURE [° C.] | EVALUATION: CHARGE AMOUNT | IN-MACHINE SCATTERING | IMAGE QUALITY | LOW-TEMPERATURE FIXABILITY |
|---|---|---|---|---|---|---|---|---|---|---|
| EXAMPLE 1 | 1 | 0.61 | 0.19 | 1 | 88.2 | 0.4 | B | B | A | A |
| EXAMPLE 2 | 2 | 0.81 | 0.00 | 2 | 83.7 | 24.8 | A | A | A | A |
| EXAMPLE 3 | 3 | 4.82 | 0.00 | 3 | 88.2 | 37.8 | A | A | A | A |
| EXAMPLE 4 | 4 | 12.60 | 0.42 | 4 | 82.6 | 0.1 | A | B | A | A |
| EXAMPLE 5 | 5 | 25.00 | 0.23 | 5 | 82.6 | 26.3 | A | B | A | A |
| EXAMPLE 6 | 6 | 29.50 | 1.20 | 6 | 80.4 | 37.2 | B | B | B | A |
| EXAMPLE 7 | 7 | 38.20 | 0.95 | 7 | 51.1 | 0.3 | B | B | B | B |
| EXAMPLE 8 | 1 | 0.61 | 0.19 | 8 | 51.5 | 29.1 | B | A | A | B |
| EXAMPLE 9 | 2 | 0.81 | 0.00 | 9 | 51.3 | 38.2 | A | A | B | B |
| EXAMPLE 10 | 8 | 0.61 | 0.19 | 10 | 52.8 | 0.2 | B | B | A | B |
| EXAMPLE 11 | 9 | 0.81 | 0.00 | 11 | 54.3 | 28.6 | A | A | A | B |
| EXAMPLE 12 | 10 | 4.82 | 0.00 | 12 | 60.7 | 38.2 | A | A | A | B |
| EXAMPLE 13 | 8 | 0.61 | 0.19 | 13 | 2.1 | 0.3 | B | B | A | B |
| EXAMPLE 14 | 9 | 0.81 | 0.00 | 14 | 2.2 | 25.6 | B | A | B | B |
| EXAMPLE 15 | 10 | 4.82 | 0.00 | 15 | 2.5 | 39.1 | A | A | B | B |
| EXAMPLE 16 | 2 | 0.81 | 0.00 | 16 | 86.9 | −1.5 | B | B | A | A |
| EXAMPLE 17 | 2 | 0.81 | 0.00 | 17 | 86.9 | 41.2 | A | B | A | B |
| COMPARATIVE EXAMPLE 1 | 11 | 0.00 | 0.00 | 2 | 83.7 | 24.8 | C | C | D | A |
| COMPARATIVE EXAMPLE 2 | 12 | 0.50 | 0.50 | 2 | 83.7 | 24.8 | C | C | C | A |

IN THE TABLE, "Si" REPRESENTS SILICON AND "Li" REPRESENTS LITHIUM.

*3: CONTENT OF PEs IN TONER INCLUDING EXTERNAL ADDITIVE [% BY MASS].

F. General Remarks

As is clear from Table XX, Examples of the present invention are superior to Comparative Examples, and the evaluations of the charge amount, the in-machine scattering, the image quality, and the low-temperature fixability in Examples are all A or B, which indicates that there is no problem in practical use. As is shown above, the embodiments of the present invention have been described and illustrated in detail. However, the disclosed embodiments are made for purposes of illustration and example only and are not intended to be limiting. The scope of the present invention is to be interpreted by the terms of the appended claims.

The expression mechanism or action mechanism of the effect of the present invention is not clear, but it is presumed as follows.

The developing roller of the present invention includes a developing sleeve and a member that generates a magnetic flux inside the developing sleeve, and the developing sleeve contains an aluminum alloy containing more than 0.6% by mass of silicon.

In a case where a developing roller in which a member that generates magnetic flux is inserted inside a developing sleeve is used, heat is generated on the developing sleeve by an eddy current. Due to this heat generation, the toner and the carrier start to be thermally fused and aggregated, so that the aggregates clog the doctor blade portion, and as a result, a white streak appears. In addition, aggregates of toner particles cause image failure such as black spots and worsen the granularity (GI value) of halftones.

In particular, due to recent demands for higher printing speed, size reduction of machines, and the like, the developing sleeve is required to have a small diameter. The developing sleeve is also required to rotate at high speed while maintaining a high magnetic flux density.

By the rotation, the heat generation of the developing sleeve due to the eddy current is further increased. Thus, image failure such as white streaks and black spots becomes more prominent.

In the present invention, the aluminum alloy contained in the developing sleeve contains more than 0.6% by mass of silicon, whereby the resistance value of the surface of the developing sleeve is increased. When the resistance value is increased, even when a member that generates a magnetic flux is provided inside the developing sleeve, generation of an eddy current is suppressed, and heat generation can be suppressed. Thus, occurrence of image defects such as white streaks and black spots can be suppressed.

Furthermore, when the aluminum alloy contained in the developing sleeve contains more than 0.6% by mass of silicon, toner scattering and a decrease in density are prevented. Moreover, since silicon has substantially the same chargeability as aluminum, it does not interfere with the charging performance between toner carriers, and thus it is presumed that a decrease in density due to toner scattering or excessive charging can be prevented.

Basically, it is necessary to correctly charge the toner only with the toner and the carrier. However, for example, when lithium, which is an element having a significantly different chargeability from aluminum, is contained in the above-described aluminum alloy, charging between the toner and the carrier is disturbed, and the charge spectra of the toner tends to be spread.

A toner component spreading to the low charge amount side in the above-described charge spectra cannot be held by the carrier due to a centrifugal force of the developing sleeve rotating during development, and scatters. On the other hand, a toner component spreading to the high charge amount side in the above-described charge spectra electrostatically sticks to a positive surface of the carrier, the sleeve, or the like, and development is not appropriately performed. That is, the amount of development decreases and the density decreases.

It is presumed that since the silicon according to the present invention has a chargeability close to that of aluminum, the spread of the charge spectra as described above can be suppressed and decrease in density due to toner scattering or excessive charging can be prevented.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-066096 filed on Apr. 14, 2023 is incorporated herein by reference in its entirety.

What is claimed is:

1. A developing roller for an electrophotographic image forming apparatus, which conveys a developer, wherein the developing roller comprises a developing sleeve and a member that generates a magnetic flux inside the developing sleeve, the developing sleeve contains an aluminum alloy containing more than 0.6% by mass of silicon, and grooves are formed on a surface of the developing sleeve.

2. The developing roller according to claim 1, wherein a silicon content of the aluminum alloy is more than 0.8% by mass.

3. The developing roller according to claim 1, wherein a lithium content of the aluminum alloy is less than 1% by mass.

4. A process cartridge comprising a developing roller that conveys a developer, wherein the developing roller includes a developing sleeve and a member that generates a magnetic flux inside the developing sleeve, the developing sleeve contains an aluminum alloy containing more than 0.6% by mass of silicon, and grooves are formed on a surface of the developing sleeve.

5. An electrophotographic image forming apparatus comprising a developing roller that conveys a developer, wherein the developing roller includes a developing sleeve and a member that generates a magnetic flux inside the developing sleeve, the developing sleeve contains an aluminum alloy containing more than 0.6% by mass of silicon, and grooves are formed on a surface of the developing sleeve.

6. An electrophotographic image forming system comprising: an apparatus including a developing roller that conveys a developer; and a toner for developing an electrostatic latent image, wherein the developing roller includes a developing sleeve and a member that generates a magnetic flux inside the developing sleeve, the developing sleeve contains an aluminum alloy containing more than 0.6% by mass of silicon, and a glass transition temperature of the toner for developing an electrostatic latent image is in a range of 0 to 40° C.

7. The electrophotographic image forming system according to claim 6, wherein a binder resin contained in toner particles included in the toner for developing an electrostatic latent image contains polyester in a range of 50 to 95% by mass.

* * * * *